(12) United States Patent
Paruchuri et al.

(10) Patent No.: US 10,880,362 B2
(45) Date of Patent: Dec. 29, 2020

(54) VIRTUAL ELECTRICAL NETWORKS

(71) Applicant: Intel Corporation, Santa Clara, CA (US)

(72) Inventors: Dileep Paruchuri, Bangalore KA (IN); Anay Majee, West Bengal (IN); Pranesh Sk, Tamil Nadu (IN); Yashasvi Bhargava, Maharashtra (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/208,352

(22) Filed: Dec. 3, 2018

(65) Prior Publication Data

US 2019/0109891 A1 Apr. 11, 2019

(51) Int. Cl.
*H04L 29/08* (2006.01)
*H04L 29/06* (2006.01)
(Continued)

(52) U.S. Cl.
CPC ............ *H04L 67/10* (2013.01); *G06F 9/5072* (2013.01); *G06Q 10/06* (2013.01); *G06Q 50/06* (2013.01);
(Continued)

(58) Field of Classification Search
CPC ..... H04L 67/10; H04L 67/1004; H04L 67/12; H04L 63/0272; H04L 29/06; H04J 3/005;
(Continued)

(56) References Cited

U.S. PATENT DOCUMENTS 5,794,008 A * 8/1998 Meyers .................. G01R 27/28
709/226
8,588,991 B1 * 11/2013 Forbes, Jr. ........ H02J 13/00006
700/295
(Continued)

FOREIGN PATENT DOCUMENTS

CN 106815657 A 6/2017
CN 107749620 A 3/2018
(Continued)

OTHER PUBLICATIONS

Andrei Gagarin et al., "Distributed search for balanced energy consumption spanning trees in Wireless Sensor Networks", Sep. 2010, 6 pages, https://www.sciencedirect.com/science/article/pii/S0743731510001085.
(Continued)

*Primary Examiner* — Uzma Alam
(74) *Attorney, Agent, or Firm* — Schwabe, Williamson & Wyatt, P.C.

(57) ABSTRACT

Systems, methods, and computer-readable media are provided for virtual electrical networks (VENs). An Energy Management System (EMS) appliance identifies each physical node of a plurality of physical nodes in an electrical grid as being an energy source node or an energy consumer node, where each node is electrically coupled to at least one other physical node. The EMS appliance generates a VEN to include a plurality of virtual nodes to represent the plurality of physical nodes and virtual couplings to couple the virtual nodes. The plurality of virtual nodes include virtual energy source nodes and virtual energy consumer nodes. The VEN is used to identify faulty virtual nodes and to identify electrical couplings to achieve load balancing for the conservation of energy resources. Instructions are generated to reconfigure the electrical grid according to remove faulty
(Continued)

nodes and/or to achieve the load balancing. Other embodiments are disclosed and/or claimed.

24 Claims, 15 Drawing Sheets

(51) Int. Cl.
*H02J 3/00* (2006.01)
*G06Q 50/06* (2012.01)
*H02J 9/06* (2006.01)
*G06Q 10/06* (2012.01)
*G06F 9/50* (2006.01)
*H02J 3/38* (2006.01)
*H02J 3/28* (2006.01)

(52) U.S. Cl.
CPC .............. *H02J 3/005* (2013.01); *H02J 9/061* (2013.01); *H04L 29/06* (2013.01); *H04L 63/0272* (2013.01); *H04L 67/1004* (2013.01); *H02J 3/28* (2013.01); *H02J 3/381* (2013.01); *H02J 2203/20* (2020.01); *H04L 67/12* (2013.01)

(58) Field of Classification Search
CPC ........ H04J 9/061; H04J 2203/20; H04J 3/381; H04J 3/28; G06Q 50/06; G06Q 10/06; G06F 9/5072
See application file for complete search history.

(56) References Cited

U.S. PATENT DOCUMENTS

| | | | | |
|---|---|---|---|---|
| 8,788,106 | B2* | 7/2014 | Stothers | B64D 15/22 700/286 |
| 8,812,165 | B1* | 8/2014 | Smith | H02J 3/14 700/291 |
| 2011/0178977 | A1* | 7/2011 | Drees | G06Q 10/04 706/52 |
| 2011/0276194 | A1* | 11/2011 | Emalfarb | B60L 53/65 700/297 |
| 2012/0104847 | A1* | 5/2012 | Roscoe | H02J 4/00 307/23 |
| 2012/0310559 | A1* | 12/2012 | Taft | H02J 13/00002 702/52 |
| 2013/0238158 | A1* | 9/2013 | Gan | G06F 1/3203 700/295 |
| 2014/0012429 | A1* | 1/2014 | Dempster | H02J 3/38 700/295 |
| 2014/0018969 | A1* | 1/2014 | Forbes, Jr. | G05B 15/02 700/295 |
| 2015/0120223 | A1* | 4/2015 | Dannecker | G06Q 50/06 702/61 |
| 2015/0263519 | A1* | 9/2015 | Suzuki | H02J 3/0073 700/297 |
| 2016/0056631 | A1* | 2/2016 | Ilo | G05B 15/02 700/287 |
| 2016/0062380 | A1* | 3/2016 | Schwarz | G05F 1/66 700/295 |
| 2016/0179077 | A1* | 6/2016 | Le Boudec | G05B 19/106 700/295 |
| 2016/0232254 | A1* | 8/2016 | Chehreghani | G06F 17/10 |
| 2017/0311183 | A1* | 10/2017 | Cotanis | H04L 41/12 |
| 2018/0123391 | A1* | 5/2018 | Lakamp | H02J 13/00028 |
| 2019/0050015 | A1* | 2/2019 | Mezic | H02J 13/00001 |
| 2019/0267808 | A1* | 8/2019 | Weindl | G05B 19/042 |

FOREIGN PATENT DOCUMENTS

| | | |
|---|---|---|
| CN | 105098762 B | 5/2018 |
| CN | 108109382 A | 6/2018 |
| CN | 108334572 A | 7/2018 |

OTHER PUBLICATIONS

Taha Selim Ustun et al., "Implementaion of Dijkstra's Algorithm in a Dynamic Microgrid for Relay Hierarchy Detection", 2011, 6 pages, Virtual Power Plants, Distributed Generation, Microgrids, Renewables and Storage (IEEE SmartGridComm).

Hugo Miguel Nisa Cafe, Wireless Smart Grids for Smart Energy Management, Nov. 2015, 128 pages.

Mubashir Husain Rehmani et al., "Software Defined Networks based Smart Grid Communication: A Comprehensive Survey", Jul. 16, 2018, 32 pages.

* cited by examiner

1200

VIRTUAL ELECTRICAL NETWORKS

FIELD

Embodiments discussed herein are related to computing, and in particular, to Fog and Edge computing networks having particular application to electrical grids.

BACKGROUND

Currently, renewable energy technologies are being deployed for small areas or individual buildings, which may be coupled to wide area electrical grids that serve large geographic regions. The deployment of these new energy generation technologies can result in varying load demands over time, as well as reverse supply of energy into the legacy electrical systems.

Current grid systems are formed with minimal or no available information on the loads and load requirements throughout the grid. Additionally, changes to the current grid systems are difficult to implement. The conventional solutions for tracking load information across an electrical grid lack real-time granular tracking of the consumption patterns of major consumers across various time periods and geographic regions. Ensuring a guaranteed supply gets further complicated once the renewable energy sources are considered in the operation of the electrical grids. The shortcomings of the current grid systems and current solutions lead to inefficient utilization of energy resources. The inefficient utilization of energy resources may lead to environmental degradation. For example, the inefficient utilization of fossil fuel energy resources contributes to anthropogenic climate change, which leads to sea level rise, extreme weather, and/or other like negative environmental impacts.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4 shows a process for adding a new node to a VEN according to various embodiments;

FIG. 5 shows VEN generation process, in accordance with various embodiments;

FIG. 6 shows load balancing process, in accordance with various embodiments;

FIG. 7 shows a fault detection and clearance process, in accordance with various embodiments; and FIG. 8 shows a disconnection pathway process, in accordance with various embodiments.

DETAILED DESCRIPTION

Figure 1:
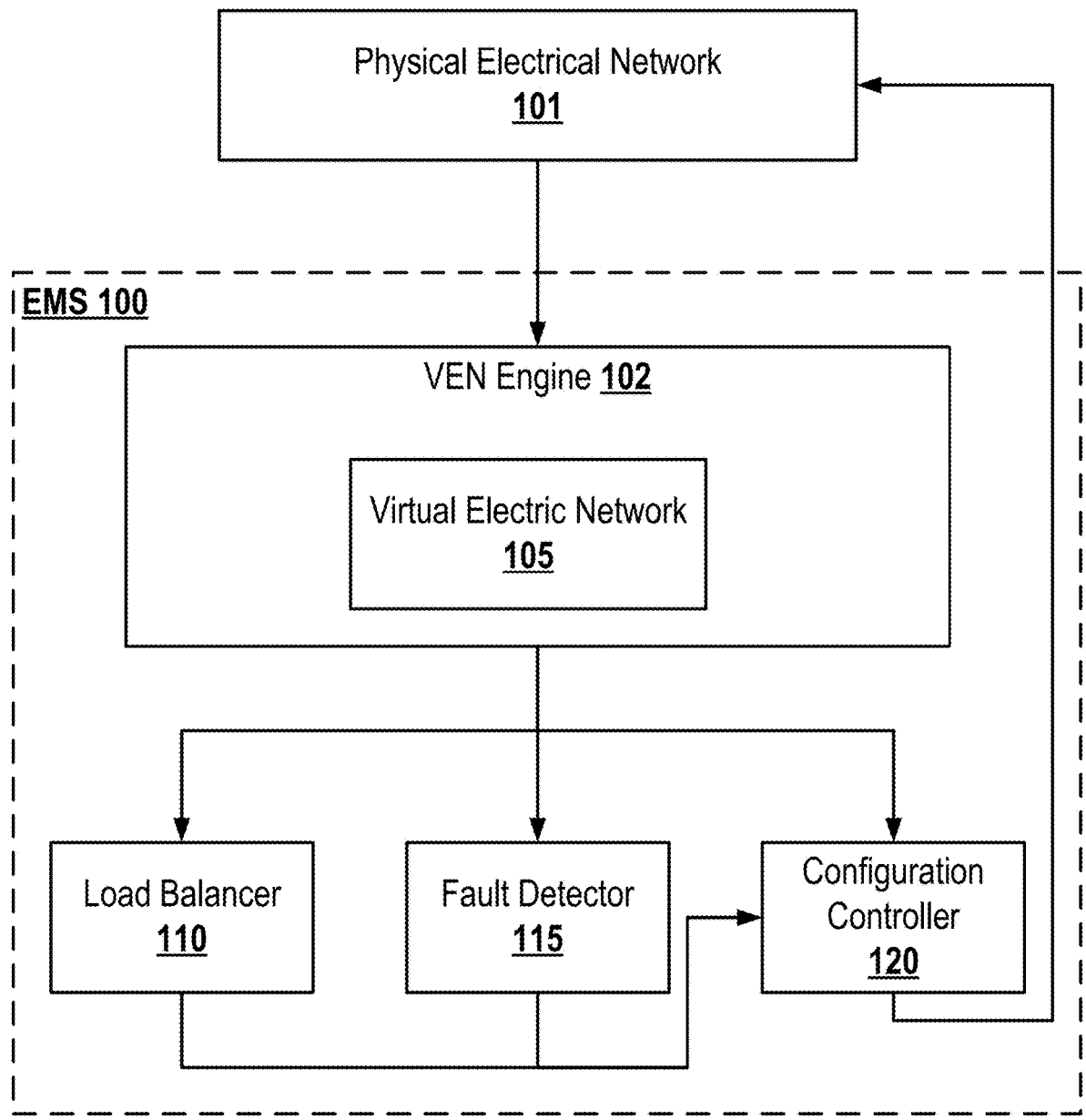
FIG. 1 illustrates example logical components and interaction points of an Energy Management System (EMS), in accordance with various embodiments.

Energy Management Systems (EMS) are a rapidly evolving vertical industry in the Internet of Things (IoT) technology space, which is aligned with the energy production industry. Currently available EMS solutions target specific devices wherein control of these specific devices becomes limited and scalability is low or nonexistent. Currently, renewable energy technologies are being deployed for small areas or individual buildings, which in many cases may be coupled to wide area electrical networks that serve large regions. The deployment of these new energy generation technologies can result in varying load demands over time, as well as reverse supply of energy into the electrical grids. Current electrical grid systems are formed with minimal or no available information on the loads and load requirements throughout the electrical grid. The conventional solutions for tracking load information across an electrical grid lack real-time granular tracking of the consumption patterns of major consumers across various time periods and geographic regions. Ensuring a guaranteed supply gets further complicated once the renewable energy sources are considered in the operation of the electrical grids.

Disclosed embodiments provide scalable solutions for managing electrical networks. Embodiments include systems and methods for generating Virtual Electrical Networks (VENs), which represent physical electrical networks ("electrical grids") and are used to achieve load balancing correct faults in the electrical grids. The disclosed embodiments address the shortcomings of the conventional solutions by creating VENs, which include a representation of energy producers and energy consumers and enable the effective distribution of energy based on the current energy demands and supply. Some embodiments include using graphing algorithms to minimize the operation time for fault detection and rectification, and for achieving load balancing throughout the electrical grid. As further discussed infra, the disclosed embodiments materially contribute to more efficient utilization and conservation of energy resources. In particular, the disclosed embodiments are related to the reduction of energy consumption by various equipment including industrial equipment, household appliances, and the like. Other embodiments are described and/or claimed.

The embodiments discussed herein are applicable to electrical networks of various sizes, including wide area electrical networks that span across entire nations or continents, as well a microgrids that are deployed for a single building. This is accomplished by deploying EMS appliances, which operate various graph algorithms to map a target electrical network and to minimize operation time for fault detection and clearance. In some embodiments, load balancing is achieved using minimum spanning tree (MST) algorithms to find active sources in the electrical grid, and to dynamically reconfigure the electrical grid to match the power requirements of the detected loads. In some embodiments, fault detection is achieved using a graph search algorithm such as Breadth First Search (BFS) or Depth First Search (DFS) algorithms, to traverse the entire VEN to find faulty nodes. When the faulty node is detected, fault clearance is achieved using by isolating the faulty node from the grid using a shortest path algorithm, such as Dijkstra's algorithm, Johnson's algorithm, Floyd-Warshall algorithm, A* search algorithm, Viterbi algorithm, or the like, and the electrical grid is reconfigured to remove the faulty node from the electrical grid. Other embodiments are described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional operations not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

I. Virtual Electrical Networks

Referring now to FIG. 1, wherein example logical components and interaction points of an Energy Management System (EMS) 100, in accordance with various embodiments, is illustrated. As shown, for the illustrated embodiments, the EMS 100 includes a Virtual Electrical Network (VEN) engine 102, a load balancer 110, a fault detector 115, and a configuration controller 120. In the illustrated embodiments, the components of the EMS 100 interact with a physical electrical network 101.

The physical electrical network 101 is an interconnected network for delivering electricity from energy producers to energy consumers. The physical electrical network 101 may be any type of low voltage, medium voltage, and/or high voltage electricity distribution network with any suitable network topology, including, for example, grid networks, radial networks, spot networks, mesh networks, or any other network topology. Generally, the term "grid" refers to grid network, which is an interconnection of circuits that are energized from several primary feeders through distribution transformers at multiple locations. However, as used herein the term "grid" may also refer to any other type of electricity distribution network. Further, the physical electrical network 101 may be referred to as an "electrical grid."

In general, the physical electrical network 101 comprises a plurality of physical nodes. The physical nodes are electrical elements that either produce electricity or electrical elements that consumer electricity. Physical nodes that produce electricity may be referred to as "energy source nodes" or "energy sources," and physical nodes that consume electricity are referred to as "energy consumer nodes" or "energy consumer." Each physical node in the physical electrical network 101 is electrically coupled to at least one other physical node.

In various embodiments, the physical electrical network 101 is a wide area electricity distribution network (also referred to as a "primary network," "wide area synchronous grid," or the like), a small area electricity distribution network (also referred to as a "secondary network"), a micro area electricity distribution network (also referred to as a "tertiary network" or a "microgrid"), or any combination thereof. A primary network comprises high voltage distribution systems that provide high voltage electricity over a large geographic region to large energy consumption nodes (e.g., distribution centers for reducing the voltage for individual customers). The primary network may span across a relatively large area, such as one or more nations or continents. The primary network may include electrical elements, such as power stations (e.g., fossil fuel power plants, nuclear power plants, hydro-electric power plants, geothermal etc.) that generate electricity, primary distribution lines (also referred to as "high voltage transmission lines") that carry electricity from the power stations over long distances, distribution substations or step-down transformer stations, and the like.

The secondary network comprises medium voltage distribution systems that provide medium voltage electricity (e.g., as single-phase electric power or three-phase electric power) to different energy consumption nodes, and may include elements such as secondary distribution lines that provide electricity to individual buildings or infrastructure connected thereto and individual energy consumers. The secondary network may span across an area or region that is smaller than the area/region of the primary network, such as one or more provinces/states or municipalities. The individual energy consumers may be buildings or infrastructure connected to the secondary distribution lines, individual electrical elements that utilize electricity within different buildings and/or infrastructure, or a combination thereof. The individual electrical elements may include, for example, appliances, equipment, electricity distribution components (e.g., transformers, switches (including circuit breakers and the like), relays, etc.), and/or other like elements that consume electricity. The individual electrical elements that consume electricity may be referred to as "energy consumption nodes," "energy consumer nodes," "energy loads," "electricity loads," "loads," or the like.

The tertiary network ("microgrid") comprises low voltage distribution systems with distributed energy resources (DER) and controllable loads which can operate connected to a medium voltage grid and/or can operate independently or autonomously (often referred to as "off-the-grid"). In many cases, DERs include different technologies that allow small-scale energy/electricity generation, which may take advantage of renewable energy resources (RESs) such as solar, wind, hydro, or other like RESs. These DERs may supply emergency power and change energy storage elements (e.g., batteries). Current trends in electricity generation and distribution technologies include more widespread deployment of microgrids, including the use of RES systems. The use of microgrids leads to a reverse supply of energy into the secondary and primary networks, which changes the production and consumption habits of energy producers and consumers. These changes in production and consumption of electricity, coupled with the varying energy demands during different times of the day across different regions, may become difficult to manage. Mismanagement of these electrical networks can lead to wasted energy resources and contribute to environmental degradation. The EMS 100 is a mechanism to effectively manage electrical networks (e.g., physical electrical network 101) while addressing the shortcomings of current smartgrid infrastructure (e.g., such as those discussed in the background section of the present disclosure).

According to various embodiments, the EMS 100 operates a VEN engine 102 to generate a VEN 105. The VEN 105 represents selective virtual aggregation or an abstraction of the electrical elements and the actual electrical couplings of the electrical elements in the physical electrical network 101. As discussed in more detail infra, the EMS 100 operates the VEN engine 102 to dynamically create or generate the VEN 105 as a background process, and once generated, the VEN 105 may be used to determine electrical couplings between different energy producers and energy consumers to realize energy savings and to isolate and remove faulty producers or consumers. Creation of the VEN 105 reduces latency and increases the speed of computation for determining the electrical couplings, which is an improvement to electrical networks and the computing systems themselves as the speed of computation as well as the time required to isolate and remove faults is reduced when using the VEN 105.

According to various embodiments, the EMS 100 is configured to operate the VEN engine 102. The VEN engine 102 is configured to generate the VEN 105 by identifying the physical nodes in the physical electrical network 101 as being an energy consumers ("load") or an energy producers ("source"). The VEN engine 102 also identifies the electrical couplings between various sources and loads in the network 101. In embodiments, the VEN engine 102 is configured to operate one or more active node detection algorithms for detecting the presence of loads and sources in the physical electrical network 101. In embodiments where the VEN 105 is a graph data structure (e.g., VEN 200 of FIG. 2), the active node detection algorithms may be minimum spanning tree (MST) algorithms, which are discussed in more detail infra. Using the active node detection algorithms allows the user/owner of the physical electrical network 101 to integrate new loads (e.g., appliances, equipment, etc.) and new sources (e.g., DGs, RESs, etc.) into the physical electrical network 101. As discussed in more detail infra, the active node detection algorithms are greedy algorithms that are not time intensive, which allows the EMS 100 to conserve computational resources. These greedy algorithms operate with logarithmic time complexities making them much more efficient than standard available energy management systems. In some embodiments, the VEN engine 102 is also configured to identify an output threshold of the electrical elements that are identified as sources, and an input threshold of the electrical elements that are identified as loads. In one example, the output threshold may be a maximum power output of a source and the input threshold may be a minimum power input capacity of a load.

When the physical nodes and the output/input thresholds are identified, the VEN engine 102 is configured to classify the sources and loads according to priority and/or some other suitable policy objectives. In embodiments, loads may be classified based on their relative importance. In one example, equipment in a hospital can be classified as an "essential" or high priority loads whereas appliances at an amusement park may be classified as "non-essential" or low priority loads. In embodiments, sources may be classified based on their capabilities, such as their ability to provide continuous or uninterrupted electricity and the quality of the electricity supplied by the source. In one example, a power station of a primary network may be classified as a high priority source because the power station is capable providing uninterrupted electricity, whereas a solar panel array deployed on the roof of a building may be classified as a low priority source because the solar panel array is only capable providing uninterrupted electricity during daylight hours. In various embodiments, the load and source classifications may be (or may be converted into) weight values for a graph activation matrix of the VEN 105.

The VEN engine 102 is configured to generate a data structure for each identified source and each identified load. These data structures are referred to as "virtual electrical nodes," "virtual nodes," or the like. In some embodiments, each identified source corresponds to a virtual energy source node, and each identified load corresponds to a virtual energy consumer node. In some embodiments, multiple sources may correspond to a virtual energy source node, and/or multiple loads may correspond to a virtual energy consumer node. These data structures may be any suitable collection of data or information, and may comprise, for example, arrays, linked lists, multimaps, multisets, records, tuples, structs, database objects, containers, or the like.

The VEN engine 102 is configured to store static parameters in the virtual node data structures. The static parameters may include information about a corresponding virtual node, such as a virtual node identifier (ID) of the virtual node, the priority value of the virtual node, information about connections with other virtual nodes, and/or other like information. In one example, each data structure stores (e.g., in an array, associative array, multiset, or the like) a virtual node ID of each virtual node to which it is connected. In embodiments, the virtual node data structures may store database objects that are representative of virtual electrical couplings between a virtual node and another virtual node. These database objects may be a suitable data relation between a virtual node and another virtual node to which it is coupled. Other types of information may be stored in the virtual node data structures. These static parameters may be used by individual virtual nodes for failure identification and rectification purposes.

The VEN engine 102 is configured to monitor dynamic parameters of each electrical element in the network 101, and to store the dynamic parameters in the corresponding virtual node data structures. In embodiments, the dynamic parameters may include electrical measurements of the electrical elements in the physical electrical network 101. For example, the VEN engine 102 may monitor a root mean square (RMS) value of an electrical measure of the physical nodes, an amplitude or peak-to-peak value of the electrical measure of the physical nodes, a Peak to Average Power Ratio (PAPR) of the electrical measure of the physical nodes, a phase value of the electrical measure of the physical nodes, and/or an electrical form factor of the electrical measure. In this example, the electrical measure may include one or more of a voltage, an electric current, and an electric power measurement. The measured values are stored in the corresponding data structures of the virtual nodes. In embodiments, the VEN engine 102 may continuously monitor the nodes in the physical electrical network 101, or may monitor the nodes on a periodic basis. In some embodiments, the monitoring of the network 101 performed by the VEN engine 102 may include re-evaluating the priorities of each electrical element in the network 101, as well as monitoring primary and secondary relays for fault detection purposes. In some of these embodiments, the VEN engine 102 may only re-evaluate the priorities of each electrical element in the network 101 that is identified as a load.

The VEN engine 102 is configured to generate the VEN 105 to include the virtual nodes to represent the plurality of physical nodes of the physical electrical network 101, and virtual electrical couplings to couple the virtual nodes. In some embodiments, the VEN engine 102 operates on a hybrid arrangement wherein the VEN engine 102 generates a VEN 105 for one portion of the physical electrical network 101, then moves on to generate another VEN 105 for another group of physical nodes in the physical electrical network 101, and so forth. In these embodiments, the different VENs 105 that represent different aspects of the physical electrical network 101 can be combined by the VEN engine 102. The different portions or aspects of the physical electrical network 101 may be based on geographic location of physical nodes (e.g., where physical nodes that are close to one another in distance are analyzed), and/or based on physical node types (e.g., where physical nodes that are of the same equipment type or category, or have a same or similar priority are analyzed separate from other physical nodes). This form of analysis may be beneficial for optimizing electrical couplings for different regions or buildings, and for identifying different aspects of energy consumption. The particular physical nodes that are analyzed for inclusion in the VEN 105 may be based on user/operator selection or defined by one or more policies. In various embodiments, the VEN 105 is a graph data structure, an example of which is shown and described with respect to FIG. 2.

The virtual nodes in the VEN 105 are either virtual energy source nodes and virtual energy consumer nodes, and the virtual nodes in the VEN 105 include the aforementioned data structures. In embodiments, each of the virtual energy source nodes correspond to an individual physical energy source, and each of the virtual energy consumer nodes correspond to an individual physical energy consumer. Additionally, in some embodiments, the virtual electrical couplings represent a corresponding physical electrical coupling of two or more physical nodes. According to various embodiments, the VEN engine 102 is configured to generate a new instance of the VEN 105 upon successful addition of one or more physical nodes to the physical electrical network 101, and in such embodiments, the VEN engine 102 is configured to monitor each virtual node for new or updated dynamic parameters. Furthermore, the different instances of the VEN 105 may be stored and used for simulation or other analytical purposes. For example, the VEN engine 102 is configured to store the various VEN instances 105 with the virtual node data structures of those VEN instances 105 generated over a period of time, which may then be used to analyze historical trends in energy/electricity usage in the physical electrical network 101, as well as the historical optimizations used during that time period. This historical analysis may be used to refine future optimizations used by the EMS 100.

When the VEN 105 is generated, the EMS 100 is configured to operate a load balancer 110. The load balancer 110 is used to determine when and how to allocate electricity from certain producers to individual consumers, including when to store excess electrical power and when to release electrical power to individual consumers. The allocation of electricity is based on load balancing criteria, which may be based on policy directives, priorities of the virtual nodes, empirical data, and the like. The load balancer 110 is configured to determine the virtual electrical couplings between the virtual energy consumer nodes and corresponding virtual energy sources. The load balancer 110 is also configured to generate load balancing instructions, which are used to instruct the configuration controller 120 to reconfigure the electrical couplings of the physical nodes in the physical electrical network 101 based on the virtual electrical couplings. The load balancer 110 is configured to provide the load balancing instructions to the configuration controller 120, which reconfigures the physical electrical network 101 based on the load balancing instructions.

In addition to operating the load balancer 110, the EMS 100 is also configured to operate a fault detector 115 when the VEN 105 is generated. In various embodiments, the fault detector 115 is configured to monitor the VEN 105 for faults in the plurality of virtual nodes. In some embodiments, three fault conditions may continuously monitored, including overcurrent faults, overvoltage faults, and Earth (ground) fault. Additionally or alternatively, the fault detector 115 may monitor for other types of faults, such as transient faults, persistent faults, arcing faults, bolted faults, line-to-line faults, line-to-ground faults, double line-to-ground faults, and/or the like. In embodiments, the fault detector 115 is configured to operate a power-flow model or power-flow algorithm to detect faulty virtual nodes, which is discussed in more detail infra. In embodiments, the fault detector 115 is configured to operate one or more node search algorithms to search the VEN 105 for faulty virtual nodes. In embodiments where the VEN 105 is a graph data structure (e.g., VEN 200 of FIG. 2), the node search algorithms may include Breadth First Search (BFS) or Depth First Search (DFS) to traverse the entire graph.

In response to detection of a faulty virtual node, the fault detector 115 is configured to isolate the faulty virtual node from other virtual nodes in the VEN 105. After a predetermined or configured period/instance of time, the faulty virtual node is monitored again to confirm that the fault still exists. If the fault still exists, the fault detector 115 is configured to operate a shortest path algorithms, such as Dijkstra's algorithm, Johnson's algorithm, Floyd-Warshall algorithm, A* search algorithm, Viterbi algorithm, etc., to find the shortest path between the faulty virtual node and one or more other virtual nodes. This is done to isolate the minimum number of virtual nodes, and to drive any excess current back to the grid. In order to isolate the faulty virtual node, the fault detector 115 is configured to identify a set of the virtual couplings between the faulty virtual node and one or more other virtual nodes, and to generate removal instructions based on the identified set of virtual couplings. The removal instructions are used to instruct the configuration controller 120 to reconfigure electrical couplings of the physical nodes corresponding to the one or more virtual nodes to disconnect one or more faulty physical nodes associated with the faulty virtual node based on the identified set of the virtual couplings.

Furthermore, the EMS 100 is configured to operate a configuration controller 120 to configure/reconfigure the electrical couplings of the physical electrical network 101 based on the computations provided by the load balancer 110 and/or the fault detector 115. In some embodiments, the device configurations module 120 is configured to convert instructions in a first format (source language) obtained from the load balancer 110 and/or the fault detector 115 into suitable instructions in a second format (target language) or control signals for reconfiguring the electrical couplings of the physical nodes in the physical electrical network 101. In these embodiments, the configuration controller 120 may employ suitable translator for translating one or more source languages into one or more target languages, and may utilize any suitable compilation strategies for the translation. The translator may also have different implementations for corresponding relay controllers (e.g., memory map, instruction set, programming model, etc.).

In embodiments, the configuration controller 120 is configured to obtain a first message with a payload in a first format; extract one or more parameters from the payload of the first message; convert the payload into a second format for consumption by one or more relay controllers based on the one or more parameters, and sends a second message with the converted payload to the relay controllers. The first format may include any combination of high-level programming languages and/or schemas, and the second format may be a low-level programming language (e.g., raw binary, machine code, assembly language, etc.). For example, the first message may be a REST message format (e.g., one or more HTTP messages), including commands, parameters, control signals, etc. in a high-level programming language/schema, such as those discussed herein. In this example, the second message may be an I²C protocol message (e.g., address frames and/or data frames) with commands, parameters, control signals, etc. in the I2C format. The second format may also be a message of some other protocol/standard discussed herein.

In an additional example, the high-level programming language/schema may be the load balancing instructions or the fault removal instructions, which may be in HTML, XML, GraphMarkup Language (GraphML), Graph Modelling Language (GML), JSON, DOT (graph description language), or some other format, and the configuration controller 120 may convert these instructions into an IEC 61131-3 (or IEC 61499) standard programming language, such as ladder diagram (LD) or ladder logic (LAD), function block diagram (FBD), structured text (ST), instruction list (IL), sequential function chart (SFC), or the like. In another example, the load balancing instructions or the fault removal instructions may be in one of the aforementioned IEC 61131-3 standard programming languages, and the configuration controller 120 may convert these instructions into an appropriate bytecode (e.g., converting STL instructions into MC7 code). In other examples, multiple conversions may take place, such as converting LD, LAD, FBD, or SCL into STL, which is then converted into MC7 code.

In these examples, the configuration controller 120 may operate or control interface circuitry or communication circuitry of the EMS 100 to send the converted instructions to one or more relay controllers for reconfiguration of the physical electrical network 101. The relay controllers may be programmable logic controllers (PLCs), programmable logic relays (PLRs), programmable automation controller (PAC) devices, or other like computing systems that are capable of controlling machinery and/or electrical components.

Figure 2:
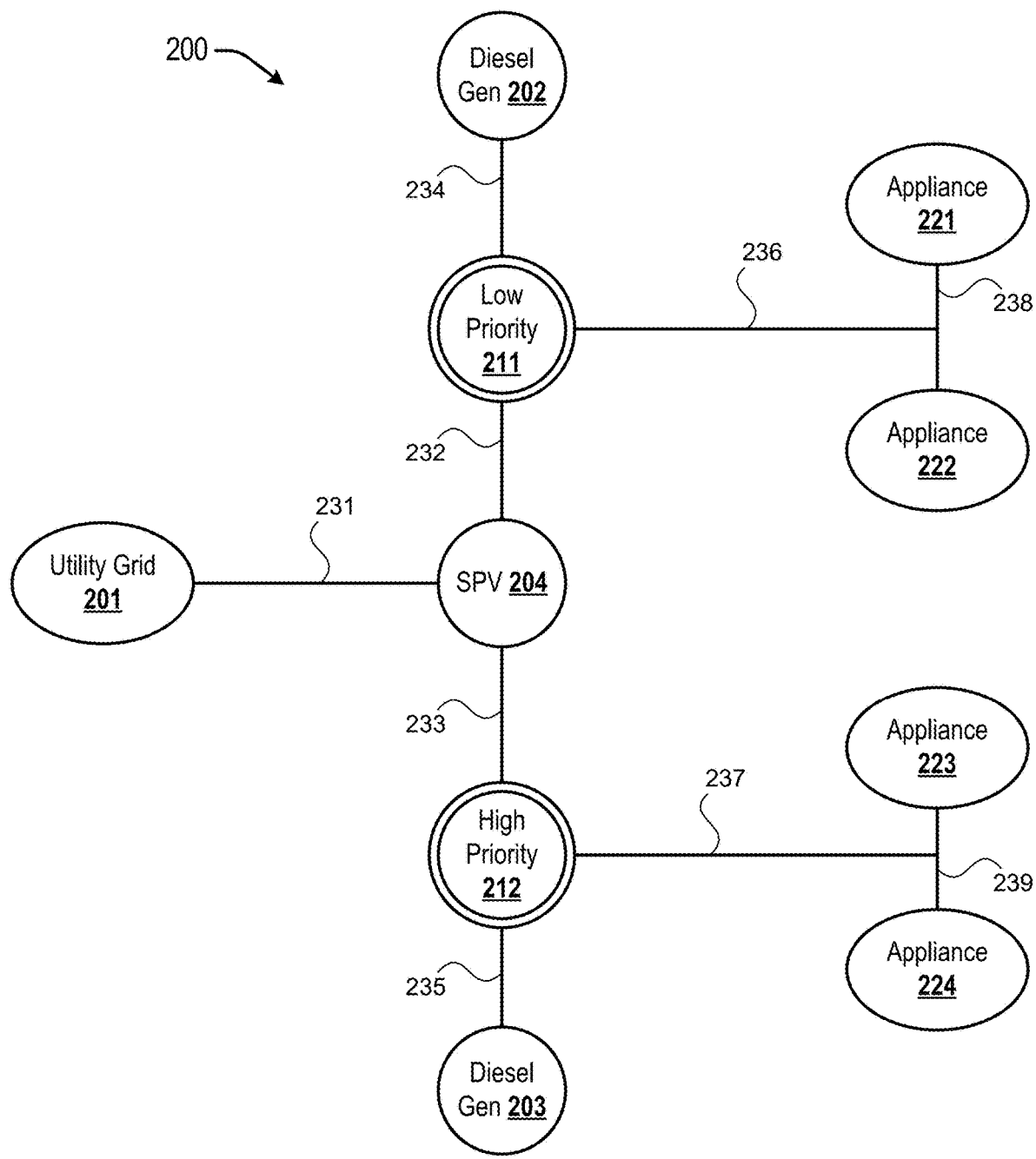
FIG. 2 illustrates an example virtual electrical grid in which aspects of the embodiments can be practiced.

Referring to FIG. 2, in which an example VEN 200 according to various embodiments, is shown. VEN 200 comprises multiple sources and loads. In the example of FIG. 2, the utility grid 201, diesel generator 202, diesel generator 203, and solar photovoltaic system (SPV) 204 are virtual power source nodes, and low priority node 211, high priority node 212, and appliances 221-224 are virtual power consumption nodes. In this example, each of the appliances 221-224 may represent individual or groupings of machines that use electricity and/or some other energy input, and may include, for example, household or office appliances and the like. The implementation of the VEN 200 is a graph data structure that enables implementation of graph algorithms for load balancing and system level control of an electrical grid to implement power optimization for increasing penetration of DGs, as described with respect to FIG. 9; and enables implementation of graph algorithms for fault detection/clearance operations as described with regard to FIG. 10.

The VEN 200 corresponds to the VEN 105 discussed with regard to FIG. 1. The VEN 200 is a graph data structure that mathematical represents the couplings or interconnections of all the producers and consumers in a grid, such as the physical electrical network 101. A "graph" in this context refers to a data structure or data type that comprises a number of (or set of) nodes (also referred to as "vertices," "points," or "objects"), which are connected by a number of (or set of) edges, arcs, or lines. In the example of FIG. 2, the VEN 200 includes 10 nodes including utility grid 201, diesel generator 202, diesel generator 203, SPV 204, low priority node 211, and high priority node 212, appliance 221, appliance 222, appliance 223, and appliance 224. Additionally, the utility grid 201 is connected to the SPV 204 by edge 231; the SPV 204 is connected to the low priority node 211 by edge 232 and connected to the high priority node 212 by edge 233; the low priority node 211 is connected to diesel generator 202 via edge 234 and connected to appliances 221 and 222 via edge 236; the high priority node 212 is connected to diesel generator 203 via edge 235 and connected to appliances 223 and 224 via edge 237; appliances 221 and 222 are connected to one another via edge 238; and appliances 223 and 224 are connected to one another via edge 239. The aforementioned edges 231-237 may also be referred to as "virtual couplings" or "virtual electrical couplings."

A graph may be undirected or directed. The VEN 200 of FIG. 2 is an undirected graph, wherein the edges have no orientation and/or pairs of nodes are unordered. In other embodiments, the VEN 200 may be a directed graph in which edges have an orientation, or where the pairs of vertices are ordered. In these embodiments, the directed graph may show the flow of current through the electrical network. An edge has two or more vertices to which it is attached, called endpoints. Edges may be directed or undirected; undirected edges are referred to as "lines" and directed edges are referred to as "arcs" or "arrows." The two or more vertices forming an edge may be referred to as the "endpoints" of that edge, and the edge is said to be incident to the vertices. In the VEN 200, the edges are virtual electrical couplings that represent physical electrical couplings of the physical electrical network 101.

Generally, circles or ovals in a graph, such as utility grid 201, diesel generator 202, diesel generator 203, SPV 204, and appliances 221-224, represent random quantities, which may be observed at some point in time and consequently change. These circle or oval nodes are referred to as probabilistic nodes, and each of these nodes may be attached to a conditional probability (density) function. The conditional probability (density) function is a function of the state of the node as well as the states of adjacent nodes. Additionally, the double circle (or double oval) nodes in the VEN 200, such as low priority node 211 and high priority node 212, represent deterministic nodes, which are nodes with only one possible state given the state of the adjacent nodes. In other words, the double circle (or double oval) nodes denote a deterministic function of all adjacent nodes. In the example of FIG. 2, the diesel generator 203, appliance 223, and appliance 224 are considered high priority nodes by virtue of their connection to high priority node 212; and the diesel generator 202, appliance 221, and appliance 222 are considered low priority nodes by virtue of their connection to low priority node 211.

In the example of FIG. 2, VEN 200 includes multiple virtual nodes, each of which correspond to one or more individual physical nodes For example, the VEN engine 105 may be configured to aggregate a group of low priority physical nodes and treated as one low priority virtual node while other nodes are grouped as a high priority node. The computations performed for reconfiguring the physical electrical network 101 with these aggregated virtual nodes may substantially reduce the complexity of the computation, making the management of the physical electrical network 101 more practical. In these embodiments, the double circle (or double oval) nodes may be a virtual node that represents the aggregation of multiple high (or low) priority physical nodes. In some embodiments, the use of the EMS 100 may configure the EMS 100 (e.g., using a suitable user interface) to aggregate one or more desired physical nodes together to form a single virtual node or use them individually. In these embodiments, the EMS 100 may be embedded with various configurable parameters so that various physical nodes can be aggregated or de-aggregated during operation of the EMS 100. Furthermore, the aggregation of resources may be application (or deployment) dependent. In one example, when the EMS 100 is deployed for a microgrid, the owner/operator of the microgrid may aggregate physical nodes because the user/owner of the microgrid may not be concerned about the performance of individual appliances. In this example, the owner/operator of the microgrid may configure the EMS 100 to aggregate individual appliances in different rooms, such as aggregating all kitchen appliances into a single virtual node, all appliances in a family room into another virtual node, and so forth. In another example, when the EMS 100 is deployed for a macrogrid, physical nodes may not be aggregated because the operator of the macrogrid (e.g., a municipality or privatized public utility operator) may consider monitoring and control of individual physical nodes to be important.

Figure 3:
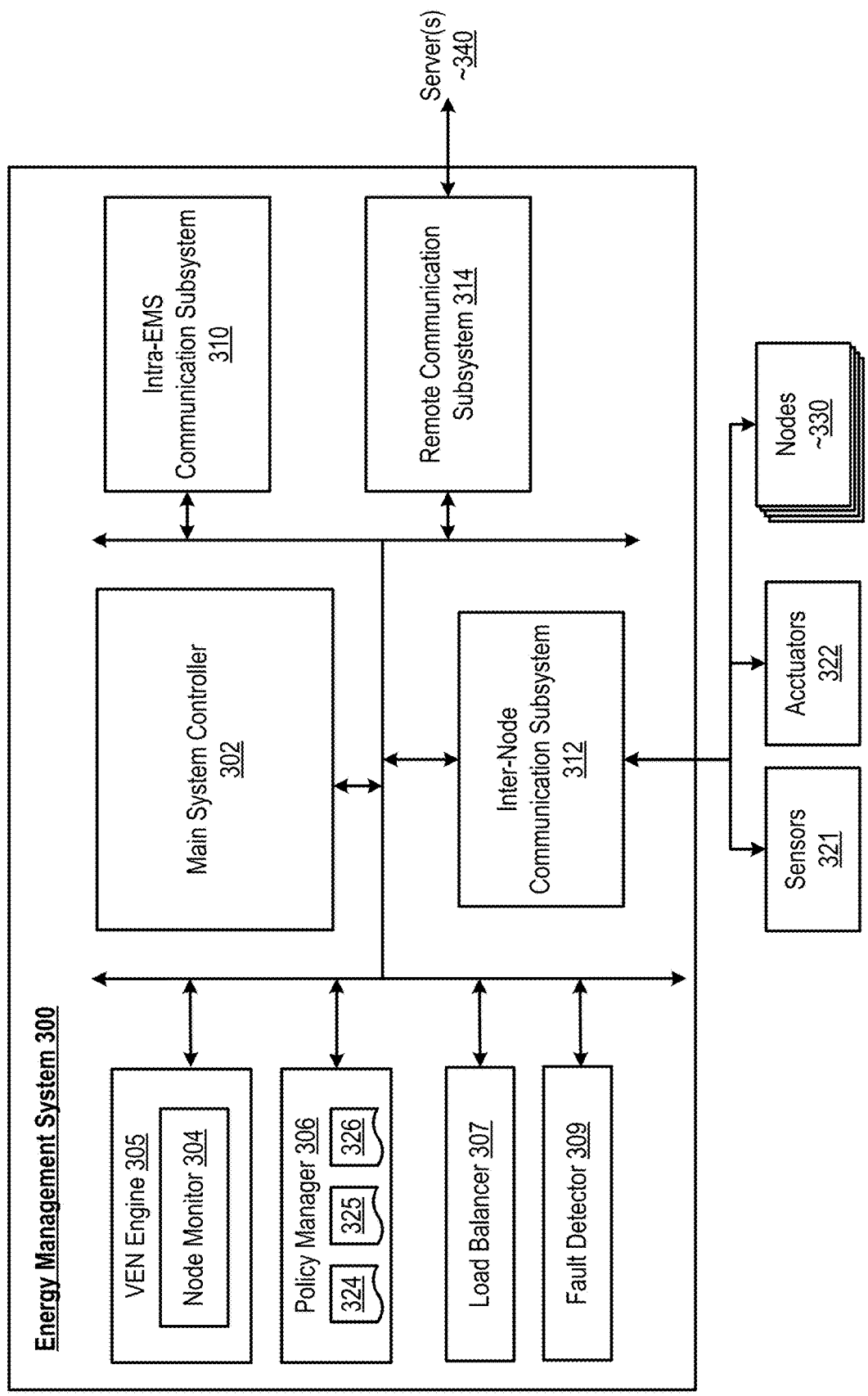
FIG. 3 illustrates an example energy management system (EMS) in accordance with various embodiments.

Referring now to FIG. 3, wherein a component view of an example energy management system (EMS) 300, according to various embodiments, is illustrated. In embodiments, the energy management system 300 may be the EMS 100 as discussed with regard to FIG. 1. In some embodiments, the EMS 300 may be included in an EMS appliance or gateway device, which is discussed in more detail infra (see e.g., FIG. 9). In other embodiments, some or all of the aspects of the EMS 300 may be hosted by a cloud computing service, which interacts with individual equipment or one or more deployed EMS appliances or gateways. As shown, the energy management system 300 includes main system controller 302, VEN engine 305, policy manager 306, load balancer 307, and fault detector 309. Additionally, the EMS 300 includes an intra-EMS communication subsystem 310, inter-node communication subsystem 312, remote communication subsystem 314, sensors 321, and actuators 322. The VEN engine 305, load balancer 307, and fault detector 309 are the same or similar to the VEN engine 102, load balancer 110, and fault detector 115, respectively, of FIG. 1. In other embodiments, energy management system 300 may include more or less subsystems than are shown by FIG. 3.

The main system controller 302 is configured to manage the EMS 300, such as by scheduling tasks for execution, managing memory/storage resource allocations, routing inputs/outputs to/from various entities, and the like. The main system controller 302 may schedule tasks according to a suitable scheduling algorithm, and/or may implement a suitable message passing scheme to allocate resources. In some embodiments, the main system controller 302 may operate a real-time operating system (OS) to allocate computing, memory/storage, and networking/signaling resources, such as those discussed herein. In addition, the main system controller 302 may implement an automation system application to maintain a network of interconnections among the individual nodes 330. In such embodiments, the main system controller 302 is configured to perform the functions of the configuration controller 120 discussed with regard to FIG. 1. The main system controller 302 is also configured to control communication of application layer information between nodes 330, such as sending/receiving requests for data (e.g., measurement data) and sending instructions/commands for changing a mode of operation or state. In some embodiments, the application layer information may include information about the particular nodes that should be included in VEN analysis, such as a user selection of individual physical nodes to be analyzed for inclusion in the VEN 105. The main system controller 302 may also be configured to control storage of information about the electrical network, which includes acting as the trust center and being the repository for security keys.

Continuing with the example of FIG. 3, the VEN engine 305 includes a node monitor 304. The node monitor 304 is a subsystem responsible for monitoring performance and resources of the nodes 330, sensors 321, and actuators 322 in the physical electrical network 101. What constitutes the physical electrical network 101 may be application dependent, and varies from embodiment to embodiment. In some embodiments, the size of the physical electrical network 101 assessed may be configurable by a user, the manufacturer of the EMS 300, or a developer of the EMS 300. The node monitor 304 is also responsible for identifying or determining static and dynamic parameters of the nodes 330, sensors 321, and actuators 322, and/or the hardware and software subsystems implemented by the nodes 330, the sensors 321, and the actuators 322. According to various embodiments, the node monitor 304 continuously monitors the node(s) 330 and identifies static and dynamic parameters of the node(s) 330. In particular, the node monitor 304 is configured to generate an energy consumption profile 324 based on the monitored static and dynamic parameters, and control storage of the energy consumption profile in the policy manager 306.

In order to determine the static and dynamic parameters, the node monitor 304 is configured to receive sensor data from sensors 321, actuator data from actuators 322, and node data from node(s) 330 with the assistance of inter-node communication subsystem 312. In some embodiments, the node monitor 304 is configured to receive sensor/actuator/node data held by one or more remote servers 340 with the assistance of remote communication subsystem 314, and could also receive sensor/actuator/node data held by surrounding infrastructure (e.g., routers, base stations, etc.) with the assistance of inter-node communication subsystem 312 or remote communication subsystem 314. In embodiments, the node/sensor/actuator data may indicate the dynamic parameters discussed previously. For example, as discussed in more detail infra, the node data may include electrical measurements as measured by respective nodes 330; the sensor data may include data about events or changes in an environment as captured by the sensors 321; and the actuator data may include data about a state or mode of operation of the actuators 321. Furthermore, the sensor/actuator/node data may indicate a positions/location of the individual nodes 330, sensors 321, and actuators 322 in the physical electrical network 101. As discussed in more detail herein, the VEN engine 305 is configured to generate individual instances of the VEN 105/200 using these dynamic parameters.

The nodes 330 may correspond to one or more physical sources or loads equipped with radio or wired communication circuitry, or physical sources/loads that share radio/wired communication circuitry. Some or all of the nodes 330 may include electricity sensing elements for measuring electricity being produced or consumed by that node 330, or is coupled to a suitable electricity sensor 321. The electricity sensing elements/sensors 321 may include known elements such as electromechanical electricity meters, Seebeck effect devices, hall effect integrated circuits (ICs), fiber optic current sensor (FOCS), metering circuitry including for example, digital signal processors (DSPs), analog-to-digital (ADC) converters, special-purpose microprocessors, and the like. In these embodiments, the nodes 330 are configured to generate node data, and transmit the node data to the EMS 300 upon request or on a periodic basis using the radio/wired communication circuitry. In embodiments, the node data includes values or data for one or more dynamic parameters, such as electrical measurements or other information discussed herein. In some embodiments, the node data may also include information about a position or location of the nodes 330 within the electrical grid.

Some or all of the nodes 330 may include a system monitor configured to monitor system resources and performance of the nodes 330, and to identify detailed information about the hardware and software subsystems implemented by the nodes 330. These system monitors are configured to monitor and compile information about installed hardware devices (e.g., individual sensors 321 and individual actuators 322 embedded or attached to the nodes 330), drivers, applications, system settings, system software programs, AI agents, kernel extensions/modules, etc. implemented by the nodes 330. The compiled information indicates current state information, such as current processor usage, current processor frequency, current processor temperature, currently running processes or tasks, current memory utilization and/or available memory space, memory Self-Monitoring Analysis and Reporting Technology (SMART) indicators, system uptime, current network addresses (e.g., IP addresses or the like), current network connections, battery charge, fuel levels, system name or identifier(s), user identifier(s), the date and time, position/location information (e.g., including geolocation coordinates), etc. The system monitor is also configured to compile the system information into a suitable format (e.g., plain text, rich text format (RTF), XML, JSON, etc.), and to export the compiled information. The compiled information may be provided to the individual subsystems in response to the requests from the individual subsystems, and the compiled information is also provided to a suitable subsystem of the node 330 to be communicated to the EMS 300. The node monitor 304 is also configured to determine event information about individual loads based on the measured/sampled signals, and/or determined measurement values. The event information may include, for example, times when a load is turned on or off, enters an active mode from a sleep mode or vice versa, draws additional current or voltage in comparison to a threshold or mean/average amount of current/voltage, or other like event information. In these embodiments, the node monitor 304 is configured to compile the event information, as well as the measurement/sample data into a suitable format, and provide that data to the other subsystems of the EMS 300 and/or remote servers 340.

The one or more sensors 321 include devices that are configured to measure and/or detect a change in a state or a surrounding environment, and provide sensor data representative of the detected/measured changes to the EMS 100. The VEN engine 305 is configured to use the sensor data for generating the VEN 105/200 and/or for storing the sensor data in respective virtual nodes as static or dynamic parameters as discussed previously.

In some embodiments, the sensors 321 include one or more power sensors, which are designed for specific power requirements and thesholds based on a maximum power to be drawn by a portion of the electrical network 101. The power sensors may include, for example, voltage, current, and power quality sensors. In one example, the power sensors may include a Hall effect voltage sensor and/or Hall effect integrated circuits (ICs), which are sensors that measures direct current and alternating current voltages with different wave forms based on the Hall effect and magnetic compensation principle. In another example, the power sensors 321 may include current transducers, which combine a current transformer with a signal conditioner into a single package for current monitoring or logging applications. Other examples of power sensors 3221 may include electromechanical electricity meters, Seebeck effect devices, fiber optic current sensor (FOCS), metering circuitry including for example, digital signal processors (DSPs), analog-to-digital (ADC) converters, special-purpose microprocessors, and the like. In some embodiments, the power sensors 321 may include a smart power meter comprising combination of voltage sensors, current sensors, microprocessors or microcontrollers, and wired/wireless communication circuitry. The particular power sensors used may be based on the power requirements of a grid 101 and may vary from embodiment to embodiment.

In some embodiments, the sensors 321 include one or more motion capture devices that are configured to capture motion by detecting a change in position of a body (e.g., a user) relative to its surroundings (e.g., one or more objects surrounding the user), or by detecting a change in the surroundings relative to the body. These sensors 321 are configured to measure the strength and/or speed of the body's motion, or motion may be detected by sound, opacity, reflection of transmitted electromagnetic energy (i.e., light), and/or other like means of detecting motion. In some embodiments, the sensors 321 include one or more optical cameras and/or one or more thermographic (infrared) cameras, which are configured to form images using infrared radiation. Such infrared cameras may be similar to optical-lens cameras, which form images using visible light, but instead operate in wavelengths in the infrared range of the electromagnetic spectrum. The one or more infrared cameras, sensors 321 may also include an infrared projector and/or infrared laser projector, which is configured to project an infrared beam at one or more targets, such as one or more portions of a user and/or one or more objects surrounding the user, and the one or more infrared cameras are configured to sense a reflection of the infrared beam being reflected off the one or more targets. These sensors 321 may be used for controlling lighting systems, temperature control systems, and security systems when the EMS 300 is used for a microgrid deployed in a residential or commercial building. For example, a lighting control system may dim lights during certain hours in one or more rooms of a building (e.g., a shared office space, laboratory, or warehouse), and when the sensors 321 detect that someone has entered the room, the lights corresponding to the location in which the person is detected can be brightened to provide sufficient illumination. In this example, the EMS 300 may obtain this sensor data from the lighting control system, and provide data to the lighting control system to influence or change the hours for dimming the lights. The EMS 300 in this example may also reconfigure the microgrid to provide electricity to power the lighting control system and the lighting system from different electricity sources during different times of the day.

Figure 11:
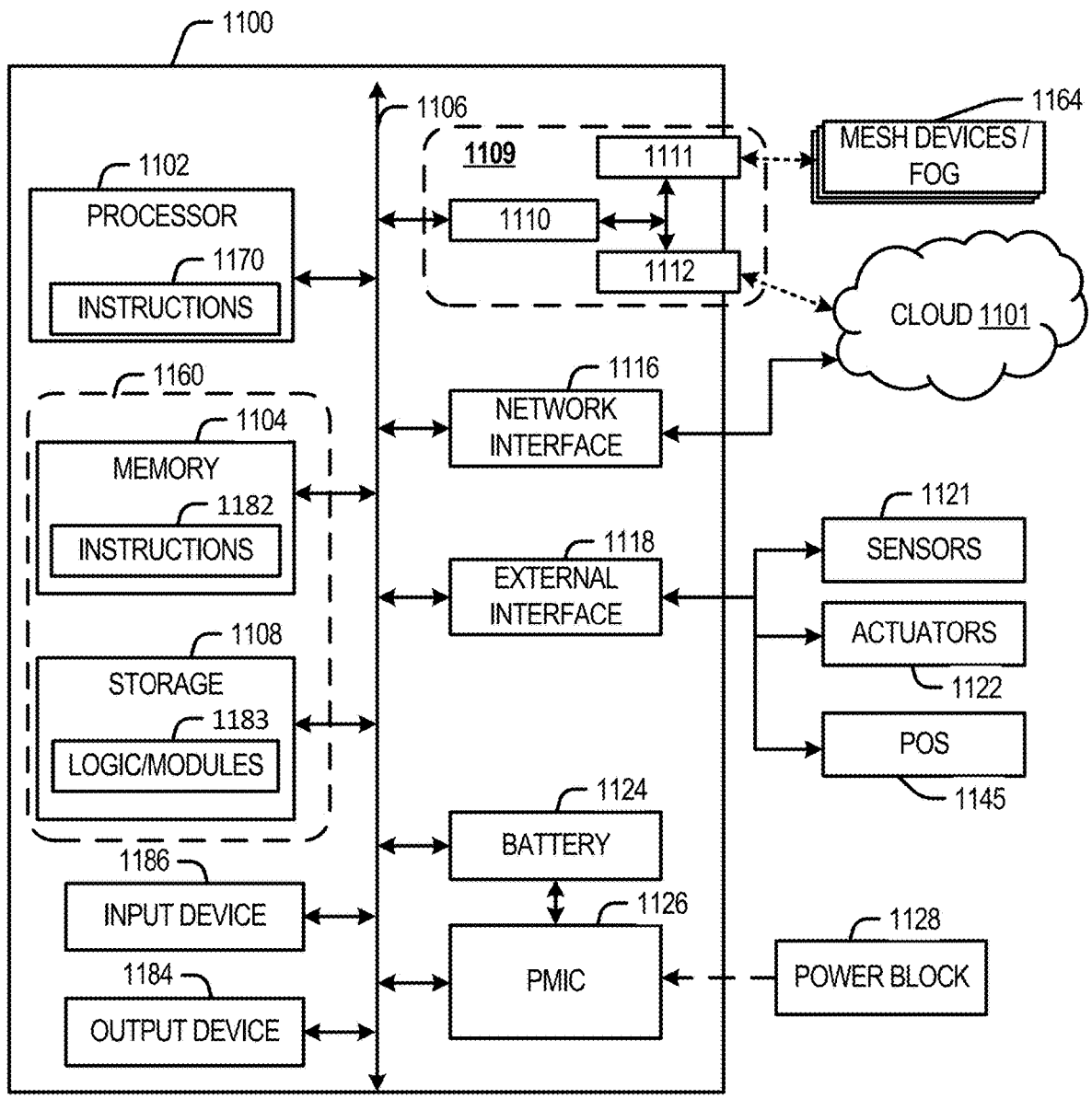
FIG. 11 illustrates an example implementation of a computing architecture, in accordance with various embodiments.

Sensor data from sensors 321 (and sensor data held by node(s) 330) may include temperature readings collected by temperature sensor(s) 321, humidity readings collected by humidity sensor(s) 321, lighting measurements collected by light sensor(s) 321, images collected by image capture devices 321 (e.g., cameras), communication channel conditions measured communication circuitry of a sensor 321, position and/or orientation data collected by accelerometers, gyroscopes, gravimeters, magnetometers, etc., and other like data of other sensors 321, such as those discussed herein (see e.g., discussion of FIG. 11 infra). This sensor data may also include sensor data from various control systems in the physical electrical network 101, such as those discussed herein (see e.g., discussion of FIG. 11 infra). Sensor data held by remote servers 340 (and sensor data held by surrounding infrastructure) may include sensor data of the surrounding area, and may also include other types of sensor data of sensors 321 not included in/on nodes 330. In some cases, different sensors 321 may be combined and/or housed in/on a single device. For example, a temperature sensor and accelerometer could be combined within a single device for use in factory or industrial plant monitoring applications. In embodiments, the VEN engine 305 is configured to process the sensor data to determine the location of individual nodes 330 in the physical electrical network 101, and to determine measurements/parameters of those nodes. In embodiments, the load balancer 307 is configured to use the sensor data to determine optimal electrical couplings.

The actuators 322 are devices that are responsible for moving and controlling a mechanism or system. The actuators 322 are configured to receive control signals from the EMS 300 via the inter-node communication system 312, and convert the signal energy (or some other energy) into an electrical and/or mechanical motion. The control signals may be relatively low energy and may be electric voltage or current, pneumatic, or hydraulic fluid pressure. In embodiments, the actuators 322 comprise electromechanical relays and/or solid state relays, which are configured to switch electronic devices on/off and/or control motors. The relays may also be placed in different sections of the physical electrical network 101 to block or facilitate the flow of current. In some embodiments, the actuators 322 comprise infra-red (IR) modules to support IR communication that can control various electronic devices (e.g., TVs, air conditioners, etc.).

In addition or alternative to using measurements provided by individual nodes 330, in some embodiments the node monitor 304 is configured to perform energy disaggregation. Energy disaggregation is a process/procedure of estimating the power/electricity demand of individual loads from an aggregate power/electricity consumption. In these embodiments, the node monitor 304 is configured to sample voltage signals and/or current being feed into a building or some set of equipment or infrastructure (e.g., by measuring/monitoring voltage/current of each main in an electrical panel) at different time intervals or frequencies, and determine measurement values from the sampled signals, such as root mean square (RMS) or peak of real power, reactive power, power factor, power quality, apparent power, phase between the voltage and current, or other like electrical measures. In these embodiments, the sampled signals may be based on observable patterns, steady state transitions, and current and/or voltage harmonics.

In some embodiments, the node monitor 304 is configured to perform nonintrusive load monitoring (NILM). Energy disaggregation and/or NILM is a process/procedure of estimating the power/electricity demand of individual loads from an aggregate power/electricity consumption. NILM may be considered to be a type of energy disaggregation. In these embodiments, the node monitor 304 is configured to analyze changes in voltage and current going into a building or being fed to some set of equipment/infrastructure, and deduce the particular loads that are being used including their respective energy consumption. In one example of this embodiment, the node monitor 304 is configured to measure reactive power and real power, and may distinguish different loads from one another based on their complex impedance or actions that take place when voltage or current is applied to individual loads. In another example of this embodiment, the node monitor 304 is configured to model individual loads as finite state machines, and differentiate different loads from one another based on the changes in power draw of each load. In various embodiments, the deduced energy consumption for each load may be stored in an energy consumption profile 324 data structure or database object.

Continuing with the example of FIG. 3, the VEN engine 305 is configured to generate a VEN 105/200 of a physical electrical network 101 based on data generated or otherwise determined by the node monitor 304. For example, the VEN engine 305 may generate a VEN 105/200 using an energy consumption profile 324 generated by the node monitor 304. In these embodiments, the VEN engine 305 may generate individual instances of a VEN 105/200 at a predetermined interval, and may populate the individual instances of the VEN 105/200 with the data obtained based on the monitoring. The VEN engine 305 may generate the VEN 105/200 as discussed previously with regard to FIG. 1. At each instance of time (or at a predetermined interval), the VEN engine 305 is configured to re-evaluate the VEN 105/200, generate a new instance of the VEN engine 305, and instructions/commands to reconfigure the electrical couplings in the physical electrical network 101 may be generated based on the new instance of the VEN 105/200. In various embodiments, the new instance of the VEN 105/200 that is generated replaces the older instance of the VEN 105/200 where the virtual nodes still remain but the topology by which they are connected are changed, which is determined by an appropriate MST algorithm, such as the MST algorithms mentioned herein. In some embodiments, the new instance of the VEN 105/200 that is generated may include one or more aggregated virtual nodes (e.g., depending on user configured parameters) with a new topology of virtual couplings, which is also determined using one or more MST algorithms as discussed previously.

In embodiments, the VEN engine 305 is configured to utilize a suitable graph algorithm or graph drawing algorithm to generate the VEN 200 (see e.g., FIG. 2), such as a force-directed graph drawing algorithm, a spectral layout algorithm, or the like. Additionally, the VEN engine 305 is configured to classify the sources and loads in the VEN 105/200 according to priority and/or some other suitable policy objectives. In embodiments, the VEN engine 305 is configured to assign weight values, which correspond to the priorities, to each of the nodes and/or each of the edges. In such embodiments, the VEN engine 305 is configured to store the weights in graph activation matrices of the virtual nodes in the VEN 105/200. The graph activation matrix of a node defines the output of that node given an input or set of inputs, and the output is then used as an input for another virtual node coupled thereto, and so on.

The VEN engine 305 is configured to operate or execute an active node detection algorithm to detect the presence of loads and sources in the VEN 105/200. The active node detection algorithm may detect contemporary electric loads among the virtual energy consumer nodes and electric energy produced among the virtual energy source nodes. Using the active node detection algorithm may allow the user/owner of the electrical grid to integrate new sources (e.g., DGs, RESs, etc.) and new loads (e.g., equipment, appliances, etc.) into the electrical grid with minimal complexity. In various embodiments, the active node detection algorithm may be a minimum tree spanning (MST) algorithm, which is used to generate an MST from the VEN 105/200. An MST is a subset of vertices and/or edges in a weighted graph that connects all vertices together without cycles and with a minimum possible total weight. MST algorithms are greedy algorithms that are not time intensive as they operate with logarithmic time complexities making them much more efficient than standard available EMSs. Example MST algorithms that can be used are shown by table 1.

TABLE 1 example MST algorithms

| Algorithm | Time Complexity | Type of Electrical Network |
|---|---|---|
| Prim's Algorithm | O(E logV); becomes linear as the network grows | Large Networks (e.g. primary and/or secondary networks) |
| Kruskal's Algorithm | O(E logV) | Small networks (e.g., microgrids) |
| Boruvka's Algorithm | O(E) in randomised graphs | Any type of network |

In table 1, the "O" in the Time Complexity column (e.g., "O" in "O(E log y)") refers to the use of Big O notation, which is a mathematical notation that describes the limiting behavior of a function when the argument tends towards a particular value or infinity. The Big O notation is often used to classify algorithms according to how their running time or space requirements grow in size as the input size grows. The "E" in the Time Complexity column (e.g., "E" in "O(E log V)") refers to the number of edges, and the "V" in the Time Complexity column (e.g., "V" in "O(E log V)" refers to the number of vertices (or nodes). It should be noted that the time complexity of each algorithm may vary based on the memory structures used when operating the algorithms. For example, the time complexity for Prim's Algorithm in table 1 is based on the data structure comprising a binary heap and adjacency list. Other MST algorithms not shown by table 1 may be used in other embodiments.

Continuing with the example of FIG. 3, the load balancer 307 is configured to determine the virtual electrical couplings between the virtual energy consumer nodes and corresponding ones of the virtual energy sources in the VEN 200/105 based on load balancing criteria 325. The load balancing criteria 325 may indicate information for energy resource conservation, such as peak and non-peak electricity usage periods for certain geographic regions and/or utility grid customers, electricity price per unit data for different time periods/intervals, source state data (e.g., indicating when one or more power sources is functioning or not functioning), electricity demands or usage data for loads (e.g., indicating the amount of electricity different loads require at different times of the day, etc.), and/or other like information. In embodiments, the load balancing criteria 325 is stored by the policy manager 306, and the load balancer 307 may obtain the load balancing criteria from the policy manager 306 with the assistance of intra-EMS communication subsystem 310. The load balancer 307 is also configured to generate load balancing instructions to reconfigure the electrical couplings of physical nodes based on the determined virtual electrical couplings.

Continuing with the example of FIG. 3, the fault detector 309 is configured to detect and remove faulty nodes. The fault detector 309 may be configured to empirically determine the type of information that needs to be known to determine or detect faulty nodes. The faulty nodes can be determined using empirical data or a combination of empirical and observed data including the adherence or deviation from common rules and policies. In these embodiments, the fault detector 309 performs an empirical analysis using metrics and results of observations rather than using mathematically describable relationships. Additionally, in these embodiments, the fault detector 309 is configured to use the observations and context information of previous faults and identify patterns and behavior based on those past observations.

The fault detector 309 is configured to operate one or more node search algorithms to traverse the VEN 200 to detect or discover the faulty nodes. In these embodiments, the search algorithm may cause the fault detector 115 to process (monitor) individual nodes along one or more paths in the VEN 200. A path is a sequence of nodes where each consecutive pair in the sequence is connected by an edge. In a first example, a BFS algorithm may be used wherein the fault detector 115 starts from a selected node, such as a faulty node, and explores all neighboring nodes at a present depth prior to moving on to the nodes at the next depth level. In a second example, a DFS algorithm may be used wherein the fault detector 115 starts from a selected node, such as a faulty node, and traverses each edge in the VEN 200 by exploring as far as possible along each branch from the starting node before backtracking. In either example, the fault detector 115 may be configured to traverse the VEN 200 in order of likely importance (or priority) using a priority queue (e.g., a queue where elements with higher priority are served before elements with low priority) or by starting with a highest priority node.

When a faulty node is detected, the fault detector 309 isolates that node from the electrical grid. In some cases, isolating the faulty node may require disconnecting the faulty node and one or more other nodes from the electrical network in order to avoid the fault from negatively affecting other nodes in the electrical network. In these cases, the fault detector 309 is configured to operate a shortest path algorithm to determine a shortest path between a faulty node and one or more other virtual nodes in the VEN 200. A shortest path is a path having a smallest possible sum of its constituent edges or nodes. As examples, the shortest path algorithm may be Dijkstra's algorithm, Johnson's algorithm, Floyd-Warshall algorithm, A* search algorithm, Viterbi algorithm, and/or the like. This is done to isolate the minimum number of nodes connected to the faulty node, and to drive excess current back to the electrical grid. The shortest path algorithm may also be used to identify alternative paths for reconfiguring the electrical grid when the faulty node is removed or decoupled from the electrical grid. Additionally or alternatively, the various algorithms used by the load balancer 307 may also be used by the fault detector 309 to determine how to reconfigure the electrical network.

Continuing with the example of FIG. 3, the policy manager 306 is configured to store energy consumption profiles 324, load balancing criteria 325, and policies 326, which are used for the operation of the EMS 300 and/or for the VEN generation, load balancing and/or fault detection embodiments discussed herein. The energy consumption profiles 324 are data structures, database objects, or some other representation of data as collected by individual nodes 330, sensors 321, and actuators 322. The energy consumption profiles 324 may also include information based on analysis of the collected data. Different analysis techniques may be used, such as event-based, statistical, instrumented, simulation, etc. The load balancing criteria 325 define criteria to be used by the load balancer 307 for determining virtual electrical couplings between one or more virtual energy sources and one or more loads in the VEN 105/200, and the like. The load balancing criteria 325 may be based, at least in part by, the energy consumption profiles 324, and may include electricity/energy price-per-unit data, peak and/or non-peak energy usage data, priority data of each node 330, and/or other like data. The load balancing criteria 325 may also be dynamically changed or updated based on changes/ updates to energy consumption profiles 324. The policies 326 (also referred to as "metadata 326", "profiles 326", "manifests 326", or the like) define a set of rules that govern the behavior of the EMS 300, and the various subsystems of the EMS 300, when creating and analyzing the VEN 102/ 200 as well as behaviors for reconfiguring various elements of the physical grid. For example, one or more of the policies 326 may define the real world data that should be collected and virtualized by the VEN engine 305. In another example, one or more of the policies 326 may define criteria to be used by the fault detector 309 for determining whether or not a node should be declared a faulty node, when and how to remove the faulty node, and the like. In another example, one or more of the policies 326 may define criteria to be used by the load balancer 307 for determining which type of data to prioritize when determining new/different virtual electrical couplings.

The various criteria of the load balancing criteria 325 and the policies 326 may include, for example, algorithms, weight factors for individual pieces of data, analysis techniques/functions, system rules, policy definitions, machine learning models/algorithms, etc. In some embodiments, the load balancing criteria 325 and policies 326 may include executable code, which can include software modules or computational logic which, when operated by the VEN engine 305, load balancer 307, and/or fault detector 309, analyzes monitored node data and/or the VEN 105/200 for generating instances of the VEN 105/200, load balancing calculations, and fault detection/clearance. In some embodiments, the load balancing criteria 325 and/or policies 326 may define one or more actions and the conditions under which the actions are executed. In one example, the load balancing criteria 325 defines one or more actions that the load balancer 307 is to take when a new source or load is added to the VEN 105/200. In another example, a policy 326 may define actions that the fault detector 309 should take when a certain a faulty node is detected. In these embodiments, the policy 326 may include the necessary instructions or commands for operating the EMS 300, sensors 321, actuators 322, or the like. In some embodiments, the policies 326 may define the number and/or types of nodes 330 that should be monitored by the EMS 300 and/or included in the VEN 105, which may be based on user-defined criteria or some other type of selection criteria. In some embodiments, the policies 326 may define permissions for sharing data with nodes 330, remote servers 340, or otherwise granting access to the EMS 300, which may be based on permissions set for different trust levels and/or capabilities of the EMS 300.

The load balancing criteria 325 and policies 326 may be formed of any of the programming languages, markup languages, schema languages, etc. discussed herein. In some embodiments, the load balancing criteria 325 and policies 326 comprise documents or data structures in a format that can be interpreted by the subsystems of energy management system 300, such as XML (or any variation thereof), JSON, markdown (or any variation thereof), IFTTT ("If This Then That"), PADS markup language (PADS/ML), routing policy language (RPL), Click router configuration language, Nettle, and/or some other suitable data format, such as those discussed herein. The documents or data structures that make up the load balancing criteria 325 and policies 326 may be developed or defined by an owner/operator of the EMS 300. In one example, a developer may write the policies using a suitable development tool/environment and/or in any combination of one or more programming languages, such as those discussed herein. In another example, the load balancing criteria 325 and policies 326 may be generated by an application implemented by the servers 340 based on various selections within a user interface or the like. In these examples, the load balancing criteria 325 and policies 326 may be provisioned or otherwise loaded into the policy manager 306, with the assistance of the remote communication subsystem 314 and main system controller 302, so that these documents may be utilized by the other subsystems of the EMS 300. New or updated versions of load balancing criteria 325 and policies 326 may be provisioned or loaded to the EMS 300 synchronously (e.g., where the main system controller 302 periodically polls the remote server(s) 340 for updates) or asynchronously (e.g., where the remote server(s) 340 push updated or new load balancing criteria 325 and policies 326 to the EMS 300 when created or when instructed by the owner/operator of the EMS 300). The documents or data structures of the load balancing criteria 325 and policies 326 may comprise a "description," which is a collection of software modules, program code, logic blocks, parameters, rules, conditions, etc. that may be used by one or more subsystems of the EMS 300 to control and/or monitor the sensors 321 and/or actuators 322, as well as share data with various resources.

As alluded to earlier, inter-node communication subsystem 312 is configured to facilitate communication with sensors 321, actuators 322, and nodes 330. In particular, inter-node communication subsystem 312 is configured to receive data from sensors 321, actuators 322, and nodes 330, and transmit commands to sensors 321, actuators 322, and nodes 330 for operation/control of the sensors 321, actuators 322, and nodes 330. Example of commands to sensors 321, actuators 322, and nodes 330 may include, but are not limited to, calibration commands, commands to collect certain sensor/actuator/node data that are collected on demand (as opposed to being collected continuously or on a periodic basis), and/or commands to change a position or orientation of a particular sensor 321, actuator 322, and/or node 330. In some embodiments, inter-node communication subsystem 312 is configured to support inter-device communication in accordance with one or more industry standards, such as cellular specifications provided by the Third Generation Partnership Project (3GPP) New Radio (NR) and/or Long Term Evolution (LTE) standards, a Local Area Network standard such as WiFi specified by a suitable IEEE 802.11 standard or Ethernet specified by a suitable IEEE 802.3 standard, a short-range communication standard such as ZigBee, Z-Wave or the like, or some other suitable standard or combination(s) thereof. For some of these embodiments, the node monitor 304 and/or VEN engine 305 is further configured, with the assistance of inter-node communication subsystem 312, to scan and discover whether the nodes 330 support a particular inter-device communication industry standard. For WiFi implementations, the scan could include, for example, performing energy detection (ED) during a listen-before-talk (LBT) operation to detect an unoccupied channel. For LTE/NR implementations, the scan could include, for example, receiving a Radio Resource Control (RRC) configuration message indicating whether network resource allocation or autonomous resource selection is to be used, identifying resources for communicating sidelink control information (SCI) when network resource allocation is configured, performing an ED-based sensing operation to reserve resources for communicating SCI when autonomous resource selection is configured, and transmit or receive SCI over the identified/reserved resources. Further, main system controller 302 may be configured, with the assistance of inter-node communication subsystem 312, to authenticate the node(s) 330, confirming that some or all of the node(s) 330 include suitable communications and autonomic capabilities. Upon authentication of the other node(s) 330, the main system controller 302 may control the inter-node communication subsystem 312 to exchange authentication information, including identification and/or security information. In some embodiments, this information may be exchanged in a secure manner, in accordance with a security protocol specified by the mutually supported communication standard. For example, the authentication information may be encrypted prior to transmission to the node(s) 330 or the like.

In some embodiments, the subsystems of the EMS 300 are implemented as artificial intelligence (AI) agents, which are autonomous entities configured to observe environmental conditions and determine actions to be taken in furtherance of a particular goal and based on learnt experience (e.g., empirical data). The particular environmental conditions to be observed, the actions to taken, utility measures, etc., may be based on an operational design domain (ODD). An ODD includes the operating conditions under which a given AI agent or feature thereof is specifically designed to function. An ODD may include operational restrictions, such as environmental, geographical, and time-of-day restrictions, and/or the requisite presence or absence of certain conditions or characteristics.

In embodiments, the AI agents are implemented as autonomous software agents, implemented using individual hardware elements, or a combination thereof. In an example software-based implementation, the AI agents may be developed using a suitable programming language, development tools/environments, etc., which are executed by one or more processors of the EMS 300. In this example, program code of the AI agents may be executed by a single processor or by individual processing devices. In an example hardware-based implementation, each AI agent is implemented in a respective hardware accelerator (e.g., FPGA, ASIC, DSP, etc.) that are configured with appropriate bit stream(s) or logic blocks to perform their respective functions. The aforementioned processor(s) and/or hardware accelerators may be specifically tailored for operating AI agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like. In embodiments, individual AI agents are configured to control respective subsystems of the EMS 300, some of which may involve the use of one or more actuators 322 and/or one or more sensors 321. In these embodiments, the actions to be taken and the particular goals to be achieved may be specific or individualized based on the subsystem itself. Additionally, some of the actions or goals may include non-resource operation related tasks depending on the particular context in which an AI agent is implemented.

To observe environmental conditions, the AI agents are configured to receive, or monitor for, sensor data from sensors 321 via intra-EMS communication subsystem 310, and to receive actuator data from the actuators 322 of the EMS 300 via intra-EMS communication subsystem 310. The act of monitoring may include capturing CSD and/or sensor data from individual sensors 321 and actuators 322. Monitoring may include polling (e.g., periodic polling, sequential (roll call) polling, etc.) one or more sensors 321 for sensor data and/or one or more actuators 322 for actuator data for a specified/selected period of time. In other embodiments, monitoring may include sending a request or command for sensor/actuator data in response to an external request for sensor/actuator data. In some embodiments, monitoring may include waiting for sensor/actuator data from various sensors/actuators based on triggers or events. The events/triggers may be AI agent specific, and may vary depending of a particular embodiment. In some embodiments, the monitoring may be triggered or activated by an application or subsystem of the energy management system 300 or by a remote device, such as or server(s) 340 or node(s) 330.

To determine actions to be taken in furtherance of a particular goal, each of the AI agents are configured to identify a current state (context) of individual nodes 330, individual subsystems of the EMS 300, and/or the AI agent itself, identify or obtain one or more models, identify or obtain goal information, and predict a result of taking one or more actions based on the current state (context), the one or more models, and the goal information. The one or more models may be any algorithms or objects created after an AI agent is trained with one or more training datasets, and the one or more models may indicate the possible actions that may be taken based on the current state (context). The one or more models may be based on the ODD defined for a particular AI agent. The current state (context) is a configuration or set of information in the EMS 300, or a measure of various conditions in the EMS 300 or one or more other subsystems of the EMS 300. The current state (context) is stored inside an AI agent and is maintained in a suitable data structure. The AI agents are configured to predict possible outcomes as a result of taking certain actions defined by the models. The goal information describes desired outcomes (or goal states) that are desirable given the current state (context). Each of the AI agents may select an outcome from among the predict possible outcomes that reaches a particular goal state, and provide signals or commands to various other subsystems of the EMS 300 to perform one or more actions determined to lead to the selected outcome. In addition, the AI agents may also include a learning module configured to learn from an experience with respect to the selected outcome and some performance measure(s). The experience may include state (context) data collected after performance of the one or more actions of the selected outcome. The learnt experience may be used to produce new or updated models for determining future actions to take. According to various embodiments, the AI agents may provide, with the assistance of intra-EMS communication subsystem 310, the one or more models, goal information, and/or the learnt experience to the policy manager 306, wherein the policy manager 306 is configured to generate new load balancing criteria 325, new policies 326, or update an existing load balancing criteria 325/existing policies 326 to include the one or more models, goal information, and/or the learnt experience.

As alluded to earlier, intra-EMS communication subsystem 310 is configured to facilitate communication between the various subsystems of the EMS 300. In particular, intra-EMS communication subsystem 310 is configured to receive data from one or more subsystems and send commands to other subsystems for operation/control of the EMS 300. In these embodiments, intra-EMS communication subsystem 310 is coupled with the various subsystems of the EMS 100 via a suitable bus or interconnect (IX) technology, and is configured to communicate (i.e., send and receive messages/signaling) over the bus/IX using a corresponding bus/IX protocol. Examples of such bus/IX technologies may include a Local Interconnect Network (LIN); industry standard architecture (ISA); extended ISA (EISA); peripheral component interconnect (PCI); PCI express (PCIe); Inter-Integrated Circuit (I2C) bus; Parallel Small Computer System Interface (SPI) bus; point-to-point interfaces; a power bus; a proprietary bus, for example, used in a SoC based interface; or any number of other technologies, such as those discussed herein. Additionally or alternatively, any number of other bus/IX technologies may be used, such as a Controller Area Network (CAN), a Time-Trigger Protocol (TTP) system, a FlexRay system, or the like. In some embodiments, intra-EMS communication subsystem 310 is communicatively coupled with sensors 321 and/or actuators 322 via a wireless network, such as a PAN or P2P network, and is configured to communicate in accordance with a corresponding wireless network protocol, such as the PAN and/or P2P protocols discussed herein. In some embodiments, the intra-EMS communication subsystem 310 is also configured to facilitate intra-subsystem communication between the various subsystems of the EMS 300 using suitable drivers, libraries, application programming interfaces (APIs), middleware, software connectors, software glue, and/or the like.

As alluded to earlier, remote communication subsystem 314 is configured to facilitate communication with one or more remote servers 340. The remote servers 340 may be one or more servers affiliated with a mobile network operator, a service provider platform, cloud computing service, energy management service, an insurance company, emergency response services (e.g., first responders, fire, ambulance, etc.), a law enforcement or governmental agency, an environmental data service, and so forth. In some embodiments, remote communication subsystem 314 is configured to communicate with servers 340 wirelessly, via a wide area network, such as the Internet or an enterprise network. Wireless communication may be short-range (e.g., peer-to-peer (p2p) or device-to-device (D2D)), WiFi, or cellular, such as LTE, 5G, WiMAX, etc.

Referring back to FIG. 3, each of main system controller 302, node monitor 304, VEN engine 305, policy manager 306, load balancer 307, fault detector 309, intra-EMS communication subsystem 310, inter-node communication subsystem 312, and remote communication subsystem 314 may be implemented in hardware, software, or combination thereof. Example hardware implementations may include individual companion silicon or circuitry, include, but not limited to ASICs or programmable circuits (e.g., FPGAs, programmable SoCs, etc.) programmed with the operational logic. Software implementations may include implementations in individual software agents (e.g., the AI agents discussed previously). Software implementations may additionally or alternatively include implementations in instructions of instruction set architectures (ISA) supported by the target processors, or any one of a number of high level programming languages that can be compiled into instruction of the ISA of the target processors. In either software or hardware implementations, especially those embodiments where either controller 302 and/or one of subsystems 304-309 includes at least one (trained) neural network in performing their respective determinations and/or assessments, at least a portion of main system controller 302 and the subsystems 304-309 may be implemented in a hardware accelerator (e.g., an FPGA configured with an appropriate bitstream). As examples, the (trained) neural networks may be a multilayer feedforward neural network (FNN), Convolution Neural Network (CNN), Recurrent Neural Network (RNN), and/or some other suitable neural network. An example hardware computing platform will be further described later with references to FIG. 11.

FIGS. 4-8 shows example trust management processes 400-800, respectively, in accordance with various embodiments. For illustrative purposes, the various operations of processes 400-800 is described as being performed by various subsystems of the energy management system 300 of FIG. 3, which is implemented by a EMS 300. However, in other embodiments, other elements/subsystems of an EMS may operate processes 400-800. While particular examples and orders of operations are illustrated FIGS. 4-8, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Figure 4:
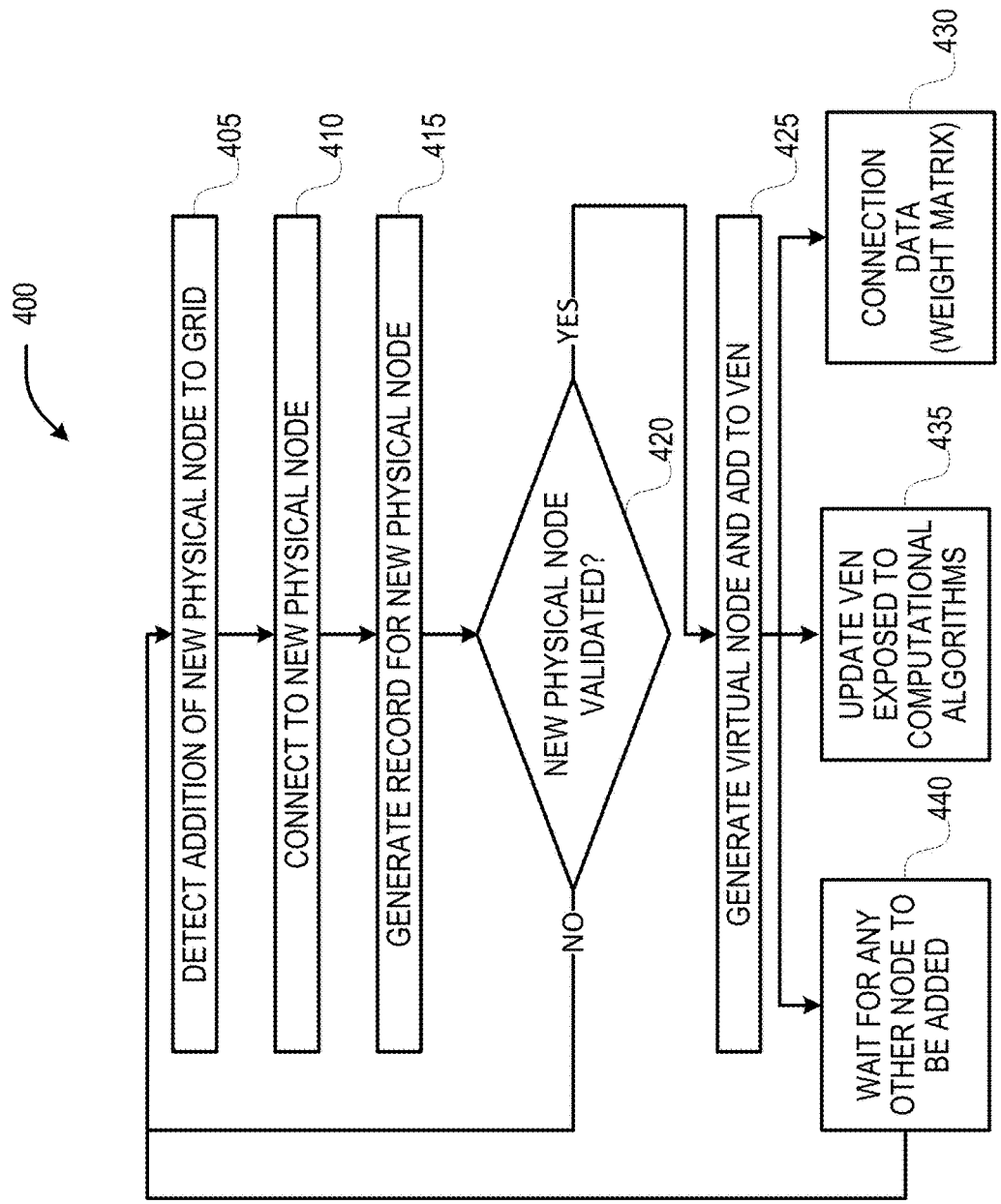
FIGS. 4-8 show example processes for practicing the embodiments discussed herein. In particular.

FIG. 4 shows a process 400 for adding a new node to a VEN 105/200 according to various embodiments. Process 400 begins at operation 405 where the node monitor 304 detects the addition of a new physical node to the electrical grid 101. In some embodiments, the node monitor 304 and/or the main system controller 302 may control the communications subsystem to perform an radiofrequency (RF) scan or perform an ED operation to detect RF signaling transmitted/broadcasted by the newly deployed physical node. Additionally, or alternatively, in some embodiments, the node monitor 304 and/or the main system controller 302 may perform disaggregation using information about one or more electrical signals provided by an electrical element, such as an electrical panel, transformer, substation, etc. At operation 410, the main system controller 302 establishes a connection with the new physical node 410, which may involve performing attachment/handshake procedures, exchanging security information, etc. according to a wired/wireless communication protocol.

At operation 415, the main system controller 302 and/or the VEN engine 305 generates a record for the new physical node. At operation 420, the main system controller 302 and/or the VEN engine 305 determines whether the new physical node has been validated. Validation of the new physical node may involve determining whether the new physical node has certain capabilities or has certain permissions/authorizations to be included in the physical electrical network 101. If at operation 420 the main system controller 302 and/or the VEN engine 305 determines that the new physical node has not been validated, the main system controller 302 and/or the VEN engine 305 proceeds back to perform operation 405. If at operation 420 the main system controller 302 and/or the VEN engine 305 determines that the new physical node has been validated, the VEN engine 305 proceeds to operation 425 to generate a virtual node for the new physical node, and adds the new virtual node to the VEN 105/200. The virtual node may comprise a data structure as discussed previously, and at operation 430, the VEN engine 305 adds connection data as a weight matrix to the data structure. This connection data indicates the virtual electrical couplings between the new virtual node and one or more other virtual nodes.

Concurrent with or after operation 430, the VEN engine 305 proceeds to operation 435 to update the VEN 105/200 exposed to the other subsystems of the EMS 300, such as the load balancer 307 and fault detector 309. Concurrent with or after operations 430 and 435, the VEN engine 305 proceeds to operation 440 to wait for any other node to be added to the physical electrical network 101. At operation 440, the VEN engine 305 may wait for a predetermined or configured period of time before proceeding back to perform operation 405.

Figure 5:
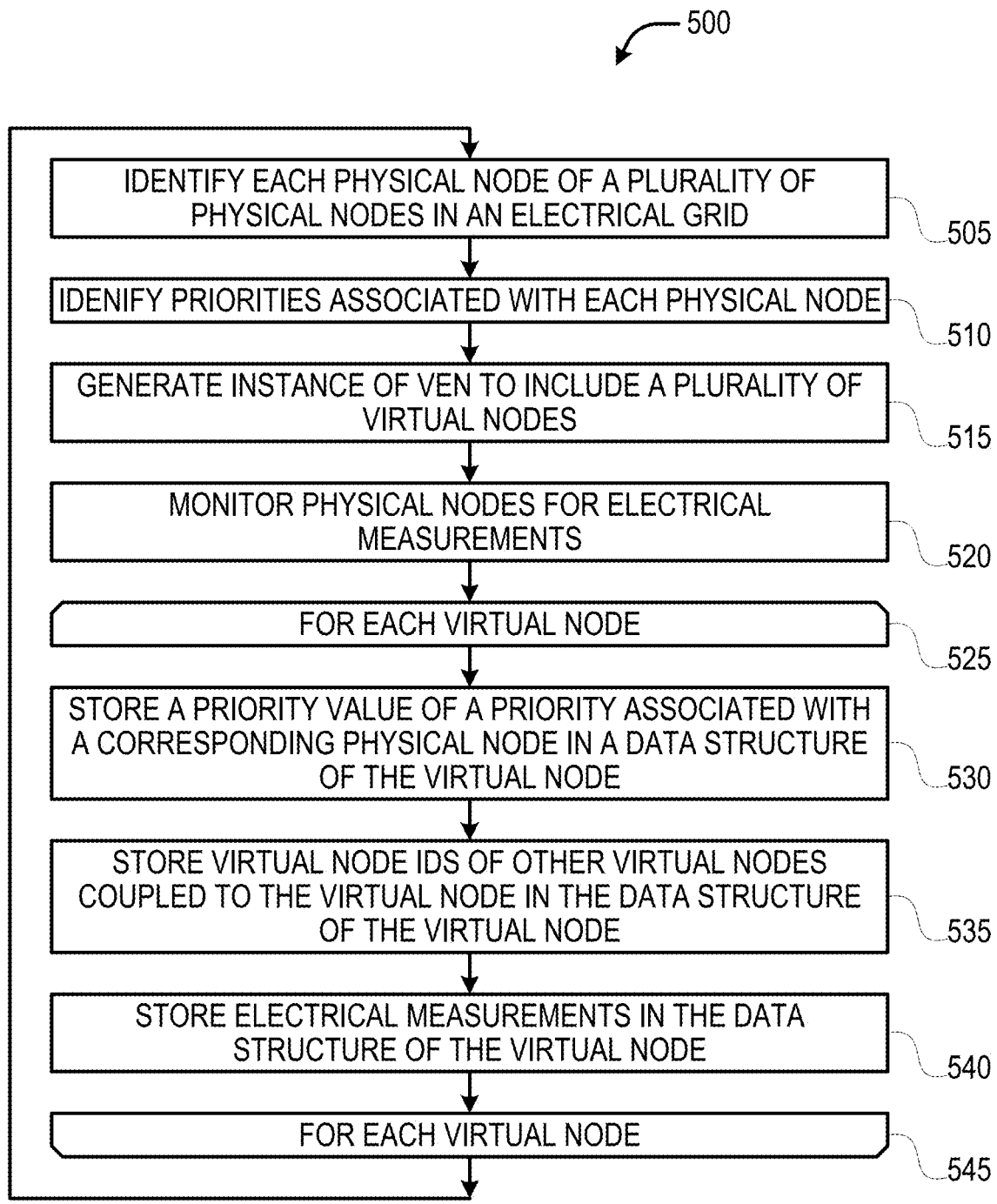

FIG. 5 shows a VEN generation process 500 for generating a VEN 105/200, in accordance with various embodiments. Process 500 begins at operation 505 where the VEN engine 305 identifies each physical node of a plurality of physical nodes in an electrical grid (e.g., physical electrical network 101 of FIG. 1). In embodiments, the VEN engine 305 may determine whether the physical nodes are physical energy consumer nodes or physical energy producer nodes. At operation 510, the VEN engine 305 identifies priorities associated with each physical node, for example, whether a load or source is a high priority node or a low priority node. In other embodiments, other types of rankings or classifications may be used, for example, numerical rankings, device manufacturer or location based rankings/classifications may be used. At operation 515, the VEN engine 305 generates an instance of the VEN 105/200 to include a plurality of virtual nodes. In embodiments, each of the virtual nodes may correspond with an individual physical node, or some or all of the virtual node may correspond to multiple physical nodes. As discussed previously, the virtual nodes may comprise a suitable data structure to store various static and dynamic parameters of the corresponding physical node(s). At operation 520, the node monitor 304 monitors the physical nodes for electrical measurements, and provides these measurements (and/or state data of the individual nodes 330) to the VEN engine 305 for storage in the respective virtual nodes.

At open loop operation 525, the VEN engine 305 processes each virtual node in turn. At operation 530, the VEN engine 305 stores a priority value of corresponding physical nodes into the virtual node data structure. In embodiments, the VEN engine 305 at operation 530 may also store a value or indicator the virtual node data structure, where the value/indicator indicates whether the virtual node is a virtual energy consumer node or a virtual energy producer node. At operation 535, the VEN engine 305 stores, in the virtual node data structure, node IDs of other virtual nodes to which the virtual node is coupled. At operation 540, the VEN engine 305 stores the electrical measurements obtained from the node monitor 304 in the virtual node data structure. At close loop operation 545, the VEN engine 305 proceeds back to operation 525 to process a next virtual node, if any. When no more virtual nodes are available for processing, the VEN engine 305 proceeds back to perform operation 505. In some embodiments, the VEN engine 305 may wait or pause for a predetermined period of time before proceeding back to perform operation 505.

Figure 6:
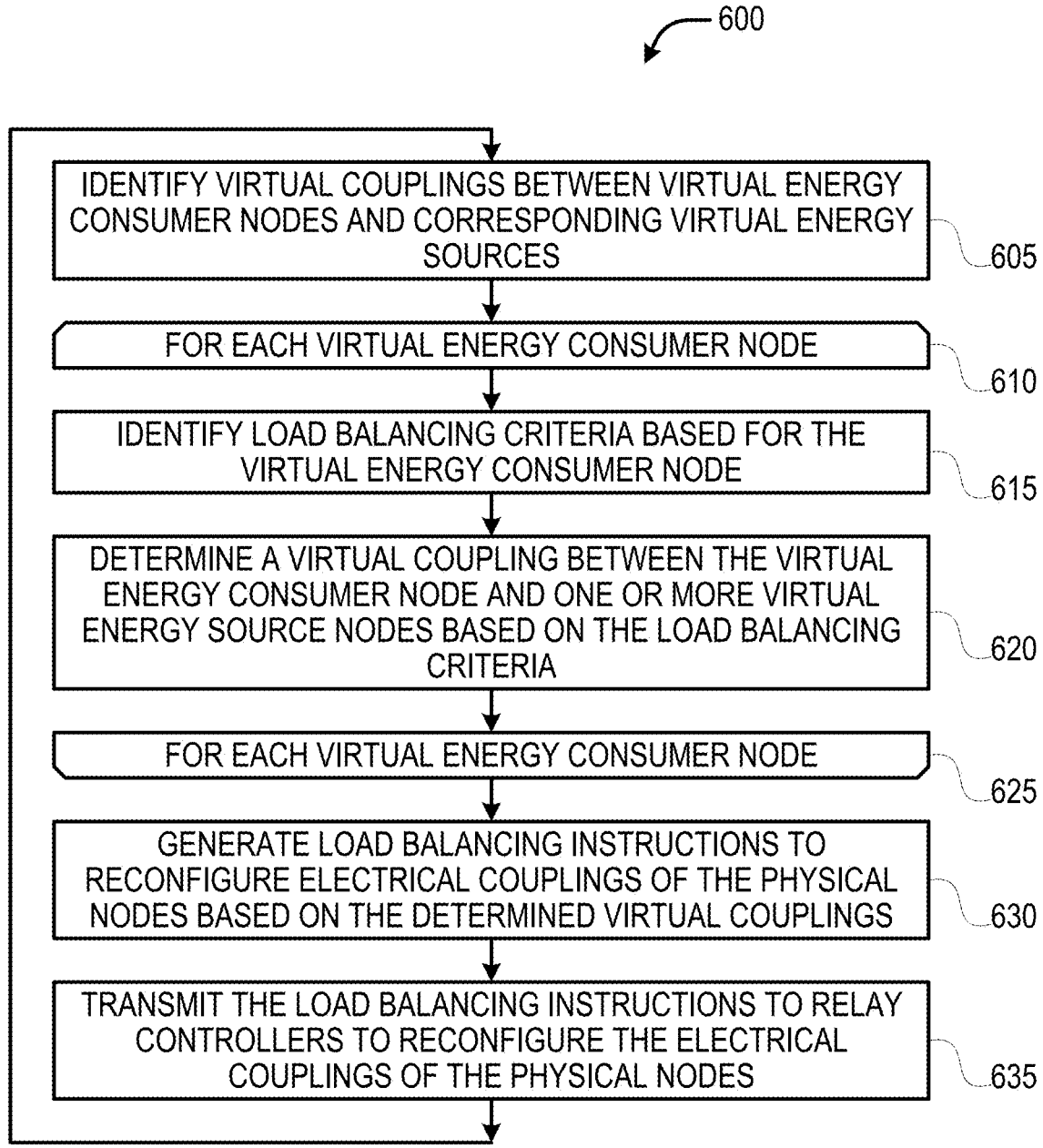

FIG. 6 shows a load balancing process 600 in accordance with various embodiments. Process 600 begins at operation 605 where the load balancer 307 identifies virtual couplings between virtual energy consumer nodes and virtual energy source nodes. In embodiments, the load balancer 307 may obtain the data stored in each virtual node data structure to perform this identification.

At open loop operation 610, the load balancer 307 processes each virtual energy consumer node in turn. At operation 615, the load balancer 307 identifies load balancing criteria 325 for the virtual energy consumer node, and at operation 620, the load balancer 307 determines a virtual coupling between the virtual energy consumer node and one or more virtual energy source nodes based on the load balancing criteria. At close loop operation 625, the load balancer 307 proceeds back to operation 610 to process a next virtual energy consumer node, if any. When no more virtual nodes are available for processing, the load balancer 307 proceeds to operation 630 to generate load balancing instructions to reconfigure the electrical couplings of the physical nodes based on the determined virtual couplings. At operation 635, the load balancer 307 provides the load balancing instructions to one or more relay controllers (e.g., actuators 322 of FIG. 3) to reconfigure the electrical couplings of the physical nodes according to the determined virtual couplings. In embodiments, the load balancer 307 may control or instruct the inter-node communication subsystem 312 to transmit the load balancing instructions to the one or more relay controllers. After performance of operation 635, the load balancer 307 proceeds back to perform operation 605. In some embodiments, the load balancer 307 may wait or pause for a predetermined period of time before proceeding back to perform operation 605.

Figure 7:
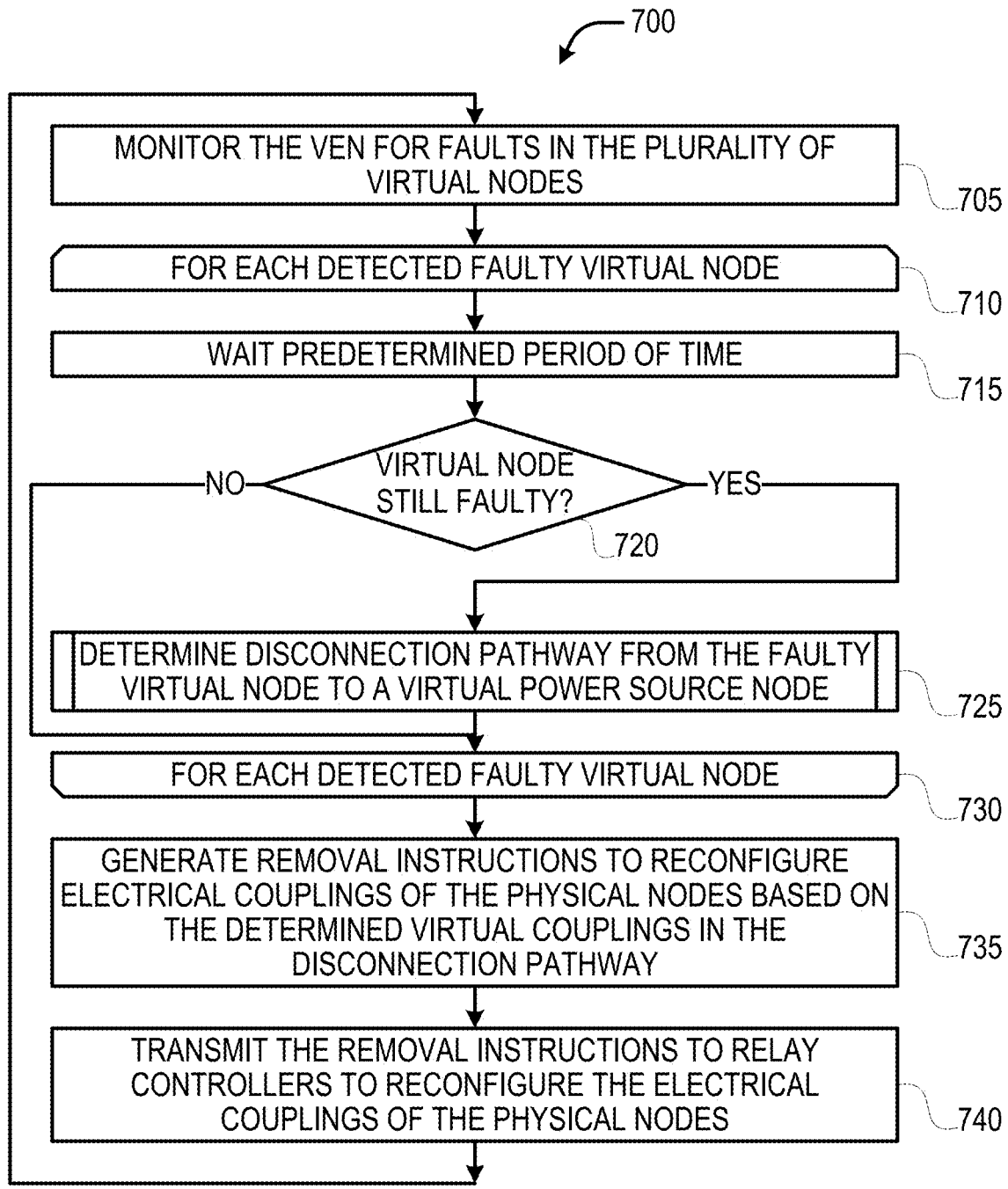

FIG. 7 shows a fault detection and clearance process 700, in accordance with various embodiments. Process 700 begins at operation 705 where the node monitor 304 monitors the VEN 105/200 for faults in the plurality of virtual nodes that make up the VEN 105/200. In embodiments, the node monitor 304 may provide data/information about any detected faults to the fault detector 309. In other embodiments, the fault detector 309 may monitor the VEN 105/200 for faulty virtual nodes.

At open loop operation 710, the fault detector 309 processes each detected faulty node in turn. At operation 715, the fault detector 309 waits for a predetermined or configured period of time before proceeding to operation 720 to determine whether the faulty virtual node still in a fault state. If at operation 720 the fault detector 309 determines that the faulty virtual node not still in a fault state, the fault detector 309 proceeds to operation 730 to process the next faulty virtual node, if any. If at operation 720 the fault detector 309 determines that the faulty virtual node still in a fault state, the fault detector 309 proceeds to operation 725 to determine a disconnection pathway from the faulty virtual node to a virtual power source node. In embodiments, the fault detector 309 may execute a shortest path algorithm to determine the disconnection pathway. Operation 725 may correspond to process 800 of FIG. 8 discussed infra.

At close loop operation 730, the fault detector 309 proceeds back to operation 710 to process a next faulty virtual node, if there are any other faulty virtual nodes. At operation 735, the fault detector 309 generates removal instructions to reconfigure the electrical couplings of the physical nodes based on the determined virtual couplings in the disconnection pathway. These removal instructions are used to isolate the faulty node, and in some cases, one or more nodes in the disconnection pathway. At operation 740, the fault detector 309 provides the removal instructions to one or more relay controllers (e.g., actuators 322 of FIG. 3) to reconfigure the electrical couplings of the physical nodes according to the determined virtual couplings. In embodiments, the fault detector 309 may control or instruct the inter-node communication subsystem 312 to transmit the removal instructions to the one or more relay controllers. After performance of operation 740, the fault detector 309 proceeds back to perform operation 705.

Figure 8:
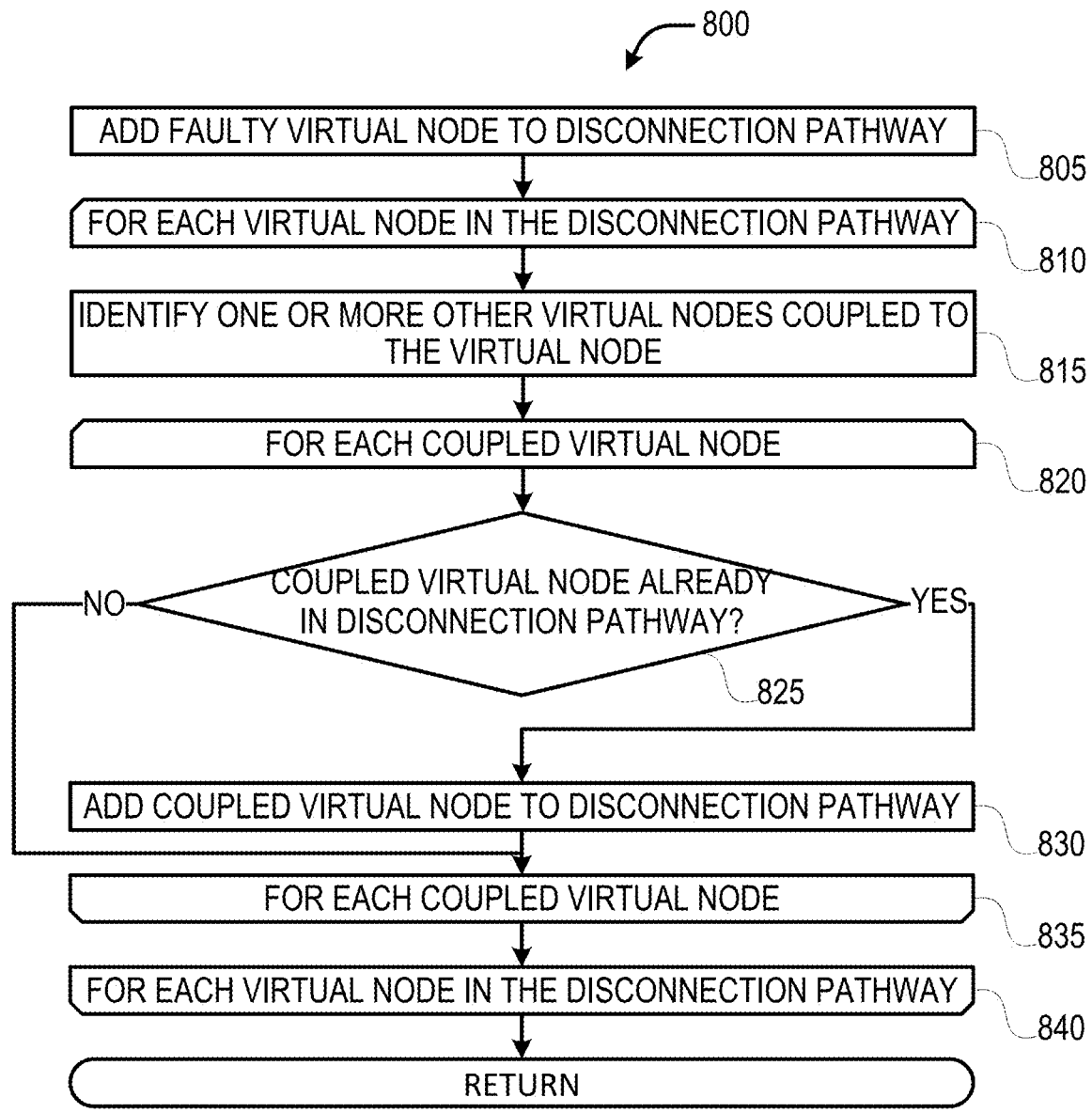

FIG. 8 shows a disconnection pathway process 800, in accordance with various embodiments. Process 800 may correspond to operation 725 of process 700 shown by FIG. 7. Process 800 begins at operation 805 where the fault detector 309 adds the faulty virtual node, which was detected during operation of process 700 of FIG. 7, to the disconnection pathway. In embodiments, the disconnection pathway may be a suitable data structure, such as an array or the like, and at operation 805, the fault detector 309 may add a node ID of the faulty virtual node to the disconnection pathway data structure.

At open loop operation 810, the fault detector 309 processes each virtual node in the disconnection pathway at each predetermined period of time, in turn. At operation 815, the fault detector 309 identifies a set of virtual couplings between the virtual node and one or more other virtual nodes, or identifies one or more virtual nodes coupled to the virtual node being processed. The virtual nodes coupled to the virtual node being processed may be referred to as "coupled nodes," "coupled virtual nodes," or the like. As discussed previously, the virtual nodes comprise a data structure that stores the node IDs of other virtual nodes to which they are connected. In embodiments, the fault detector 309 at operation 815 may obtain the node IDs from this data structure. The particular virtual nodes to be analyzed and the order in which those virtual nodes are analyzed may vary from embodiment to embodiment based on the particular shortest path algorithm used by the fault detector 309. Additionally, the fault detector 309 at operation 815 may identify a closest virtual node in distance to a most recently removed virtual node from the virtual electrical grid.

At open loop block 820, the fault detector 309 processes each coupled node identified at operation 815 in turn. At operation 825, the fault detector 309 determines whether the coupled virtual node is already in the disconnection pathway. As an example, the fault detector 309 at operation 825 may compare the node ID of the coupled node with the node IDs stored in the disconnection pathway data structure to determine if the coupled node's node ID is already in the disconnection pathway. If at operation 825 the fault detector 309 determines that the coupled virtual node is not in the disconnection pathway, the fault detector proceeds to operation 830 to add the coupled node to the disconnection pathway, for example, by adding the coupled node's node ID to the disconnection pathway data structure. If at operation 825 the fault detector 309 determines that the coupled virtual node is already in the disconnection pathway, the fault detector 309 proceeds to close loop operation 835 to process a next coupled node, if any. When all coupled nodes are processed, the fault detector 309 proceeds to close loop operation 840 to process the next virtual node in the disconnection pathway if there are any more virtual nodes in the disconnection pathway. If there are no more virtual nodes in the disconnection pathway, the fault detector 309 returns back to process 700 of FIG. 7.

Figure 9:
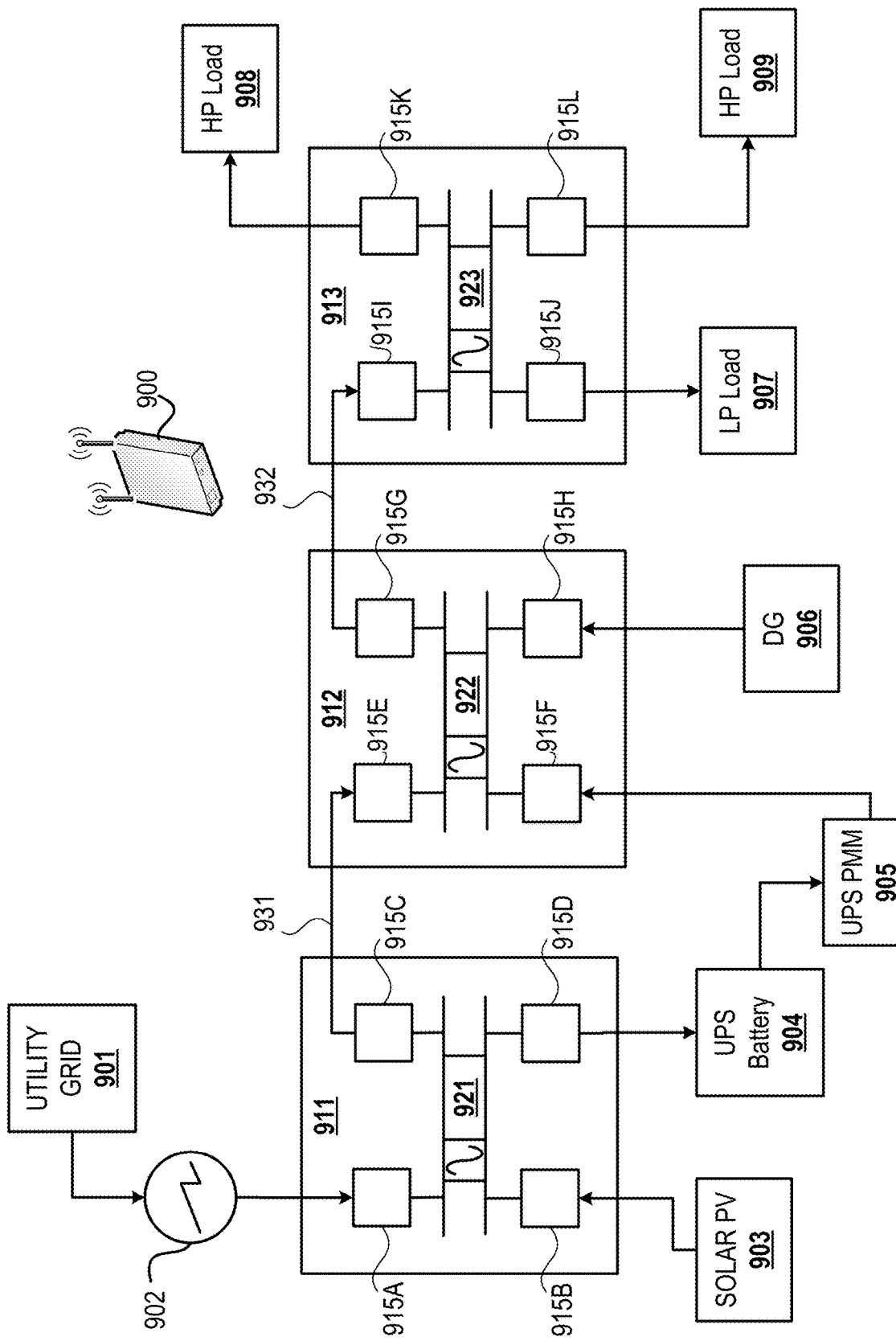
FIG. 9 illustrates an example load balancing use case in accordance with various embodiments.

FIG. 9 illustrates an example load balancing use case in accordance with various embodiments. This use case involves a microgrid deployed at a residential dwelling where an EMS appliance 900 is incorporated to conserve energy resources. In this embodiment, the EMS appliance 900 corresponds to the EMS 100 of FIG. 1 and/or the EMS 300 of FIG. 3. In the example use case of FIG. 9, the residential dwelling includes the following equipment: a solar photovoltaic system (SPV) 903 on the roof of the residential dwelling (2 kW), an uninterrupted power source (UPS) battery 904 with a UPS power management module (PMM) 905, a diesel generator 906 (0.5 kW), a low priority (LP) load 907, a high priority (HP) load 908, and an HP load 909, which are coupled to one another via a first electrical panel 911, second electrical panel 912, and a third electrical panel 913. In this example, the LP load 907 is a Local Smart lighting system (1 kW); HP load 908 is an electric vehicle, which the user drives daily for about 30 miles each day, and has a battery capacity is 48 Amps, 75 kWh battery; and HP load 909 comprises one or more home appliances (e.g., a refrigerator).

In the example depicted by FIG. 9, the first electrical panel 911 receives electricity from a utility grid 901 via a power/electricity meter 902, and receives electricity from a solar photovoltaic system (SPV) 903 on the roof of the residential dwelling (2 kW). The first electrical panel 911 also routes electricity to UPS battery 904 for storage, and routes electricity to the second electrical panel 912 via first main 921. The diesel generator 306 and UPS battery 904 via UPS PMM 905 supply local backup electricity to the second electrical panel 912. The electricity supplied to the second electrical panel 912 is routed to the third electrical panel 913 via second main 922, which is then routed to the electrical loads 907, 908, and 909.

Continuing with the example depicted by FIG. 9, the first electrical panel 911 is coupled to the second electrical panel 912 via a first main 931, and the second electrical panel 912 is coupled to the third electrical panel 913 via a second main 932. The mains 921 and 922 may be wires or cables used to distribute electricity throughout the depicted electrical system. Additionally, the first panel 911 includes a relay controller 921, the second panel 912 includes a relay controller 922, and third panel 913 includes relay controller 923. In embodiments, the relay controllers 921, 922, and 923 are configured to control relays 915A-915-L included in the respective panels 911, 912, 913. For example, relay controller 921 is configured to control relays 915A-915D, relay controller 922 is configured to control relays 915E-915H, and relay controller 923 is configured to control relays 9151-915L. Hereinafter, the relays 915A-L may collectively be referred to as "relays 915." The relays 915 may be electromechanical relays, solid state relays, electrochemical relays, or combinations thereof, and the relay controllers 921, 922, and 923 may be PLCs, PLRs, PAC devices, etc. The particular type of relays and relay controllers that are used may vary from embodiment to embodiment, and may be application specific. In these embodiments, the relay controllers 921, 922, and 923 are configured to transmit control signals to one or more of the relays 915 to change the state of the relays 915, such as from an "on" state to an "off" state or vice versa, or from an "open" state to a "closed" state or vice versa. The control signals are based on commands/instructions obtained from the EMS appliance 900. In embodiments, the relay controllers 921, 922, and 923 are configured to receive messages including the commands/instructions from the EMS appliance 900 via a suitable wireless or wired communication protocol, such as those discussed herein. The commands/instructions obtained from the EMS appliance 900 may be in a suitable format, such as those discussed herein.

As discussed previously, the EMS appliance 900 is configured to receive data (e.g., node data) from the various nodes in the electrical grid indicating state data and/or electrical measurements. For example, the power/electricity meter 902 may transmit electricity consumption measurements or an amount of electricity provided by the utility grid 901 to the EMS appliance 900, and the controllers 921, 922, and 923 may transmit state data indicating the state of each relay 915 (e.g., whether individual relays 915 are open or closed) to the EMS appliance 900. In another example, the nodes 903-909 may transmit electrical measurements and/or state data (e.g., indicating an "ON" or "OFF" state) to the EMS appliance 900. Additionally or alternatively, the EMS appliance 900 may be configured to directly measure electricity consumption or production by individual nodes 901-909 as discussed previously. The EMS appliance 900 is configured to generate an energy consumption profile 324 based on the measurement data and/or state data. An example energy consumption profile 324 for the electrical grid of FIG. 9 is shown by tables 2 and 3.

TABLE 2

Equipment Specifications for Use Case 1

| Equipment | Model | Units | Power Consumption |
|---|---|---|---|
| Battery charger for electric vehicle (for daily commute) | Electric Vehicle (a charging time of 1 hour, 18 minutes provides 45 miles of driving) | 1 | 7.7 kW for a 32 A supply |
| Solar PV | Any commercially available model/brand | 1 | 2 kW |
| Diesel Generator | Any commercially available model/brand | 1 | 0.5 kW |
| Utility Grid Supply | Local Public Utility (taking into account the usage of air conditioner unit(s) and/or thermostats) | 1 phase AC-240 V | Approx. 5 kW |
| UPS Battery | 1500 volts-amps (VA); 1 phase | 1 (24 V, 48 A) | 1.2 kW |

TABLE 3

Energy Usage Pattern for Use Case 1

| Time of Day | Appliances Used (approximation) | Power Consumption | Energy Usage |
|---|---|---|---|
| 00 hrs to 05 hrs | Electric vehicle charger, bedroom lighting, HP loads | 7.7 kW + 40 W | 38.7 kWh |
| 05 hrs to 09 hrs | Various kitchen appliances | 1 kW | 5 kWh |
| 09 hrs to 15 hrs | No consumption | 100 W | 0.6 kWh |
| 15 hrs to 19 hrs | Television, kitchen appliances, etc. | 3 kW | 12 kWh |
| 19 hrs to 22 hrs | Home lighting and HP loads | 1 kW | 3 kWh |
| 22 hrs to 24 hrs | HP loads and Electric vehicle charger | 7.7 kW + 100 W | 15.6 kWh |
| 00 hrs to 24 hrs | Total Usage | 20.4 kW + 240 W | 74.9 kWh |

Table 2 shows equipment specifications for the various loads and sources in the electrical grid. The EMS appliance 900 generates example daily energy usage pattern shown by table 3 based on the equipment specifications shown by table 2. Tables 2 and 3 may be linked using keys, indexes, or some other suitable relational database technique. In this example, the total main line supply from the utility grid 901 is assumed to be around 5 kW. It is also assumed that the diesel generator 906 only provides electricity in case of an emergency situation where there is a complete failure of other power generation systems. The total daily approximate energy consumption of the residential dwelling is 101.5 kilowatt hours (kWh).

At each instance of time (or at a predetermined interval), the EMS appliance 900 is configured to re-evaluate the VEN 105/200, and generate a new instance of the VEN 105/200 based on the energy consumption profile 324. The EMS appliance 900 is also configured to determine priorities of each node 901-909, and (continuously or periodically) monitors the various parameters of each node 901-909. Based on the priorities of the nodes 901-909, and the monitored parameters of nodes 901-909 in the electrical grid, the EMS appliance 900 reconfigures the electrical couplings of the electrical grid so that certain sources provide electricity to one or more loads, which is used for both load balancing and rerouting connections in case of a faulty node.

In this example, the load balancer 309 operated by the EMS appliance 900 uses load balancing criteria 325 to reconfigure the virtual electrical couplings. In particular, the load balancing criteria 325 includes known non-peak usage intervals (e.g., times of the day when electricity prices are low) and peak usage hours (e.g., times of the day when electricity prices are higher than other times of the day), as well as current and predicted weather conditions. The load balancer 309 uses this load balancing criteria 325 to reconfigure the virtual electrical couplings such that high power loads 908 and/or 909 only use electricity provided by the utility grid 901 during non-peak usage hours. Additionally, the load balancer 309 uses the load balancing criteria 325 to reconfigure the virtual electrical couplings such that the loads 907-909 use electricity using renewable and backup supplies (e.g., solar PV 903 and/or UPS battery 904 and UPS PMM 905) during peak utility grid 901 usage periods. Additionally or alternatively, the load balancer 309 uses the load balancing criteria 325 to reconfigure the virtual electrical couplings so that the solar PV 903 recharges the UPS battery 904 during non-peak utility grid 901 usage periods or during peak sunlight exposure periods (e.g., based on the current and predicted weather conditions).

In order to reconfigure the electrical couplings in the physical electrical grid, the EMS appliance 900 is configured to instruct the relay controllers 921, 922, and 923 to switch relays 915 on/off to achieve new connections between the nodes in the grid based on the determined virtual electrical couplings as discussed previously. In these embodiments, the EMS appliance 900 (and/or individual subsystems therein) is configured to generate the instructions/commands based on the various algorithms operated on the VEN 105/200 as discussed previously. The EMS appliance 900 is configured to generate new instructions to reconfigure the electrical couplings in the physical grid based on the new instances of the VEN 105/200. The new instance of the VEN 105/200 indicates a new topology of virtual couplings, which are used as the basis for instructing the relay controllers 921, 922, and 923 to change the physical electrical couplings of the physical grid. As alluded to previously, the EMS appliance 900 is configured to transmit messages/signals, which include the instructions/ commands, to the relay controllers 921, 922, and 923 via a suitable wireless or wired communication protocol, such as those discussed herein.

Continuing with the example of FIG. 9, if the solar PV 903 can provide energy for a duration of 9 hours (hrs) on an average day, then the solar PV 903 can be used to power the dwelling for about 6 hrs assuming 6 hrs are used for recharging the UPS battery 904. In this case, the energy supplied by the solar PV 903 is about 12 kWh (e.g., 2 kW×6 hrs) assuming a constant supply. Also, assuming that the UPS battery 904 can supply power for about 12 to 14 hours, then the energy supplied would be about, 14.4 kWh based on a VA of 1500 shown by table 2 and a power factor (PF) of 0.8 (e.g., (1500 VA×0.8)×12 hrs=14.4 kWh). In this case, the energy consumed for recharging the UPS battery 904 would be 3.5 kWh based on the assumed recharge time for the UPS battery 904 being about 6 hrs. Therefore, based on the usage values shown by table 3 and the aforementioned calculations, the net conserved energy is about 52 kWh based on the following equation:

$$74.9 \text{ kWh} - 12 \text{ kWh} - 14.4 \text{ kWh} + 3.5 \text{ kWh} = 52 \text{ kWh}$$

In the above equation, 74.9 kWh is the total energy usage for the dwelling from table 3; 12 kWh is the energy supplied by the solar PV 903; 14.4 kWh is the energy supplied by the UPS battery 904; and 3.5 kWh is the energy consumed for recharging the UPS battery 904. In addition, reconfiguring the electrical couplings such that the electric vehicle is recharged during non-peak periods without any other reconfiguration is expected to save energy up to 40%.

Figure 10:
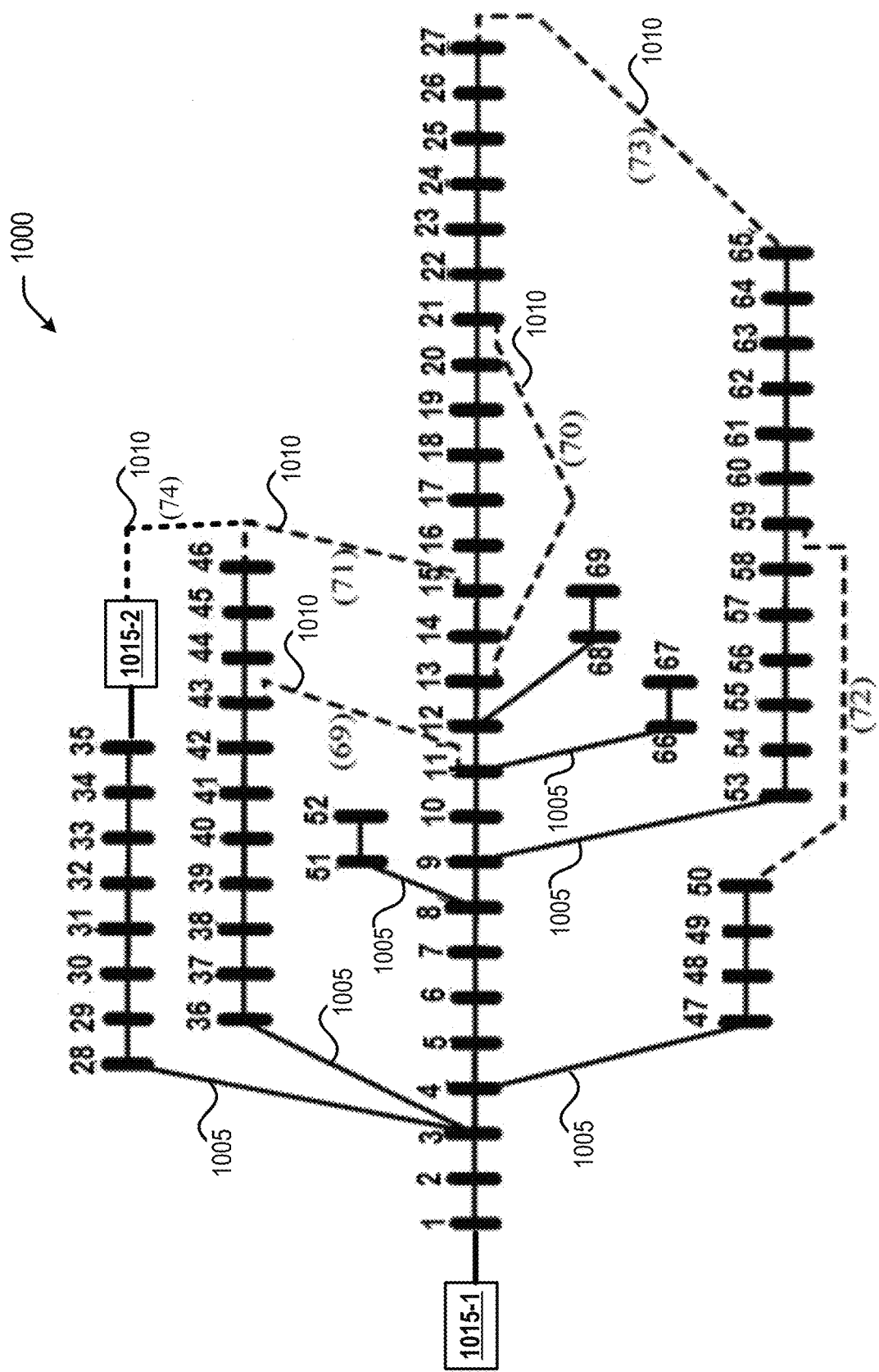
FIG. 10 illustrates an example fault detection and clearance use case in accordance with various embodiments.

FIG. 10 illustrates an example fault detection and clearance use case in accordance with various embodiments. The example of FIG. 10 includes a VEN 1000, which is a graph of an industrial bus network based on the standard IEEE-69 bus network. The bus network includes 69 buses and multiple electrical couplings including ties lines 69, 70, 71, 72, 73, and 74. In this context, a "bus" is a junction point where different electrical elements (e.g., wires, cables, or transmission lines; transformer(s); load(s); switch(es) or relay(s); shunt device(s); etc.) are connected. Additionally, "ties" are a type of electrical element used to form a loop or cycle. A tie can be considered to start at one bus and ending at another bus. The bus network also includes two power sources connected to bus 1 and bus 35. The industrial loads (i.e. coupled to individual buses) may be, for example, motor and drive based systems that often draw abnormal amounts of current leading to overcurrent faults. Additionally, the data transmission throughput is relatively high in the bus network, which is based in part on the number of buses in the bus network.

An EMS appliance (not shown by FIG. 10) is configured to generate VEN 1000 to include 69 virtual nodes (labeled 1 to 69 in FIG. 10), virtual electrical couplings 1005 including virtual tie lines 69, 70, 71, 72, and 73 (also referred to as "ties"). In FIG. 10, the virtual couplings 1005 are represented by solid lines and the ties are depicted using dashed lines; to simplify the drawing not every virtual coupling 1005 and tie are labeled. The ties form multiple cycles in the VEN 1000. A cycle is a path of edges and vertices (nodes) wherein a vertex (node) is reachable from itself. Further, the VEN 1000 includes virtual power source 1015-1 coupled to node 1 and virtual power source 1015-2 coupled to node 35. In this example, the VEN 1000 does not differentiate between different types of power sources but indicates the availability of the required amount of power from each source 1015.

As alluded to previously, the EMS appliance is configured to detect faulty nodes, and reconfigure the electrical network to disconnect the faulty node from the electrical network and to continue to provide electricity to the other nodes in the electrical network. As an example, with reference to FIG. 10, if a fault takes place at bus 66, the fault detector 309 detects the fault at node 66 in the VEN 1000, generates removal instructions to reconfigure the virtual electrical couplings 1005 so that node 66 is removed from the VEN 1000, and sends the removal instructions to relays/switches connected to bus 66 to cause the relays/switches connected to the bus 66 to close off electricity flow to bus 66.

In some scenarios, a faulty node may cause other nodes in the electrical network to become faulty or otherwise disconnect from the electrical network. In these scenarios, the fault detector 309 is configured to identify a disconnection pathway from the faulty node to a power source, and reconfigure the electrical couplings to isolate or avoid the nodes in the disconnection pathway. As an example, with reference to FIG. 10, if a fault takes place at bus 66 and persists after a period of time, then bus 11 may become disconnected from the electrical network, then bus 10 may become disconnected, and so on until the power source 1015-1 at bus 1 is reached resulting in a power outage for the entire electrical network. This path from the faulty bus 66 to the power source 1015-1 is referred to as a "disconnection pathway." In this scenario, the fault detector 309 operates a shortest path algorithm (e.g., Dijkstra's Algorithm) to identify a disconnection pathway to a closest power source. Continuing with the aforementioned example, the disconnection pathway to the power source 1015-1 from faulty node 66 may be expressed as follows:

$$66:66 \to 11 \to 10 \to 9 \to 8 \to 7 \to 6 \to 5 \to 4 \to 3 \to 2 \to 1$$

The above example disconnection pathway shows the shortest path from node 66 to node 1, but it should be understood that node 67 may also be affected by the outage of node 66 even though node 67 is not included in the shortest path to node 1. If all of the buses in the disconnection pathway become disconnected from the electrical network, then the fault detector 309 may reconfigure the VEN 1000 such that uninterrupted power is available to all other nodes. In this example, the fault detector 309 may utilize any of the load balancing techniques discussed herein to couple node 46 to the power source 1015-2, and to nodes 15, 27 and 65, 59 and 50 to supply power from the power source 1015-2 to all remaining nodes. Additionally, the fault detector 309 may generate removal instructions (or other VEN configuration instructions) to cause tie lines 74, 71, 73, and 72 to become open so that electricity may be provided from power source 1015-2 to some or all other buses that are not in the disconnection pathway.

II. Example Implementations

FIG. 11 illustrates an example of an appliance 1100 (also referred to as "platform 1100," "device 1100," "appliance 1100," or the like) in accordance with various embodiments. The appliance 1100 may be suitable for use as any of the computer devices discussed herein. Appliance 1100 may also be implemented in or as a server computer system or some other element, device, or system discussed herein. The appliance 1100 may include any combinations of the components shown in the example. The components of appliance 1100 may be implemented as integrated circuits (ICs), portions thereof, discrete electronic devices, or other modules, logic, hardware, software, firmware, or a combination thereof adapted in the computer appliance 1100, or as components otherwise incorporated within a chassis of a larger system. The example of FIG. 11 is intended to show a high level view of components of the computer appliance 1100. However, some of the components shown may be omitted, additional components may be present, and different arrangement of the components shown may occur in other implementations.

The appliance 1100 includes processor circuitry 1102. The processor circuitry 1102 includes circuitry such as, but not limited to one or more processor cores and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (I/O), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 1102 may include one or more hardware accelerators, which may be microprocessors, programmable processing devices (e.g., FPGA, ASIC, etc.), or the like. The one or more hardware accelerators may include, for example, computer vision (CV) and/or deep learning (DL) accelerators. In some implementations, the processor circuitry 1102 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1102 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 1102 may be coupled with or may include memory/storage and may be configured to execute instructions stored in the memory/storage to enable various applications or operating systems to run on the appliance 1100. In these embodiments, the processors (or cores) of the processor circuitry 1102 is configured to operate application software to provide a specific service to a user of the appliance 1100. In some embodiments, the processor circuitry 1102 may be a special-purpose processor/controller to operate according to the various embodiments herein.

As examples, the processor circuitry 1102 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, Calif. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 1102 may be a part of a system on a chip (SoC), System-in-Package (SiP), a multi-chip package (MCP), and/or the like, in which the processor circuitry 1102 and other components are formed into a single integrated circuit, or a single package, such as the Edison™ or Galileo™ SoC boards from Intel® Corporation. Other examples of the processor circuitry 1102 are mentioned elsewhere in the present disclosure.

According to various embodiments, the particular type of processor circuitry 1102 implemented in the appliance 1100 may vary from embodiment to embodiment, and may depend on the particular type of electrical network to be monitored and controlled by the appliance 1100. In particular, the type of processor circuitry 1102 may be based on the number and size of the physical nodes present in the electrical network. Table 4 shows the type of processor circuitry 1102 that may be used for different example use cases and the number of physical nodes in an electrical network.

TABLE 4

| Use Case | Processor Circuitry 1102 | Number of Physical Nodes in Electrical Network |
| --- | --- | --- |
| Home or Building | Low-voltage microprocessor(s) or microcontrollers (e.g., Intel Quark or Atom, Apple A- or S-series, ARM Cortex-M or -R, MIPS Warrior M-class, Qualcomm Snapdragon). | 1-20 |
| Commercial or Residential complexes | Mid-to-high end microprocessor(s) (e.g., Intel Core, AMD Ryzen, ARM Cortex-A) | 20-500 |
| Substation | high microprocessor(s) (e.g., Intel Xeon, AMD EPYC, ARM Cortex-A, Cavium ThunderX2, Qualcomm Centriq) | Greater than 500 |

Additionally or alternatively, processor circuitry 1102 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1102 may comprise logic blocks or logic fabric including and other interconnected resources that may be programmed to perform various functions, such as the procedures, methods, functions, etc. of the various embodiments discussed herein. In such embodiments, the circuitry of processor circuitry 1102 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1102 may communicate with system memory circuitry 1104 over an interconnect 1106 (e.g., a bus). Any number of memory devices may be used to provide for a given amount of system memory. As examples, the memory circuitry 1104 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 1104 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 1104 may also comprise persistent storage devices, which may be temporal and/or persistent storage of any type, including, but not limited to, non-volatile memory, optical, magnetic, and/or solid state mass storage, and so forth.

The individual memory devices of memory circuitry 1104 may be implemented as one or more of solder down packaged integrated circuits, socketed memory modules, and plug-in memory cards. The memory circuitry 1104 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 1104. In embodiments, the memory circuitry 1104 may be disposed in or on a same die or package as the processor circuitry 1102 (e.g., a same SoC, a same SiP, or soldered on a same MCP as the processor circuitry 1102).

To provide for persistent storage of information such as data, applications, operating systems (OS), and so forth, a storage circuitry 1108 may also couple to the processor circuitry 1102 via the interconnect 1106. In an example, the storage circuitry 1108 may be implemented via a solid-state disk drive (SSDD). Other devices that may be used for the storage circuitry 1108 include flash memory cards, such as SD cards, microSD cards, xD picture cards, and the like, and USB flash drives. In low power implementations, the storage circuitry 1108 may be on-die memory or registers associated with the processor circuitry 1102. However, in some examples, the storage circuitry 1108 may be implemented using a micro hard disk drive (HDD). Further, any number of new technologies may be used for the storage circuitry 1108 in addition to, or instead of, the technologies described, such resistance change memories, phase change memories, holographic memories, or chemical memories, among others.

The storage circuitry 1108 store computational logic 1183 (or "modules 1183") in the form of software, firmware, or hardware commands to implement the techniques described herein. In some embodiments, the computational logic 1183 includes various modules that correspond to the entities of the energy management system 300 of FIG. 3, including the main system controller 302, node monitor 304, VEN engine 305, policy manager 306, load balancer 307, and fault detector 309. The computational logic 1183 may be employed to store working copies and/or permanent copies of programming instructions for the operation of various components of appliance 1100 (e.g., drivers, etc.), an operating system of appliance 1100, one or more applications, and/or for carrying out the embodiments discussed herein (such as one or more operations of FIGS. 4-8). The computational logic 1183 may be stored or loaded into memory circuitry 1104 as instructions 1182 for execution by the processor circuitry 1102 to provide the functions described herein. The various elements may be implemented by assembler instructions supported by processor circuitry 1102 or high-level languages that may be compiled into such instructions (e.g., instructions 1170). The permanent copy of the programming instructions may be placed into persistent storage devices of storage circuitry 1108 in the factory or in the field through, for example, a distribution medium (not shown), through a communication interface (e.g., from a distribution server (not shown)), or over-the-air (OTA).

Although the instructions 1182 are shown as code blocks included in the memory circuitry 1104 and the computational logic 1183 is shown as code blocks in the storage circuitry 1108, it should be understood that any of the code blocks may be replaced with hardwired circuits, for example, built into an FPGA, ASIC, or some other suitable circuitry. For example, where processor circuitry 1102 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1104 and/or storage circuitry 1108 may store program code of an operating system (OS), which may be a general purpose OS or an OS specifically written for and tailored to the computing appliance 1100. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the appliance 1100, attached to the appliance 1100, or otherwise communicatively coupled with the appliance 1100. The drivers may include individual drivers allowing other components of the appliance 1100 to interact or control various input/output (I/O) devices that may be present within, or connected to, the appliance 1100. For example, the drivers may include a display driver to control and allow access to a display device, a touchscreen driver to control and allow access to a touchscreen interface of the appliance 1100, sensor drivers to obtain sensor readings of sensor circuitry 1121 and control and allow access to sensor circuitry 1121, actuator drivers to obtain actuator positions of the actuators 1122 and/or control and allow access to the actuators 1122, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment (SEE), trusted execution environment (TEE), and/or management engine of the appliance 1100 (not shown).

In an example, the instructions 1182 provided via the memory circuitry 1104 and/or the storage circuitry 1108 are embodied as a non-transitory, machine-readable medium S60 including code to direct the processor circuitry 1102 to perform electronic operations in the appliance 1100. The processor circuitry 1102 accesses the non-transitory machine-readable medium 1160 over the interconnect 1106. For instance, the non-transitory, machine-readable medium 1160 may be embodied by devices described for the storage circuitry 1108 of FIG. 11 or may include specific storage units such as optical disks, flash drives, or any number of other hardware devices. The non-transitory, machine-readable medium 1160 may include instructions 1182 to direct the processor circuitry 1102 to perform a specific sequence or flow of actions, for example, as described with respect to the flowchart(s) and block diagram(s) of operations and functionality depicted previously (see e.g., FIGS. 4-8). In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., EPROM, EEPROM) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). In alternate embodiments, the programming instructions may be disposed on multiple computer-readable non-transitory storage media instead. In still other embodiments, the programming instructions may be disposed on computer-readable transitory storage media, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device. The computer-readable medium may include a propagated data signal with the computer-readable program code embodied therewith, either in baseband or as part of a carrier wave. The computer usable program code may be transmitted using any appropriate medium, including but not limited to wireless, wireline, optical fiber cable, RF, etc.

The computer program code for carrying out operations of the present disclosure (e.g., computational logic 1183, instructions 1182, 1170, etc.) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP-.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™ Apache® Thrift, Abstract Syntax Notation One (ASN.1), Google® Protocol Buffers (protobuf), or the like; some other suitable programming languages including proprietary programming languages and/or development tools, or any other languages tools as discussed herein. The computer program code for carrying out operations of the present disclosure may also be written in any combination of the programming languages discussed herein. The program code may execute entirely on the user's wearable device, partly on the user's wearable device, as a stand-alone software package, partly on the user's wearable device and partly on a remote computer or entirely on the remote computer or server. In the latter scenario, the remote computer may be connected to the user's wearable device through any type of network, including a local area network (LAN) or a wide area network (WAN), or the connection may be made to an external computer (for example, through the Internet using an Internet Service Provider).

The components may communicate over the interconnect 1106. The interconnect 1106 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1106 may be a proprietary bus, for example, used in a SoC based system. Other bus systems may be included, such as an I²C interface, an SPI interface, point-to-point interfaces, and a power bus, among others.

The interconnect 1106 couples the processor circuitry 1102 to the communication circuitry 1109 for communications with other devices. The communication circuitry 1109 is a hardware element, or collection of hardware elements, used to communicate over one or more networks (e.g., cloud 1101) and/or with other devices (e.g., mesh devices/fog 1164). The communication circuitry 1109 includes baseband circuitry 1110 (or "modem 610") and radiofrequency (RF) circuitry 1111 and 1112.

The baseband circuitry 1110 includes one or more processing devices (e.g., baseband processors) to carry out various protocol and radio control functions. Baseband circuitry 1110 may interface with application circuitry of appliance 1100 (e.g., a combination of processor circuitry 1102 and CRM 1160) for generation and processing of baseband signals and for controlling operations of the RF circuitry 1111 or 1112. The baseband circuitry 1110 may handle various radio control functions that enable communication with one or more radio networks via the RF circuitry 1111 or 1112. The baseband circuitry 1110 may include circuitry such as, but not limited to, one or more single-core or multi-core processors (e.g., one or more baseband processors) or control logic to process baseband signals received from a receive signal path of the RF circuitry 1111 and/or 1112, and to generate baseband signals to be provided to the RF circuitry 1111 or 1112 via a transmit signal path. In various embodiments, the baseband circuitry 1110 may implement a real-time OS (RTOS) to manage resources of the baseband circuitry 1110, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 11, in one embodiment, the baseband circuitry 1110 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate Long Term Evolution (LTE) protocol entities and/or Fifth Generation (5G)/New Radio (NR) protocol entities when the communication circuitry 1109 is a cellular radiofrequency communication system, such as millimeter wave (mmWave) communication circuitry or some other suitable cellular communication circuitry. In the first example, the protocol processing circuitry 805 would operate medium access control (MAC), radio link control (RLC), packet data convergence protocol (PDCP), service data adaptation protocol (SDAP), radio resource control (RRC), and non-access stratum (NAS) functions. In a second example, the protocol processing circuitry may operate one or more IEEE-based protocols when the communication circuitry 1109 is WiFi communication system. In the second example, the protocol processing circuitry would operate WiFi MAC and logical link control (LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1110 and/or RF circuitry 1111 and 1112. The baseband circuitry 1110 may also support radio communications for more than one wireless protocol.

Continuing with the aforementioned embodiment, the baseband circuitry 1110 includes individual processing device(s) to implement PHY including hybrid automatic repeat request (HARD) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 1109 also includes RF circuitry 1111 and 1112 to enable communication with wireless networks using modulated electromagnetic radiation through a non-solid medium. Each of the RF circuitry 1111 and 1112 include a receive signal path, which may include circuitry to convert analog RF signals (e.g., an existing or received modulated waveform) into digital baseband signals to be provided to the baseband circuitry 1110. Each of the RF circuitry 1111 and 1112 also include a transmit signal path, which may include circuitry configured to convert digital baseband signals provided by the baseband circuitry 1110 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 1111 or 1112 using metal transmission lines or the like.

The RF circuitry 1111 (also referred to as a "mesh transceiver") is used for communications with other mesh or fog devices 1164. The mesh transceiver 1111 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 1111, configured for a particular wireless communication protocol, may be used for the connections to the mesh devices 1164. For example, a WLAN unit may be used to implement Wi-Fi™ communications in accordance with the IEEE 802.11 standard. In addition, wireless wide area communications, for example, according to a cellular or other wireless wide area protocol, may occur via a WWAN unit.

The mesh transceiver 1111 may communicate using multiple standards or radios for communications at different ranges. For example, the appliance 1100 may communicate with close/proximate devices, e.g., within about 10 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 1112 (also referred to as a "wireless network transceiver," a "cloud transceiver," or the like) may be included to communicate with devices or services in the cloud 1101 via local or wide area network protocols. The wireless network transceiver 1112 includes one or more radios to communicate with devices in the cloud 1101. The cloud 1101 may be the same or similar to cloud 302 discussed previously. The wireless network transceiver 1112 may be a LPWA transceiver that follows the IEEE 802.15.4, or IEEE 802.15.4g standards, among others, such as those discussed herein. The appliance 1100 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1111 and wireless network transceiver 1112, as described herein. For example, the radio transceivers 1111 and 1112 may include an LTE or other cellular transceiver that uses spread spectrum (SPA/SAS) communications for implementing high-speed communications. Further, any number of other protocols may be used, such as Wi-Fi® networks for medium speed communications and provision of network communications.

The transceivers 1111 and 1112 may include radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, I600.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the transceivers 1111, 1112 including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

Network interface circuitry/controller (NIC) 1116 may be included to provide wired communication to the cloud 1101 or to other devices, such as the mesh devices 1164 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the appliance 1100 via NIC 1116 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1116 may include one or more dedicated processors and/or FPGAs to communicate using one or more of the aforementioned network interface protocols. In some implementations, the NIC 1116 may include multiple controllers to provide connectivity to other networks using the same or different protocols. For example, the appliance 1100 may include a first NIC 1116 providing communications to the cloud over Ethernet and a second NIC 1116 providing communications to other devices over another type of network.

The interconnect 1106 may couple the processor circuitry 1102 to an external interface 618 (also referred to as "I/O interface circuitry" or the like) that is used to connect external devices or subsystems. The external devices include, inter alia, sensor circuitry 1121, actuators 1122, and positioning circuitry 1145.

The sensor circuitry 1121 may include devices, modules, or subsystems whose purpose is to detect events or changes in its environment and send the information (sensor data) about the detected events to some other a device, module, subsystem, etc. Examples of such sensors 621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 618 connects the appliance 1100 to actuators 624, allow appliance 1100 to change its state, position, and/or orientation, or move or control a mechanism or system. The actuators 1122 comprise electrical and/or mechanical devices for moving or controlling a mechanism or system, and converts energy (e.g., electric current or moving air and/or liquid) into some kind of motion. The actuators 1122 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1122 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The appliance 1100 may be configured to operate one or more actuators 1122 based on one or more captured events and/or instructions or control signals received from a service provider and/or various client systems. In embodiments, the appliance 1100 may transmit instructions to various actuators 1122 (or controllers that control one or more actuators 1122) to reconfigure an electrical network as discussed herein. In embodiments, the sensor circuitry 1121 and actuators 1122 correspond to the sensors 321 and actuator 322 of FIG. 3, and/or correspond to the sensors, etc., discussed with regard to FIGS. 12-15.

The positioning circuitry 1145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radiopositioning Integrated by Satellite (DORIS), etc.), or the like. The positioning circuitry 1145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1145 may include a Micro-Technology for Positioning, Navigation, and Timing (Micro-PNT) IC that uses a master timing clock to perform position tracking/estimation without GNSS assistance. The positioning circuitry 1145 may also be part of, or interact with, the communication circuitry 1109 to communicate with the nodes and components of the positioning network. The positioning circuitry 1145 may also provide position data and/or time data to the application circuitry, which may use the data to synchronize operations with various infrastructure (e.g., radio base stations), for turn-by-turn navigation, or the like.

In some examples, various input/output (I/O) devices may be present within, or connected to, the appliance 1100, which are referred to as input device circuitry 1186 and output device circuitry 1184 in FIG. 11. The input device circuitry 1186 and output device circuitry 1184 include one or more user interfaces designed to enable user interaction with the appliance 1100 and/or peripheral component interfaces designed to enable peripheral component interaction with the appliance 1100. Input device circuitry 1186 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1184 may be included to show information or otherwise convey information, such as sensor readings, actuator position(s), or other like information. Data and/or graphics may be displayed on one or more user interface components of the output device circuitry 1184. Output device circuitry 1184 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the appliance 1100. The output device circuitry 1184 may also include speakers or other audio emitting devices, printer(s), and/or the like. In some embodiments, the sensor circuitry 1121 may be used as the input device circuitry 1186 (e.g., an image capture device, motion capture device, or the like) and one or more actuators 1122 may be used as the output device circuitry 1184 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 1124 may be coupled to the appliance 1100 to power the appliance 1100, which may be used in embodiments where the appliance 1100 is not in a fixed location. The battery 1124 may be a lithium ion battery, a lead-acid automotive battery, or a metal-air battery, such as a zinc-air battery, an aluminum-air battery, a lithium-air battery, a lithium polymer battery, and/or the like. In embodiments where the appliance 1100 is mounted in a fixed location, the appliance 1100 may have a power supply coupled to an electrical grid. In these embodiments, the appliance 1100 may include power tee circuitry to provide for electrical power drawn from a network cable to provide both power supply and data connectivity to the appliance 1100 using a single cable.

Power management integrated circuitry (PMIC) 1126 may be included in the appliance 1100 to track the state of charge (SoCh) of the battery 1124, and to control charging of the appliance 1100. The PMIC 1126 may be used to monitor other parameters of the battery 1124 to provide failure predictions, such as the state of health (SoH) and the state of function (SoF) of the battery 1124. The PMIC 1126 may include voltage regulators, surge protectors, power alarm detection circuitry. The power alarm detection circuitry may detect one or more of brown out (under-voltage) and surge (over-voltage) conditions. The PMIC 1126 may communicate the information on the battery 1124 to the processor circuitry 1102 over the interconnect 1106. The PMIC 1126 may also include an analog-to-digital (ADC) convertor that allows the processor circuitry 1102 to directly monitor the voltage of the battery 1124 or the current flow from the battery 1124. The battery parameters may be used to determine actions that the appliance 1100 may perform, such as transmission frequency, mesh network operation, sensing frequency, and the like. As an example, the PMIC 1126 may be a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

A power block 1128, or other power supply coupled to a grid, may be coupled with the PMIC 1126 to charge the battery 1124. In some examples, the power block 1128 may be replaced with a wireless power receiver to obtain the power wirelessly, for example, through a loop antenna in the appliance 1100. A wireless battery charging circuit, such as an LTC4020 chip from Linear Technologies of Milpitas, Calif., among others, may be included in the PMIC 1126. The specific charging circuits chosen depend on the size of the battery 1124, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

III. Example System Overview

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 12-15.

Figure 12:
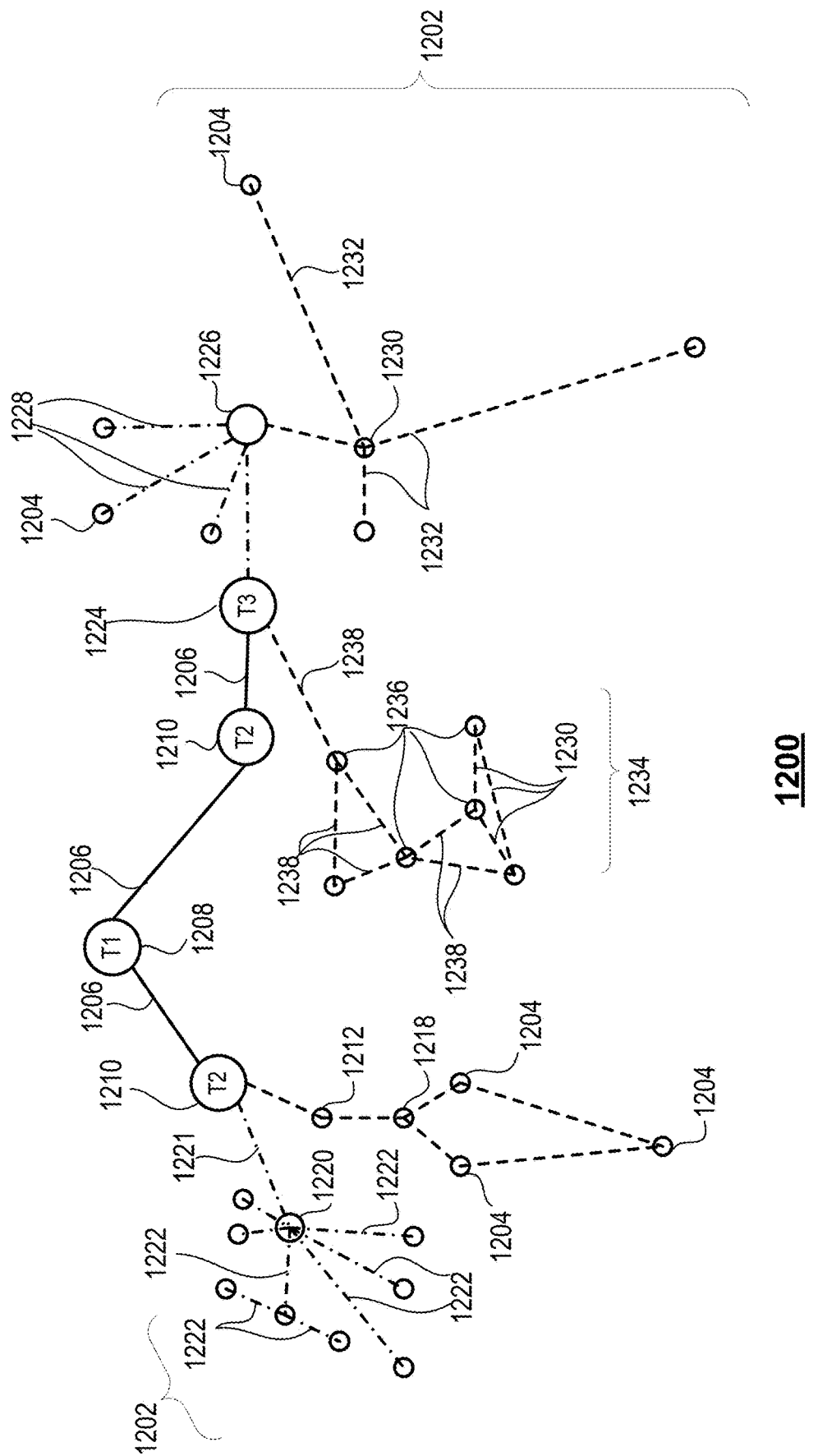
FIG. 12 illustrates an arrangement showing interconnections that may be present between a network and Internet of Things (IoT) networks, in accordance with various embodiments.

FIG. 12 illustrates an arrangement 1200 showing interconnections that may be present between the Internet and IoT networks, in accordance with various embodiments. The interconnections may couple smaller networks 1202, down to the individual IoT device 1204, to the fiber backbone 1206 of the Internet 1200. To simplify the drawing, not every device 1204, or other object, is labeled.

In FIG. 12, top-level providers, which may be termed tier 1 providers 1208, are coupled by the fiber backbone of the Internet to other providers, such as secondary or tier 2 providers 1210. In one example, a tier 2 provider 1210 may couple to a tower 1212 of an LTE cellular network, for example, by further fiber links, by microwave communications 1214, or by other communications technologies. The tower 1212 may couple to a mesh network including IoT devices 1204 through an LTE communication link 1216, for example, through a central node 1218. The communications between the individual IoT devices 1204 may also be based on LTE or NR communication links 1216. In another example, a high-speed uplink 1221 may couple a tier 2 provider 1210 to a gateway (GW) 1220. A number of IoT devices 1204 may communicate with the GW 1220, and with each other through the GW 1220, for example, over BLE links 1222.

The fiber backbone 806 may couple lower levels of service providers to the Internet, such as tier 3 providers 1224. A tier 3 provider 1224 may be considered a general Internet service provider (ISP), for example, purchasing access to the fiber backbone 1210 from a tier 2 provider 1210 and providing access to a corporate GW 1226 and other customers. From the corporate GW 1226, a wireless local area network (WLAN) can be used to communicate with IoT devices 1204 through Wi-Fi® links 1228. A Wi-Fi link 1228 may also be used to couple to a low power wide area (LPWA) GW 1230, which can communicate with IoT devices 1204 over LPWA links 1232, for example, compatible with the LoRaWan specification promulgated by the LoRa alliance.

The tier 3 provider 1224 may also provide access to a mesh network 1234 through a coordinator device 1236 that communicates with the tier 3 provider 1224 using any number of communications links, such as an LTE cellular link, an LPWA link, or a link 1238 based on the IEEE 802.15.4 standard, such as Zigbee®. Other coordinator devices 1236 may provide a chain of links that forms cluster tree of linked devices.

IoT devices 1204 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 1204 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 1204 may be biotic devices such as monitoring implants, biosensors, biochips, and the like. In other embodiments, an IoT device 1204 may be a computer device that is embedded in a computer system and coupled with communications circuitry of the computer system. In such embodiments, the IoT device 1204 refer to a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 1204 may include one or more memory devices and one or more processors to capture and store/record data. Each of the IoT devices 1204 may include appropriate communications circuitry (e.g., transceiver(s), modem, antenna elements, etc.) to communicate (e.g., transmit and receive) captured and stored/recorded data. Further, each IoT device 1204 may include other transceivers for communications using additional protocols and frequencies. The wireless communications protocols may be any suitable set of standardized rules or instructions implemented by the IoT devices 1204 to communicate with other devices, including instructions for packetizing/depacketizing data, instructions for modulating/demodulating signals, instructions for implementation of protocols stacks, and the like. For example, IoT devices 1204 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of the IoT devices 1204, tower 1212, GW 1220, 1226, and 1230, coordinator device 1236, and so forth, may also be incorporated with the embodiments described herein, in particular, with references to FIGS. 1-7. In particular, the IoT devices 1204, tower 1212, GW 1220, 1226, and 1230, coordinator device 1236, and so forth, may correspond with the computing devices/systems discussed previously with regard to FIGS. 1-11. In one example, the EMS appliance 900 of FIG. 9 may be one of the IoT devices 1204 or one of the GWs 1220, 1226, and 1230. In another example, the EMS 100 or 300 discussed previously may be, or may be incorporated in one or more of the IoT devices 1204 or GW 1220, 1226, and 1230.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

Figure 13:
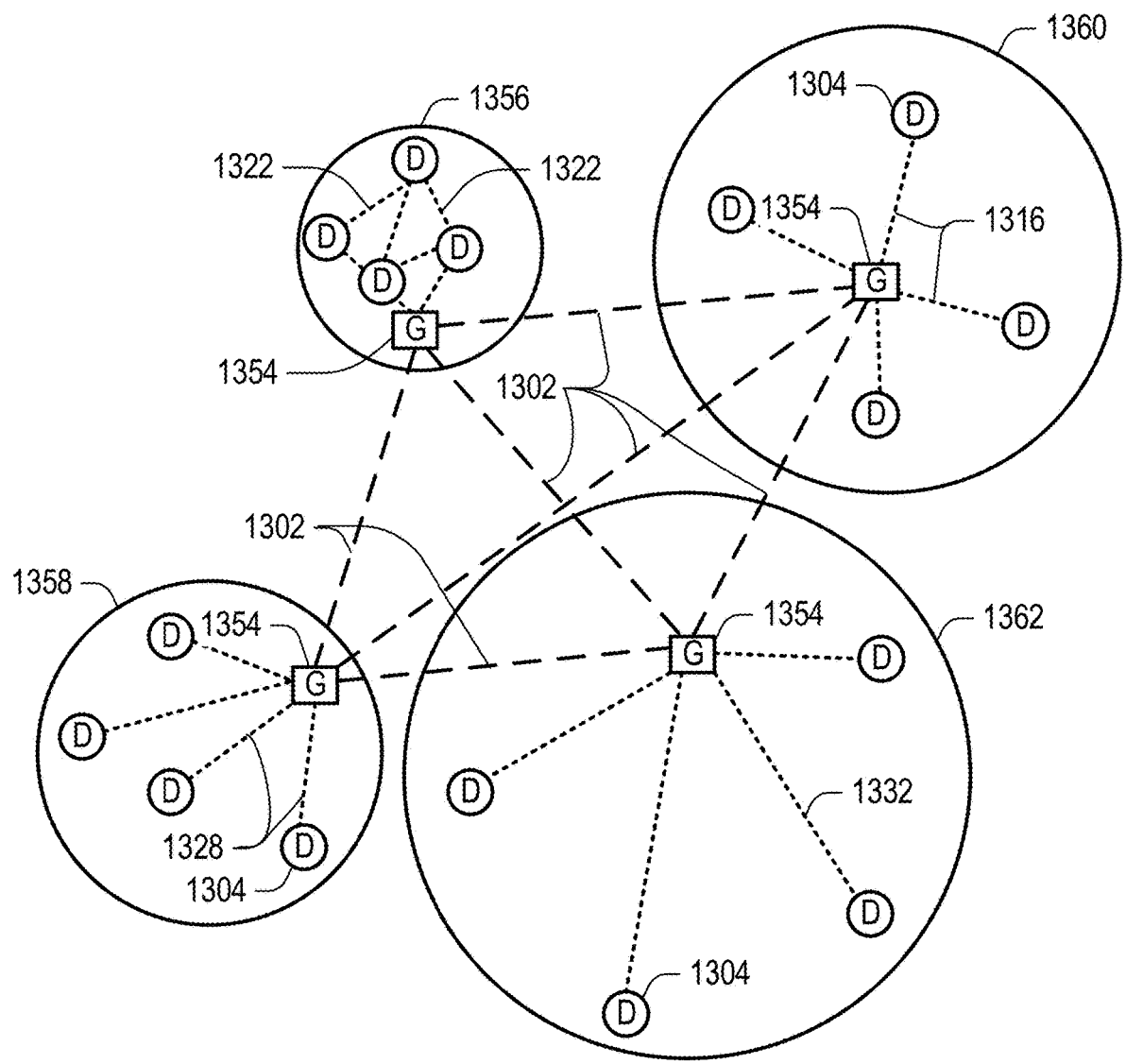
FIG. 13 illustrates an example domain topology, in accordance with various embodiments.

FIG. 13 illustrates an example domain topology 1300 that may be used for a number of IoT networks coupled through backbone links 1302 to GWs 1354, in accordance with various embodiments. To simplify the drawing, not every device 1304, or communications link 1316, 1322, 1328, or 1332 is labeled. The backbone links 1302 may include any number of wired or wireless technologies, and may be part of a local area network (LAN), a wide area network (WAN), or the Internet. Similar to FIG. 12, in embodiments, one or more of IoT devices 1304 (which may be the same or similar as IoT devices 1204 of FIG. 12), GWs 1354, and so forth, may be incorporated with embodiments described herein. In particular, the various devices shown by FIG. 13 may correspond with the EMS appliances, physical nodes, relay controllers, etc., discussed previously with regard to FIGS. 1-11. For example, one or more of the GWs 1354 may be the EMS appliance 900 of FIG. 9.

The network topology 1300 may include any number of types of IoT networks, such as a mesh network 1356 using BLE links 1322. Other IoT networks that may be present include a WLAN network 1358 using WiFi links 1328, a cellular network 1360 using cellular links 1316, and an LPWA network 1362 using LPWA links 1332. Each of these IoT networks may provide opportunities for new developments, as described herein. For example, communications between IoT devices 1304, such as over the backbone links 1302, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 1306 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1358 uses systems that perform standards conversion to provide multi-standard connectivity, enabling IoT devices 1304 using different protocols to communicate. Further systems may provide seamless inter-connectivity across a multi-standard infrastructure comprising visible Internet resources and hidden Internet resources. Communications in the cellular network 1360 may be enhanced by systems that offload data, extend communications to more remote devices, or both. The LPWA network 1362 may include systems that perform non-Internet protocol (IP) to IP interconnections, addressing, and routing.

Figure 14:
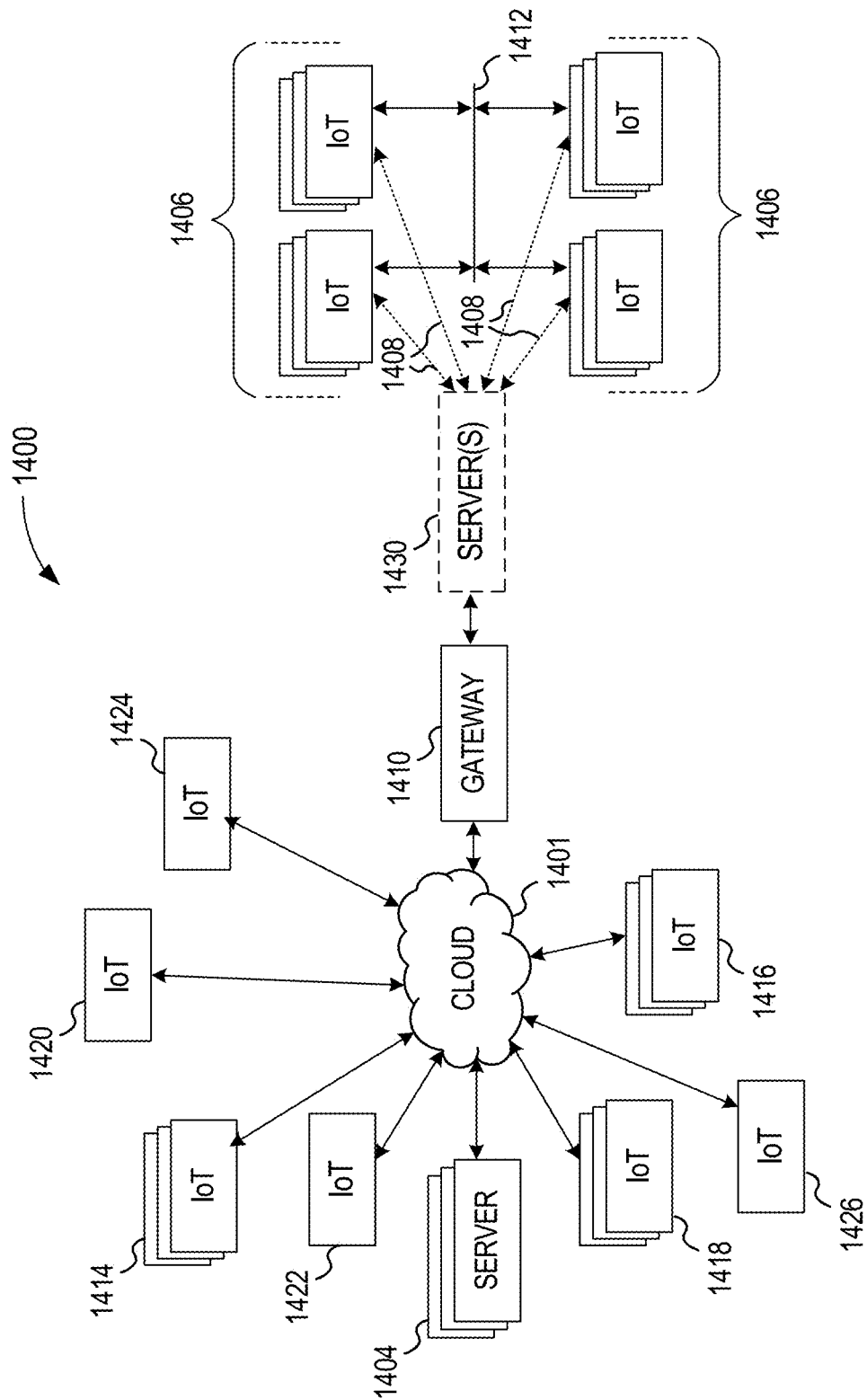
FIG. 14 illustrates an example cloud computing network or cloud in communication with a number of IoT devices, in accordance with various embodiments.

FIG. 14 illustrates an arrangement 1400 of example cloud computing network, or cloud 1401, in communication with a number of Internet of Things (IoT) devices, in accordance with various embodiments. The cloud 1401 may represent the Internet, one or more cellular networks, a local area network (LAN) or a wide area network (WAN) including proprietary and/or enterprise networks for a company or organization, or combinations thereof. Cloud 1401 may correspond to cloud 1101 of FIG. 11. Components used for such communications system can depend at least in part upon the type of network and/or environment selected. Protocols and components for communicating via such networks are well known and will not be discussed herein in detail. However, it should be appreciated that cloud 1401 may be associated with network operator who owns or controls equipment and other elements necessary to provide network-related services, such as one or more base stations or access points, and one or more servers for routing digital data or telephone calls (for example, a core network or backbone network).

The IoT devices in FIG. 14 may be the same or similar to the IoT devices 1204 discussed with regard to FIGS. 12-13. In particular, the IoT devices in FIG. 14 may correspond with the EMS appliances, physical nodes, relay controllers, etc., discussed previously with regard to FIGS. 1-11. The IoT devices may include any number of different types of devices, grouped in various combinations, such as IoT group 1406 that may include IoT devices that provide one or more services for a particular user, customer, organizations, etc. A service provider may deploy the IoT devices in the IoT group 1406 to a particular area (e.g., a geolocation, building, etc.) in order to provide the one or more services. In one example, the IoT group 306 may be a traffic control group where the IoT devices in the IoT group 1406 may include stoplights, traffic flow monitors, cameras, weather sensors, and the like, to provide traffic control and traffic analytics services for a particular municipality or other like entity. Similar to FIGS. 12-13, in embodiments, one or more of IoT devices 1414-1424, GW 1410, and so forth, may be incorporated with the various embodiments described herein, in particular, with references to FIGS. 1-11. For example, in some embodiments, the IoT group 1406, or any of the IoT groups discussed herein, may include the components, devices, systems discussed with regard to FIGS. 1-11.

The IoT group 1406, or other subgroups, may be in communication with the cloud 1401 through wireless links 1408, such as LPWA links, and the like. Further, a wired or wireless sub-network 1412 may allow the IoT devices to communicate with each other, such as through a local area network, a wireless local area network, and the like. The IoT devices may use another device, such as a GW 1410 to communicate with the cloud 1401. Other groups of IoT devices may include remote weather stations 1414, local information terminals 1416, alarm systems 1418, automated teller machines 1420, alarm panels 1422, or moving vehicles, such as emergency vehicles 1424 or other vehicles 1426, among many others. Each of these IoT devices may be in communication with other IoT devices, with servers 1404, or both. In some embodiments, the servers 1404 correspond with the remote server(s) 340 discussed previously.

As can be seen from FIG. 14, a large number of IoT devices may be communicating through the cloud 1401. This may allow different IoT devices to request or provide information to other devices autonomously. For example, the IoT group 1406 may request a current weather forecast from a group of remote weather stations 1414, which may provide the forecast without human intervention. Further, an emergency vehicle 1424 may be alerted by an automated teller machine 1420 that a burglary is in progress. As the emergency vehicle 1424 proceeds towards the automated teller machine 1420, it may access the traffic control group 1406 to request clearance to the location, for example, by lights turning red to block cross traffic at an intersection in sufficient time for the emergency vehicle 1424 to have unimpeded access to the intersection.

In another example, the IoT group 1406 may be an industrial control group (also referred to as a "connected factory", an "industry 4.0" group, and the like) where the IoT devices in the IoT group 1406 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 1406 may communicate with the servers 1404 via GW 1410, server(s) 1430, and cloud 1401 to provide captured data, which may be used to provide performance monitoring and analytics to the manufacturer or factory operator. Additionally, where the GW 1410 or one or more of the server(s) 1430 is or includes an EMS 100/300 (or is an EMS appliance 900 of FIG. 9), the IoT group 1406 may communicate with the GW 1410 and/or one or more of the server(s) 1430 for energy and electricity consumption optimizations according to the various embodiments discussed herein. Furthermore, the IoT devices in the IoT group 1406 may communicate among each other, and/or with other IoT devices of other IoT groups, to make decisions on their own and to perform their tasks as autonomously as possible.

Clusters of IoT devices, such as the IoT groups depicted by FIG. 14, may be equipped to communicate with other IoT devices as well as with the cloud 1401. This may allow the IoT devices to form an ad-hoc network between the devices, allowing them to function as a single device, which may be termed a fog device. This is discussed further with respect to FIG. 15.

Figure 15:
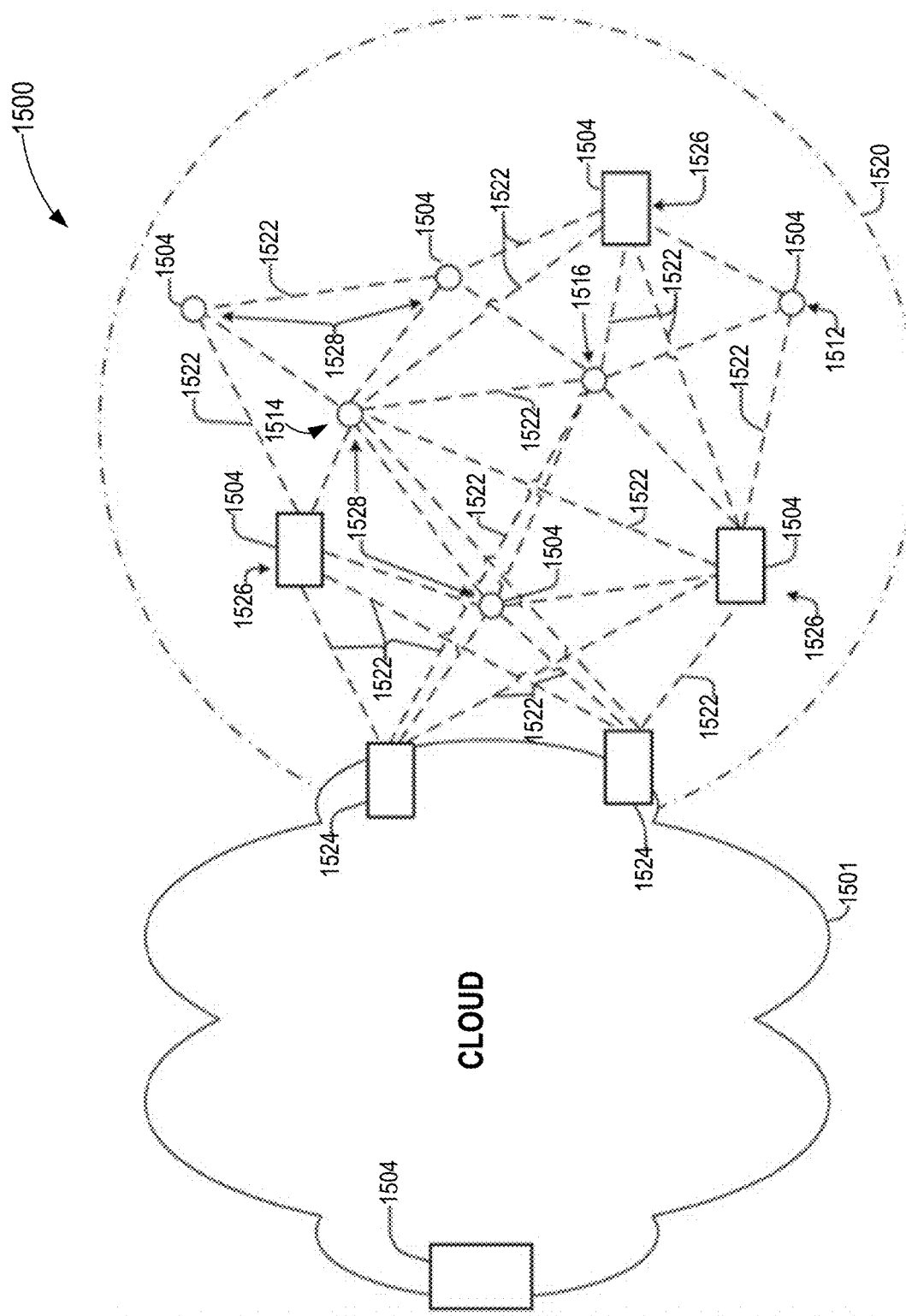
FIG. 15 illustrates an arrangement of a cloud computing network or cloud in communication with a mesh network of IoT devices or IoT fog, in accordance with various embodiments.

FIG. 15 illustrates an arrangement 1500 of a cloud computing network, or cloud 1501, in communication with a mesh network of IoT devices, which may be termed a fog device 1520 or fog 1520, operating at the edge of the cloud 1501, in accordance with various embodiments. Cloud 1501 may be the same or similar to cloud 1101 of FIG. 11 and cloud 1401 of FIG. 14. In this example, the fog 1520 is a group of IoT devices at an intersection (e.g., and may include one or more IoT groups 1406 of FIG. 14). The fog 1520 may be established in accordance with specifications released by the OpenFog Consortium (OFC), the Open Connectivity Foundation™ (OCF), among others. In some embodiments, the fog 1520 may be a tangle as defined by the IOTA foundation. Additionally, each of the IoT devices in the fog 1520 may correspond with the EMS appliances, physical nodes, relay controllers, etc., discussed previously with regard to FIGS. 1-11.

In embodiments, fog computing systems, such as fog 1520, may be mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from Cloud 1501 to Things (e.g., IoT devices 1504).

Fog computing systems may be used to perform low-latency computation/aggregation on the data while routing it to a central cloud computing service for performing heavy computations or computationally burdensome tasks. On the other hand, edge cloud computing consolidates human-operated, voluntary resources such as desktop PCs, tablets, smartphones, nano data centers as a cloud. In various implementations, resources in the edge cloud may be in one to two-hop proximity to the IoT devices 1504, which may result in reducing overhead related to processing data and may reduce network delay.

In some embodiments, the fog 1520 may be a consolidation of IoT devices 1504 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, Fog resources reside farther from the edge of the network when compared to edge systems but closer than a central cloud infrastructure. Fog devices are used to effectively handle computationally intensive tasks offloaded by edge resources.

In embodiments, the fog 1520 may operate at the edge of the cloud 1501. In some embodiments, the fog 1520 operating at the edge of the cloud 1501 may overlap or be subsumed into an edge network of the cloud 1501. In embodiments, the edge network of the cloud 1501 may overlap with the fog 1520, or become a part of the fog 1520. Furthermore, the fog 1520 may be an edge-fog network that includes an edge layer and a fog layer. The edge layer of the edge-fog network includes a collection of loosely coupled, voluntary and human-operated resources (e.g., the aforementioned edge devices). The Fog layer resides on top of the edge layer and is a consolidation of networking devices such as those discussed herein.

Data may be captured, stored/recorded, and communicated among the IoT devices 1504. Analysis of the traffic flow and control schemes may be implemented by aggregators 1526 that are in communication with the IoT devices 1504 and each other through a mesh network. The aggregators 1526 may be a type of IoT device 404 and/or network appliance. Data may be uploaded to the cloud 1501, and commands received from the cloud 1501, through GWs 1524 that are in communication with the IoT devices 1504 and the aggregators 1526 through the mesh network. Unlike the traditional cloud computing model, in some implementations, the cloud 1501 may have little or no computational capabilities and only serves as a repository for archiving data recorded and processed by the fog 1520. In these implementations, the cloud 1501 centralized data storage system and provides reliability and access to data by the computing resources in the fog 1520 and/or edge devices. Being at the core of the architecture, the Data Store of the cloud 1501 is accessible by both Edge and Fog layers of the aforementioned edge-fog network.

Similar to FIGS. 12-14, in embodiments, one or more of IoT devices 1504, aggregators 1526, and so forth, may be incorporated with the various embodiments described herein, in particular, with references to FIGS. 1-11. For example, in some embodiments, the fog 1520, or any of grouping of devices discussed herein, may include the one or more components, devices systems, etc., such as the EMS appliances, physical nodes, relay controllers, etc., discussed with regard to FIGS. 1-11.

Any number of communications links may be used in the fog 1520. Shorter-range links 1522, for example, compatible with IEEE 802.15.4 may provide local communications between IoT devices that are proximate to one another or other devices. Longer-range links 1522, for example, compatible with LPWA standards, may provide communications between the IoT devices and the GWs 1524. To simplify the diagram, not every communications link 1522 is labeled with a reference number.

The fog 1520 may be considered to be a massively interconnected network wherein a number of IoT devices are in communications with each other, for example, by the communication links 1522. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 1524. In these networks, the number of interconnections may provide substantial redundancy, allowing communications to be maintained, even with the loss of a number of IoT devices.

Not all of the IoT devices may be permanent members of the fog 1520. In the example of FIG. 15, three transient IoT devices have joined the fog 1520, a first mobile device 1512, a second mobile device 1514, and a third mobile device 1516. The fog 1520 may be presented to clients in the cloud 1501, such as the server 1534, as a single device located at the edge of the cloud 1501. In this example, the control communications to specific resources in the fog 1520 may occur without identifying any specific IoT device 1504 within the fog 1520. Accordingly, if any IoT device 1504 fails, other IoT devices 1504 may be able to discover and control a resource. For example, the IoT devices 1504 may be wired so as to allow any one of the IoT devices 1504 to control measurements, inputs, outputs, etc., for the other IoT devices 1504. The aggregators 1526 may also provide redundancy in the control of the IoT devices 1504 and other functions of the fog 1520.

In some examples, the IoT devices may be configured using an imperative programming style, e.g., with each IoT device having a specific function and communication partners. However, the IoT devices forming the fog 1520 may be configured in a declarative programming style, allowing the IoT devices to reconfigure their operations and communications, such as to determine needed resources in response to conditions, queries, and device failures. This may be performed as transient IoT devices, such as the mobile devices 1512, 1514, 1516, join the fog 1520. As transient or mobile IoT devices enter or leave the fog 1520, the fog 1520 may reconfigure itself to include those devices. This may be performed by forming a temporary group of the mobile devices 1512 and 1514 and the third mobile device 1516 to control or otherwise communicate with the IoT devices 1504. If one or both of the devices 1512, 1514 are autonomous, the temporary group may provide instructions to the devices 1512, 1514. As the transient devices 1512, 1514, and 1516, leave the vicinity of the fog 1520, it may reconfigure itself to eliminate those IoT devices 1504 from the network. The fog 1520 may also divide itself into functional units, such as the IoT devices 1504 and other IoT devices proximate to a particular area or geographic feature, or other IoT devices that perform a particular function. This type of combination may enable the formation of larger IoT constructs using resources from the fog 1520.

As illustrated by the fog 1520, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" is one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code. As used herein, a "database object", "data object", or the like may refer to any representation of information in a database that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" may refer to a resource hosted by a remote entity (e.g., a cloud computing service) and accessible over a network. The term "on-device resource" may refer to a resource hosted inside a device and enabling access to the device, and thus, to the related physical entity.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices for the purpose of transmitting and receiving information.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. As used herein, the term "architecture" may refer to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Some non-limiting example as provided infra. The following examples pertain to further embodiments. Specifics in the examples may be used anywhere in one or more embodiments. All optional features of the apparatus(es) described herein may also be implemented with respect to a method or process.

Example 1 includes an Energy Management System (EMS) appliance, comprising: processor circuitry coupled with interface circuitry, the processor circuitry is arranged to operate a Virtual Electrical Network (VEN) engine to identify each physical node of a plurality of physical nodes in an electrical grid as being an energy source node or an energy consumer node, each node of the plurality of nodes being electrically coupled to at least one other physical node of the plurality of physical nodes, and to generate a VEN to include a plurality of virtual nodes to represent the plurality of physical nodes and virtual couplings to couple the virtual nodes, the plurality of virtual nodes including virtual energy source nodes and virtual energy consumer nodes, and the processor circuitry is arranged to operate a load balancer to determine the virtual electrical couplings between the virtual energy consumer nodes and corresponding ones of the virtual energy sources based on load balancing criteria, and to generate load balancing instructions to reconfigure the electrical couplings of the physical nodes based on the virtual electrical couplings; and the interface circuitry is arranged to send the load balancing instructions to one or more relay controllers to configure the electrical coupling of the physical nodes.

Example 2 includes the EMS appliance of example 1 and/or some other examples herein, wherein each virtual node of the plurality of virtual nodes comprises a data structure to store data associated with one or more physical nodes, and the processor circuitry is arranged to operate the VEN engine to: store priority value in the data structure of each virtual node, wherein the priority value is based on a determined priority associated with each of the one or more associated physical nodes, and wherein the load balancing criteria is based on the priority value stored in the data structure of each virtual node.

Example 3 includes the EMS appliance of example 2 and/or some other examples herein, wherein the processor circuitry is arranged to operate the VEN engine to: store, in the data structure of a virtual node of the plurality of virtual nodes, one or more virtual node identifiers (ID) of one or more other virtual nodes to which the virtual node is connected, and wherein each virtual coupling of the virtual couplings comprises data relations including the stored virtual node IDs.

Example 4 includes the EMS appliance of examples 2-3 and/or some other examples herein, wherein the processor circuitry is arranged to operate the VEN engine to: monitor each physical node to obtain parameter values of each physical node; and store the obtained parameter values in the data structure of the corresponding virtual node.

Example 5 includes the EMS appliance of example 4 and/or some other examples herein, wherein the parameter values comprise one or more of an output threshold of the physical node if the physical node is an identified energy source node, an input threshold of the physical node if the physical node is an identified energy consumer node, a root mean square (RMS) value of an electrical measure of the physical node, an amplitude or peak-to-peak value of the electrical measure of the physical node, a Peak to Average Power Ratio (PAPR) of the electrical measure of the physical node, a phase value of the electrical measure of the physical node, and an electrical form factor of the electrical measure, wherein the electrical measure comprises one or more of a voltage, an electric current, and an electric power measurement.

Example 6 includes the EMS appliance of examples 1-5 and/or some other examples herein, wherein the VEN engine is to generate the VEN as a VEN graph, and the processor circuitry is arranged to operate the VEN engine to: execute an active node detection algorithm to detect contemporary electric loads among the virtual energy consumer nodes and electric energy among the virtual energy source nodes.

Example 7 includes the EMS appliance of example 6 and/or some other examples herein, wherein the active node detection algorithm is a greedy algorithm arranged to determine a minimum spanning tree for a weighted connected graph.

Example 8 includes the EMS appliance of examples 6-7 and/or some other examples herein, wherein the active node detection algorithm is a minimum spanning tree algorithm selected from a group consisting of: Prim's algorithm; Kruskal's algorithm; and Boruvka's algorithm.

Example 9 includes the EMS appliance of examples 1-8 and/or some other examples herein, wherein the VEN engine is to generate the VEN as a VEN graph, and the processor circuitry is arranged to operate a fault detector to: monitor the VEN graph for faults in the plurality of virtual nodes; and in response to detection of a faulty virtual node based on the monitoring, identify a set of the virtual couplings between the faulty virtual node and one or more other virtual nodes, and generate removal instructions to reconfigure electrical couplings of the physical nodes corresponding to the one or more other virtual nodes to disconnect one or more faulty physical nodes associated with the faulty virtual node based on the identified set of the virtual couplings, wherein the interface circuitry is arranged to send the removal instructions to the one or more relay controllers to reconfigure the electrical grid to disconnect the one or more faulty physical nodes.

Example 10 includes the EMS appliance of example 9 and/or some other examples herein, wherein, to monitor the VEN graph, the processor circuitry is arranged to operate the fault detector to: execute a node search algorithm to traverse the VEN graph to detect the faulty virtual node.

Example 11 includes the EMS appliance of example 10 and/or some other examples herein, wherein the node search algorithm is a tree search algorithm selected from a group consisting of: Breadth First Search (BFS) algorithm; and Depth First Search (DFS) algorithm.

Example 12 includes the EMS appliance of examples 9-11 and/or some other examples herein, wherein the processor circuitry is arranged to operate the fault detector to: in response to detection of the faulty virtual node, execute a shortest path algorithm to identify a disconnection pathway, wherein the disconnection pathway includes the faulty virtual node and the one or more other virtual nodes.

Example 13 includes the EMS appliance of example 12 and/or some other examples herein, wherein the processor circuitry is arranged to operate the fault detector to: for each of the one or more other virtual nodes in the disconnection pathway at each predetermined period of time, identify a closest virtual node in distance to a most recently removed virtual node from the virtual electrical grid.

Example 14 includes the EMS appliance of examples 12-13, wherein the shortest path algorithm is a shortest path algorithm selected from a group consisting of: Dijkstra's algorithm; Johnson's algorithm; Floyd-Warshall algorithm; A* search algorithm; and Viterbi algorithm.

Example 15 includes one or more computer-readable media (CRM) comprising instructions, wherein execution of the instructions by one or more processors of an Energy Management System (EMS) is to cause the EMS to: identify each physical node of a plurality of physical nodes in an electrical grid as being an energy source node or an energy consumer node, each node of the plurality of nodes being electrically coupled to at least one other physical node of the plurality of physical nodes; generate a Virtual Electrical Network (VEN) to include a plurality of virtual nodes to represent the plurality of physical nodes and virtual couplings to couple the virtual nodes, the plurality of virtual nodes including virtual energy source nodes and virtual energy consumer nodes; determine the virtual electrical couplings between the virtual energy consumer nodes and corresponding ones of the virtual energy sources based on load balancing criteria; generate load balancing instructions to reconfigure the electrical couplings of the physical nodes based on the virtual electrical couplings; and control transmission of the load balancing instructions to one or more relay controllers to configure the electrical coupling of the physical nodes.

Example 16 includes the one or more CRM of example 15 and/or some other examples herein, wherein each virtual node of the plurality of virtual nodes comprises a data structure to store data associated with one or more physical nodes, and execution of the instructions is to cause the EMS to: control storage of priority value in the data structure of each virtual node, wherein the priority value is based on a determined priority associated with each of the one or more associated physical nodes, and wherein the load balancing criteria is based on the priority value stored in the data structure of each virtual node; and control storage of, in the data structure of a virtual node of the plurality of virtual nodes, one or more virtual node identifiers (ID) of one or more other virtual nodes to which the virtual node is connected, and wherein each virtual coupling of the virtual couplings comprises data relations including the stored virtual node IDs.

Example 17 includes the one or more CRM of example 16 and/or some other examples herein, wherein execution of the instructions is to cause the EMS to: monitor each physical node to obtain parameter values of each physical node; and control storage of the obtained parameter values in the data structure of the corresponding virtual node.

Example 18 includes the one or more CRM of example 17 and/or some other examples herein, wherein the parameter values comprise one or more of an output threshold of the physical node if the physical node is an identified energy source node, an input threshold of the physical node if the physical node is an identified energy consumer node, a root mean square (RMS) value of an electrical measure of the physical node, an amplitude or peak-to-peak value of the electrical measure of the physical node, a Peak to Average Power Ratio (PAPR) of the electrical measure of the physical node, a phase value of the electrical measure of the physical node, and an electrical form factor of the electrical measure, wherein the electrical measure comprises one or more of a voltage, an electric current, and an electric power measurement.

Example 19 includes the one or more CRM of examples 15-18 and/or some other examples herein, wherein the VEN is a graph data structure, and execution of the instructions is to cause the EMS to: execute an active node detection algorithm to detect contemporary electric loads among the virtual energy consumer nodes and electric energy among the virtual energy source nodes, wherein the active node detection algorithm is one of Prim's algorithm; Kruskal's algorithm; or Boruvka's algorithm.

Example 20 includes the one or more CRM of examples 15-19 and/or some other examples herein, wherein the VEN is graph data structure, and execution of the instructions is to cause the EMS to: execute a node search algorithm to traverse the VEN graph to detect a faulty virtual node among the plurality of virtual nodes, wherein the node search algorithm is a Breadth First Search (BFS) algorithm or a Depth First Search (DFS) algorithm; and in response to detection of a faulty virtual node based on the monitoring, identify a set of the virtual couplings between the faulty virtual node and one or more other virtual nodes, execute a shortest path algorithm to identify a disconnection pathway from the faulty virtual node to a virtual energy consumer node, wherein the shortest path algorithm is one of Dijkstra's algorithm; Johnson's algorithm; Floyd-Warshall algorithm; A* search algorithm; and Viterbi algorithm, generate removal instructions to reconfigure electrical couplings of the physical nodes corresponding to one or more virtual nodes in the disconnection pathway to disconnect one or more faulty physical nodes associated with the faulty virtual node based on the identified set of the virtual couplings, and control transmission of the removal instructions to the one or more relay controllers to reconfigure the electrical grid to disconnect the one or more faulty physical nodes.

Example 21 includes a method to be performed by an Energy Management System (EMS), the method comprising: identifying, by the EMS, each physical node of a plurality of physical nodes in an electrical grid as being an energy source node or an energy consumer node, each node of the plurality of nodes being electrically coupled to at least one other physical node of the plurality of physical nodes; generating, by the EMS, a Virtual Electrical Network (VEN) to include a plurality of virtual nodes to represent the plurality of physical nodes and virtual couplings to couple the virtual nodes, the plurality of virtual nodes including virtual energy source nodes and virtual energy consumer nodes; determining, by the EMS, the virtual electrical couplings between the virtual energy consumer nodes and corresponding ones of the virtual energy sources based on load balancing criteria; generating, by the EMS, load balancing instructions to reconfigure the electrical couplings of the physical nodes based on the virtual electrical couplings; and sending, by the EMS, the load balancing instructions to one or more relay controllers to configure the electrical coupling of the physical nodes.

Example 22 includes the method of example 21 and/or some other examples herein, wherein generating the VEN comprises: generating, for each virtual node of the plurality of virtual nodes, a data structure to store data associated with one or more physical nodes; determining a priority associated with each physical node; storing a priority value in the data structure of each virtual node, wherein the priority value is based on the determined priority of each physical node, and wherein the load balancing criteria is based on the priority value stored in the data structure of each virtual node; and storing, in the data structure of a virtual node of the plurality of virtual nodes, one or more virtual node identifiers (ID) of one or more other virtual nodes to which the virtual node is connected, and wherein each virtual coupling of the virtual couplings comprises data relations including the stored virtual node IDs.

Example 23 includes the method of example 22 and/or some other examples herein, further comprising: monitoring each physical node to obtain dynamic parameter values of each physical node using an active node detection algorithm including one of Prim's algorithm; Kruskal's algorithm; or Boruvka's algorithm; and storing the obtained dynamic parameter values in the data structure of the corresponding virtual node.

Example 24 includes the method of example 23 and/or some other examples herein, wherein the parameter values comprise one or more of an output threshold of the physical node if the physical node is an identified energy source node, an input threshold of the physical node if the physical node is an identified energy consumer node, a root mean square (RMS) value of an electrical measure of the physical node, an amplitude or peak-to-peak value of the electrical measure of the physical node, a Peak to Average Power Ratio (PAPR) of the electrical measure of the physical node, a phase value of the electrical measure of the physical node, and an electrical form factor of the electrical measure, wherein the electrical measure comprises one or more of a voltage, an electric current, and an electric power measurement.

Example 25 includes the method of example 21 and/or some other examples herein, further comprising: traversing the VEN to detect a faulty virtual node among the plurality of virtual nodes using a node search algorithm including a Breadth First Search (BFS) algorithm or a Depth First Search (DFS) algorithm; and in response to detection of a faulty virtual node, identifying a set of the virtual couplings between the faulty virtual node and one or more other virtual nodes, determining a disconnection pathway using a shortest path algorithm, wherein the disconnection pathway includes the faulty virtual node and the one or more other virtual nodes, wherein the shortest path algorithm is one of Dijkstra's algorithm; Johnson's algorithm; Floyd-Warshall algorithm; A* search algorithm; and Viterbi algorithm, generate removal instructions to reconfigure electrical couplings of the physical nodes corresponding to the one or more other virtual nodes to disconnect one or more faulty physical nodes associated with the faulty virtual node based on the identified set of the virtual couplings, and transmitting the removal instructions to the one or more relay controllers to reconfigure the electrical grid to disconnect the one or more faulty physical nodes.

Example 26 includes a method to be performed by an Energy Management System (EMS) appliance, the method comprising: operating or causing to operate a Virtual Electrical Network (VEN) engine to identify each physical node of a plurality of physical nodes in an electrical grid as being an energy source node or an energy consumer node, each node of the plurality of nodes being electrically coupled to at least one other physical node of the plurality of physical nodes, and to generate a VEN to include a plurality of virtual nodes to represent the plurality of physical nodes and virtual couplings to couple the virtual nodes, the plurality of virtual nodes including virtual energy source nodes and virtual energy consumer nodes; operating or causing to operate a load balancer to determine the virtual electrical couplings between the virtual energy consumer nodes and corresponding ones of the virtual energy sources based on load balancing criteria, and to generate load balancing instructions to reconfigure the electrical couplings of the physical nodes based on the virtual electrical couplings; and sending or causing to send the load balancing instructions to one or more relay controllers to configure the electrical coupling of the physical nodes.

Example 27 includes the method of example 26 and/or some other examples herein, wherein each virtual node of the plurality of virtual nodes comprises a data structure to store data associated with one or more physical nodes, and the method comprises operating or causing to operate the VEN engine to store priority value in the data structure of each virtual node, wherein the priority value is based on a determined priority associated with each of the one or more associated physical nodes, and wherein the load balancing criteria is based on the priority value stored in the data structure of each virtual node.

Example 28 includes the method of example 27 and/or some other examples herein, wherein the method comprises operating or causing to operate the VEN engine to store, in the data structure of a virtual node of the plurality of virtual nodes, one or more virtual node identifiers (ID) of one or more other virtual nodes to which the virtual node is connected, and wherein each virtual coupling of the virtual couplings comprises data relations including the stored virtual node IDs.

Example 29 includes the method of examples 27-28 and/or some other examples herein, wherein the method comprises operating or causing to operate the VEN engine to: monitor each physical node to obtain parameter values of each physical node; and store the obtained parameter values in the data structure of the corresponding virtual node.

Example 30 includes the method of example 29 and/or some other examples herein, wherein the parameter values comprise one or more of an output threshold of the physical node if the physical node is an identified energy source node, an input threshold of the physical node if the physical node is an identified energy consumer node, a root mean square (RMS) value of an electrical measure of the physical node, an amplitude or peak-to-peak value of the electrical measure of the physical node, a Peak to Average Power Ratio (PAPR) of the electrical measure of the physical node, a phase value of the electrical measure of the physical node, and an electrical form factor of the electrical measure, wherein the electrical measure comprises one or more of a voltage, an electric current, and an electric power measurement.

Example 31 includes the method of examples 26-30 and/or some other examples herein, wherein the method comprises operating or causing to operate the VEN engine to generate the VEN as a VEN graph, and to: execute an active node detection algorithm to detect contemporary electric loads among the virtual energy consumer nodes and electric energy among the virtual energy source nodes.

Example 32 includes the method of example 31 and/or some other examples herein, wherein the active node detection algorithm is a greedy algorithm arranged to determine a minimum spanning tree for a weighted connected graph.

Example 33 includes the method of examples 31-32 and/or some other examples herein, wherein the active node detection algorithm is a minimum spanning tree algorithm selected from a group consisting of: Prim's algorithm; Kruskal's algorithm; and Boruvka's algorithm.

Example 34 includes the method of examples 26-33 and/or some other examples herein, wherein the method comprises operating or causing to operate the VEN engine to generate the VEN as a VEN graph, and the method comprises operating or causing to operate a fault detector to: monitor the VEN graph for faults in the plurality of virtual nodes; and in response to detection of a faulty virtual node based on the monitoring, identify a set of the virtual couplings between the faulty virtual node and one or more other virtual nodes, and generate removal instructions to reconfigure electrical couplings of the physical nodes corresponding to the one or more other virtual nodes to disconnect one or more faulty physical nodes associated with the faulty virtual node based on the identified set of the virtual couplings, wherein the interface circuitry is arranged to send the removal instructions to the one or more relay controllers to reconfigure the electrical grid to disconnect the one or more faulty physical nodes.

Example 35 includes the method of example 34 and/or some other examples herein, wherein monitoring the VEN graph comprises operating or causing to operate the fault detector to execute a node search algorithm to traverse the VEN graph to detect the faulty virtual node.

Example 36 includes the method of example 35 and/or some other examples herein, wherein the node search algorithm is a tree search algorithm selected from a group consisting of: Breadth First Search (BFS) algorithm; and Depth First Search (DFS) algorithm.

Example 37 includes the method of examples 34-35 and/or some other examples herein, wherein the method comprises operating or causing to operate the fault detector to in response to detection of the faulty virtual node, execute a shortest path algorithm to identify a disconnection pathway, wherein the disconnection pathway includes the faulty virtual node and the one or more other virtual nodes.

Example 38 includes the method of example 37 and/or some other examples herein, wherein the method comprises operating or causing to operate the fault detector to for each of the one or more other virtual nodes in the disconnection pathway at each predetermined period of time, identify a closest virtual node in distance to a most recently removed virtual node from the virtual electrical grid.

Example 39 includes the method of examples 37-38 and/or some other examples herein, wherein the shortest path algorithm is a shortest path algorithm selected from a group consisting of: Dijkstra's algorithm; Johnson's algorithm; Floyd-Warshall algorithm; A* search algorithm; and Viterbi algorithm.

Example 40 includes a method to be performed by an Energy Management System (EMS), the method comprising: identifying or causing to identify each physical node of a plurality of physical nodes in an electrical grid as being an energy source node or an energy consumer node, each node of the plurality of nodes being electrically coupled to at least one other physical node of the plurality of physical nodes; generating or causing to generate a Virtual Electrical Network (VEN) to include a plurality of virtual nodes to represent the plurality of physical nodes and virtual couplings to couple the virtual nodes, the plurality of virtual nodes including virtual energy source nodes and virtual energy consumer nodes; determining or causing to determine the virtual electrical couplings between the virtual energy consumer nodes and corresponding ones of the virtual energy sources based on load balancing criteria; generating or causing to generate load balancing instructions to reconfigure the electrical couplings of the physical nodes based on the virtual electrical couplings; and transmitting or causing to transmit the load balancing instructions to one or more relay controllers to configure the electrical coupling of the physical nodes.

Example 41 includes the method of example 40 and/or some other examples herein, wherein each virtual node of the plurality of virtual nodes comprises a data structure to store data associated with one or more physical nodes, and the method comprises: storing or causing to store priority value in the data structure of each virtual node, wherein the priority value is based on a determined priority associated with each of the one or more associated physical nodes, and wherein the load balancing criteria is based on the priority value stored in the data structure of each virtual node; and storing or causing to store, in the data structure of a virtual node of the plurality of virtual nodes, one or more virtual node identifiers (ID) of one or more other virtual nodes to which the virtual node is connected, and wherein each virtual coupling of the virtual couplings comprises data relations including the stored virtual node IDs.

Example 42 includes the method of example 41 and/or some other examples herein, further comprising: monitoring or causing to monitor each physical node to obtain parameter values of each physical node; and storing or causing to store the obtained parameter values in the data structure of the corresponding virtual node.

Example 43 includes the method of example 42 and/or some other examples herein, wherein the parameter values comprise one or more of an output threshold of the physical node if the physical node is an identified energy source node, an input threshold of the physical node if the physical node is an identified energy consumer node, a root mean square (RMS) value of an electrical measure of the physical node, an amplitude or peak-to-peak value of the electrical measure of the physical node, a Peak to Average Power Ratio (PAPR) of the electrical measure of the physical node, a phase value of the electrical measure of the physical node, and an electrical form factor of the electrical measure, wherein the electrical measure comprises one or more of a voltage, an electric current, and an electric power measurement.

Example 44 includes the method of examples 40-43 and/or some other examples herein, wherein the VEN is a graph data structure, and the method comprises: executing or causing to execute an active node detection algorithm to detect contemporary electric loads among the virtual energy consumer nodes and electric energy among the virtual energy source nodes, wherein the active node detection algorithm is one of Prim's algorithm; Kruskal's algorithm; or Boruvka's algorithm.

Example 45 includes the method of examples 40-44 and/or some other examples herein, wherein the VEN is graph data structure, and the method comprises: executing or causing to execute a node search algorithm to traverse the VEN graph to detect a faulty virtual node among the plurality of virtual nodes, wherein the node search algorithm is a Breadth First Search (BFS) algorithm or a Depth First Search (DFS) algorithm; and in response to detection of a faulty virtual node based on the monitoring, identifying or causing to identify a set of the virtual couplings between the faulty virtual node and one or more other virtual nodes, executing or causing to execute a shortest path algorithm to identify a disconnection pathway from the faulty virtual node to a virtual energy consumer node, wherein the shortest path algorithm is one of Dijkstra's algorithm; Johnson's algorithm; Floyd-Warshall algorithm; A* search algorithm; and Viterbi algorithm, generating or causing to generate removal instructions to reconfigure electrical couplings of the physical nodes corresponding to one or more virtual nodes in the disconnection pathway to disconnect one or more faulty physical nodes associated with the faulty virtual node based on the identified set of the virtual couplings, and transmitting or causing to transmit the removal instructions to the one or more relay controllers to reconfigure the electrical grid to disconnect the one or more faulty physical nodes.

Example 46 includes an apparatus comprising means to perform one or more elements of a method described in or related to any of examples 1-45, or any other method or process described herein. Example 47 includes an apparatus comprising logic, modules, or circuitry to perform one or more elements of a method described in or related to any of examples 1-45, or any other method or process described herein. Example 48 includes a method, technique, or process as described in or related to any of examples 1-45, or portions or parts thereof. Example 49 includes an apparatus comprising: one or more processors and one or more computer readable media comprising instructions that, when executed by the one or more processors, cause the one or more processors to perform the method, techniques, or process as described in or related to any of examples 1-45, or portions thereof. Example 50 includes a signal as described in or related to any of examples 1-45, or portions or parts thereof. Example 51 includes a signal in a wireless network as shown and described herein. Example 52 includes a message, a datagram, a frame, a packet, and/or a protocol data unit (PDU) as described in or related to any of examples 1-45, or portions or parts thereof.

The foregoing description of one or more implementations provides illustration and description of various example embodiment, but is not intended to be exhaustive or to limit the scope of embodiments to the precise form disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. The description is thus to be regarded as illustrative instead of limiting.

What is claimed is:

1. An Energy Management System (EMS) appliance, comprising:
    processor circuitry coupled with interface circuitry, the processor circuitry is arranged to:
    operate a Virtual Electrical Network (VEN) engine to:
        identify each physical node of a plurality of physical nodes in a physical electrical grid as being an energy source node or an energy consumer node,
        identify each physical electrical coupling of a plurality of physical electrical couplings between each physical node and at least one other physical node of the plurality of physical nodes, and
        generate a first VEN as a first VEN graph including a first arrangement of a plurality of virtual nodes and a plurality of virtual electrical couplings, the plurality of virtual nodes representing respective physical nodes of the plurality of physical nodes, the plurality of virtual nodes including virtual energy source nodes and virtual energy consumer nodes, and the plurality of virtual electrical couplings representing respective physical electrical couplings of the plurality of physical electrical couplings,
    execute an active node detection algorithm to detect, in the first VEN, contemporary electric loads among the virtual energy consumer nodes and electric energy among the virtual energy source nodes, and
    operate a load balancer to:
        generate a second VEN as a second VEN graph including a second arrangement of virtual electrical couplings between the virtual energy consumer nodes and the virtual energy source nodes different than the first arrangement based on detected electrical loads of the plurality of virtual nodes and load balancing criteria, the second arrangement being optimized to consume less electricity than the first arrangement, and
        generate load balancing instructions to reconfigure the plurality of physical electrical couplings between one or more physical nodes of the plurality of physical nodes based on the second arrangement of virtual electrical couplings; and the interface circuitry is arranged to send the load balancing instructions to one or more relay controllers to configure the plurality of physical electrical couplings according to the second arrangement; and the processor circuitry is arranged to operate the VEN engine to execute the active node detection algorithm to detect, in the second VEN, contemporary electric loads among the virtual energy consumer nodes and electric energy among the virtual energy source nodes.

2. The EMS appliance of claim 1, wherein each virtual node of the plurality of virtual nodes comprises a data structure to store data associated with one or more physical nodes, and the processor circuitry is arranged to operate the VEN engine to:

store priority value in the data structure of each virtual node, wherein the priority value is based on a determined priority associated with each of the one or more associated physical nodes, and wherein the load balancing criteria is based on the priority value stored in the data structure of each virtual node.

3. The EMS appliance of claim 2, wherein the processor circuitry is arranged to operate the VEN engine to:

store, in the data structure of a virtual node of the plurality of virtual nodes, one or more virtual node identifiers (ID) of one or more other virtual nodes to which the virtual node is connected, and wherein each virtual coupling of the virtual couplings comprises data relations including the stored virtual node IDs.

4. The EMS appliance of claim 2, wherein the processor circuitry is arranged to operate the VEN engine to:

monitor each physical node to obtain parameter values of each physical node; and store the obtained parameter values in the data structure of the corresponding virtual node.

5. The EMS appliance of claim 4, wherein the parameter values comprise one or more of an output threshold of the physical node if the physical node is an identified energy source node, an input threshold of the physical node if the physical node is an identified energy consumer node, a root mean square (RMS) value of an electrical measure of the physical node, an amplitude or peak-to-peak value of the electrical measure of the physical node, a Peak to Average Power Ratio (PAPR) of the electrical measure of the physical node, a phase value of the electrical measure of the physical node, and an electrical form factor of the electrical measure, wherein the electrical measure comprises one or more of a voltage, an electric current, and an electric power measurement.

6. The EMS appliance of claim 1, wherein the active node detection algorithm is a greedy algorithm arranged to determine a minimum spanning tree for a weighted connected graph.

7. The EMS appliance of claim 1, wherein the active node detection algorithm is a minimum spanning tree algorithm selected from a group consisting of:
Prim's algorithm;
Kruskal's algorithm; and
Boruvka's algorithm.

8. The EMS appliance of claim 1, wherein the processor circuitry is arranged to operate a fault detector to:

monitor the first VEN graph for faults in the plurality of virtual nodes; and in response to detection of a faulty virtual node based on the monitoring, identify a set of the virtual electrical couplings between the faulty virtual node and one or more other virtual nodes, generate the second VEN graph to rearrange the identified set of the virtual electrical couplings to disconnect the faulty virtual node, and generate removal instructions to reconfigure the physical electrical couplings of the physical nodes corresponding to the one or more other virtual nodes to disconnect one or more faulty physical nodes corresponding to the faulty virtual node based on the second VEN graph, wherein the interface circuitry is arranged to send the removal instructions to the one or more relay controllers to reconfigure the physical electrical grid to disconnect the one or more faulty physical nodes according to the removal instructions.

9. The EMS appliance of claim 8, wherein, to monitor the first VEN graph, the processor circuitry is arranged to operate the fault detector to:

execute a node search algorithm to traverse the first VEN graph to detect the faulty virtual node.

10. The EMS appliance of claim 9, wherein the node search algorithm is a tree search algorithm selected from a group consisting of: Breadth First Search (BFS) algorithm and Depth First Search (DFS) algorithm.

11. The EMS appliance of claim 8, wherein the processor circuitry is arranged to operate the fault detector to:

in response to detection of the faulty virtual node, execute a shortest path algorithm to identify a disconnection pathway, the disconnection pathway includes the faulty virtual node and the one or more other virtual nodes.

12. The EMS appliance of claim 11, wherein the processor circuitry is arranged to operate the fault detector to:

for each of the one or more other virtual nodes in the disconnection pathway at each predetermined period of time, identify a closest virtual node in distance to a most recently removed virtual node from the first or second VEN.

13. The EMS appliance of claim 11, wherein the shortest path algorithm is a shortest path algorithm selected from a group consisting of:
Dijkstra's algorithm;
Johnson's algorithm;
Floyd-Warshall algorithm;
A* search algorithm; and
Viterbi algorithm.

14. One or more computer-readable media (CRM) comprising instructions, wherein execution of the instructions by one or more processors of an Energy Management System (EMS) is to cause the EMS to:

identify each physical node of a plurality of physical nodes in a physical electrical grid as being an energy source node or an energy consumer node;

identify a plurality of physical electrical couplings between each physical node of the plurality of physical nodes and at least one other physical node of the plurality of physical nodes;

detect electrical loads produced by each energy source node and electrical loads consumed by each energy consumer node;

generate a first instance of a Virtual Electrical Network (VEN) as a first graph data structure based on a first topology of the identified plurality of physical nodes and the plurality of physical electrical couplings, the VEN instance to include a plurality of virtual nodes representing corresponding ones of the plurality of physical nodes and a plurality of virtual electrical couplings representing corresponding ones of the plurality of physical electrical couplings, and the plurality of virtual nodes including virtual energy source nodes and virtual energy consumer nodes;

execute an active node detection algorithm to detect, in the first VEN, contemporary electric loads among the virtual energy consumer nodes and electric energy among the virtual energy source nodes:

determine a second instance of the VEN as a second graph data structure comprising a second topology of the virtual electrical couplings between the virtual energy consumer nodes and corresponding ones of the virtual energy sources based on the detected electrical loads and load balancing criteria, the second topology being optimized to consume less electricity than the first topology;

generate load balancing instructions to reconfigure the physical electrical couplings among the plurality of physical nodes based on the second instance;

send the load balancing instructions to one or more relay controllers to configure the plurality of physical electrical couplings among the physical nodes according to the second topology; and execute the active node detection algorithm to detect, in the second VEN, contemporary electric loads among the virtual energy consumer nodes and electric energy among the virtual energy source nodes.

15. The one or more CRM of claim 14, wherein each virtual node of the plurality of virtual nodes comprises a data structure to store data associated with one or more physical nodes, and execution of the instructions is to cause the EMS to:

control storage of priority value in the data structure of each virtual node, wherein the priority value is based on a determined priority associated with each of the one or more associated physical nodes, and wherein the load balancing criteria is based on the priority value stored in the data structure of each virtual node; and control storage of, in the data structure of a virtual node of the plurality of virtual nodes, one or more virtual node identifiers (ID) of one or more other virtual nodes to which the virtual node is connected, and wherein each virtual coupling of the virtual couplings comprises data relations including the stored virtual node IDs.

16. The one or more CRM of claim 15, wherein execution of the instructions is to cause the EMS to:

monitor each physical node to obtain parameter values of each physical node; and control storage of the obtained parameter values in the data structure of the corresponding virtual node.

17. The one or more CRM of claim 16, wherein the parameter values comprise one or more of an output threshold of the physical node if the physical node is an identified energy source node, an input threshold of the physical node if the physical node is an identified energy consumer node, a root mean square (RMS) value of an electrical measure of the physical node, an amplitude or peak-to-peak value of the electrical measure of the physical node, a Peak to Average Power Ratio (PAPR) of the electrical measure of the physical node, a phase value of the electrical measure of the physical node, and an electrical form factor of the electrical measure, wherein the electrical measure comprises one or more of a voltage, an electric current, and an electric power measurement.

18. The one or more CRM of claim 14, wherein the active node detection algorithm is a greedy algorithm arranged to determine a minimum spanning tree for a weighted connected graph, or the active node detection algorithm is one of Prim's algorithm; Kruskal's algorithm; or Boruvka's algorithm.

19. The one or more CRM of claim 14, wherein each instance of the VEN is a respective graph data structure, and execution of the instructions is to cause the EMS to:

execute a node search algorithm to traverse the first instance of the VEN graph to detect a faulty virtual node among the plurality of virtual nodes, wherein the node search algorithm is a Breadth First Search (BFS) algorithm or a Depth First Search (DFS) algorithm; and in response to detection of a faulty virtual node based on the monitoring, identify a set of the virtual couplings between the faulty virtual node and one or more other virtual nodes, execute a shortest path algorithm to identify a disconnection pathway from the faulty virtual node to a virtual energy consumer node, wherein the shortest path algorithm is one of Dijkstra's algorithm; Johnson's algorithm; Floyd-Warshall algorithm; A* search algorithm; and Viterbi algorithm, generate the second instance of the VEN graph to rearrange the identified set of the virtual electrical couplings to disconnect the faulty virtual node, generate removal instructions to reconfigure electrical couplings of the physical nodes corresponding to one or more virtual nodes in the disconnection pathway to disconnect one or more faulty physical nodes associated with the faulty virtual node based on the identified set of the virtual couplings, and send the removal instructions to the one or more relay controllers to reconfigure the physical electrical grid to disconnect the one or more faulty physical nodes.

20. A method to be performed by an Energy Management System (EMS), the method comprising:

identifying, by the EMS, each physical node of a plurality of physical nodes in a physical electrical grid as being an energy source node or an energy consumer node;

identifying, by the EMS, each physical electrical coupling of a plurality of physical electrical couplings between individual physical nodes of the plurality of physical nodes;

generating, by the EMS, an initial Virtual Electrical Network (VEN) instance including an initial arrangement of a plurality of virtual nodes and a plurality of virtual electrical couplings, the plurality of virtual nodes representing respective physical nodes of the plurality of physical nodes and the plurality of virtual couplings representing respective physical electrical couplings of the plurality of physical electrical couplings, the plurality of virtual nodes including virtual energy source nodes and virtual energy consumer nodes;

executing an active node detection algorithm to detect, in the initial VEN instance, contemporary electric loads among the virtual energy consumer nodes and electric energy among the virtual energy source nodes;

generating, by the EMS at a predefined interval, a new VEN instance including a new arrangement of the virtual electrical couplings between the virtual energy consumer nodes and the virtual energy sources different than a previous arrangement of a previous VEN instance based on detected electrical loads of the plurality of virtual nodes and load balancing criteria, the new arrangement being optimized to consume less electricity than the previous arrangement;

generating, by the EMS, load balancing instructions to reconfigure the electrical couplings between one or more physical nodes of the plurality of physical nodes based on the new VEN instance;

sending, by the EMS, the load balancing instructions to one or more relay controllers to configure the plurality of physical electrical couplings according to the new VEN instance; and executing the active node detection algorithm to detect, in the new VEN instance, contemporary electric loads among the virtual energy consumer nodes and electric energy among the virtual energy source nodes.

21. The method of claim 20, wherein generating the initial VEN instance and the new VEN instance comprises:

generating, for each virtual node of the plurality of virtual nodes, a data structure to store data associated with one or more physical nodes;

determining a priority associated with each physical node;

storing a priority value in the data structure of each virtual node, wherein the priority value is based on the determined priority of each physical node, and wherein the load balancing criteria is based on the priority value stored in the data structure of each virtual node; and storing, in the data structure of a virtual node of the plurality of virtual nodes, one or more virtual node identifiers (ID) of one or more other virtual nodes to which the virtual node is connected, and wherein each virtual coupling of the virtual couplings comprises data relations including the stored virtual node IDs.

22. The method of claim 21, further comprising:

monitoring each physical node to obtain dynamic parameter values of each physical node using the active node detection algorithm, the active node detection algorithm including one of Prim's algorithm, Kruskal's algorithm, or Boruvka's algorithm; and storing the obtained dynamic parameter values in the data structure of the corresponding virtual node.

23. The method of claim 22, wherein the parameter values comprise one or more of an output threshold of the physical node if the physical node is an identified energy source node, an input threshold of the physical node if the physical node is an identified energy consumer node, a root mean square (RMS) value of an electrical measure of the physical node, an amplitude or peak-to-peak value of the electrical measure of the physical node, a Peak to Average Power Ratio (PAPR) of the electrical measure of the physical node, a phase value of the electrical measure of the physical node, and an electrical form factor of the electrical measure, wherein the electrical measure comprises one or more of a voltage, an electric current, and an electric power measurement.

24. The method of claim 20, further comprising:

traversing the initial VEN instance and each new VEN instance to detect a faulty virtual node among the plurality of virtual nodes using a node search algorithm including a Breadth First Search (BFS) algorithm or a Depth First Search (DFS) algorithm; and in response to detection of a faulty virtual node, identifying a set of the virtual couplings between the faulty virtual node and one or more other virtual nodes, determining a disconnection pathway using a shortest path algorithm, wherein the disconnection pathway includes the faulty virtual node and the one or more other virtual nodes, wherein the shortest path algorithm is one of Dijkstra's algorithm; Johnson's algorithm; Floyd-Warshall algorithm; A* search algorithm; and Viterbi algorithm, generating the new VEN instance to rearrange the identified set of the virtual electrical couplings to disconnect the faulty virtual node based on the disconnection pathway, generate removal instructions to reconfigure the plurality of physical electrical couplings of the physical nodes corresponding to the one or more other virtual nodes to disconnect one or more faulty physical nodes associated with the faulty virtual node based on the new VEN instance, and transmitting the removal instructions to the one or more relay controllers to reconfigure the electrical grid to disconnect the one or more faulty physical nodes.

* * * * *